(12) United States Patent
Cirik et al.

(10) Patent No.: US 11,653,277 B2
(45) Date of Patent: May 16, 2023

(54) ACTIVE BANDWIDTH PART SWITCHING BASED ON BEAM FAILURE RECOVERY CONFIGURATION PARAMETERS OF ANOTHER CELL

(71) Applicant: Ofinno, LLC, Reston, VA (US)

(72) Inventors: Ali Cagatay Cirik, Chantilly, VA (US); Esmael Hejazi Dinan, McLean, VA (US); Hua Zhou, Vienna, VA (US); Hyoungsuk Jeon, Centreville, VA (US); Alireza Babaei, Fairfax, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/691,327

(22) Filed: Mar. 10, 2022

(65) Prior Publication Data
US 2022/0201572 A1 Jun. 23, 2022

Related U.S. Application Data

(63) Continuation of application No. 17/092,275, filed on Nov. 8, 2020, now Pat. No. 11,297,550, which is a
(Continued)

(51) Int. Cl.
*H04W 36/06* (2009.01)
*H04B 7/08* (2006.01)
(Continued)

(52) U.S. Cl.
CPC .......... *H04W 36/06* (2013.01); *H04B 7/0695* (2013.01); *H04B 7/088* (2013.01);
(Continued)

(58) Field of Classification Search
CPC ..... H04B 7/0695; H04B 7/088; H04L 27/261; H04L 5/0032; H04L 5/0091; H04W 16/28;
(Continued)

(56) References Cited

U.S. PATENT DOCUMENTS 10,834,647 B2 11/2020 Cirik et al.
10,966,254 B2 * 3/2021 Jang ..................... H04W 72/042
(Continued)

OTHER PUBLICATIONS

R2-1810008—Sharp_READ; 3GPP TSG RAN WG2 NR AH1807 Meeting; Montreal, Canada, Jul. 2-6, 2018 Agenda Item: 10.3.1.2; Source:Sharp; Title:Remaining issues on DL BWP switching upon RACH procedure initiation.
(Continued)

*Primary Examiner* — David S Huang
(74) *Attorney, Agent, or Firm* — Jacob L. Mangan; Kavon Nasabzdeh; Willis H. Chang

(57) ABSTRACT

A wireless device may receive one or more configuration parameters of a first cell and a second cell. The one or more configuration parameters may indicate a first bandwidth part (BWP) of the first cell, a second BWP of the second cell, and beam failure recovery configuration parameters of the first BWP are for one or more beam failure recoveries of the second BWP of the second cell. The wireless device may switch to the first BWP of the first cell as an active BWP of the first cell. Based on the beam failure recovery configuration parameters of the first BWP being for one or more beam failure recoveries of the second BWP, the wireless device may switch to the second BWP as an active BWP of the second cell.

20 Claims, 32 Drawing Sheets

Related U.S. Application Data continuation of application No. 16/530,211, filed on Aug. 2, 2019, now Pat. No. 10,834,647.

(60) Provisional application No. 62/715,372, filed on Aug. 7, 2018.

(51) Int. Cl.
| | |
|---|---|
| H04L 5/00 | (2006.01) |
| H04W 76/27 | (2018.01) |
| H04W 72/04 | (2009.01) |
| H04B 7/06 | (2006.01) |
| H04W 72/0453 | (2023.01) |

(52) U.S. Cl.
CPC ....... *H04L 5/0023* (2013.01); *H04W 72/0453* (2013.01); *H04W 76/27* (2018.02)

(58) Field of Classification Search
CPC ... H04W 36/06; H04W 36/305; H04W 76/19; H04W 76/27
See application file for complete search history.

(56) References Cited

U.S. PATENT DOCUMENTS

| | | | |
|---|---|---|---|
| 2019/0297514 A1* | 9/2019 | Pao | H04W 36/06 |
| 2019/0364602 A1 | 11/2019 | Yi | |
| 2021/0135927 A1 | 5/2021 | Yang et al. | |

OTHER PUBLICATIONS

R2-1810091—Huawei_READ; 3GPP TSG-RAN WG2 NR AH1807 Meeting; Montreal, Canada, Jul. 2-6, 2018 Revision of R2 1807444; Agenda item: 10.3.1.2; Source: Huawei, HiSilicon; Title: BWP switch for BFR.
R2-1810513—Huawei-READ; 3GPP TSG-RAN WG2 NR AH1807 Meeting; Montreal, Canada, Jul. 2-6, 2018; Agenda item:10.3.1.4.2; Source: Huawei, HiSilicon; Title: Clarification on RA procedure for BFR on BWPs without CBRA occasions.
R2-1810641—Huawei_READ; 3GPP TSG-RAN WG2 Adhoc1807; Montreal, Canada, Jul. 2-6, 2018; Agenda Item:10.2.2.1; Source: Huawei, HiSilicon; Title:Issues on BWP switch and search space configuration for BFR.
R2-1810643—Huawei_READ; 3GPP TSG-RAN WG2 #AH1807; Montreal, Canada, Jul. 2-Jul. 6, 2018; Agenda Item:10.2.2.1; Source: Huawei, HiSilicon.
R2-1810797—Offline discussion #100 DL-UL linking for CFRA; 3GPP TSG-RAN WG2 AH-1807; Montreal, Canada, Jul. 2-Jul. 6, 2018; Source:CATT; Title:Offline discussion #100 on DL-UL linking for CFRA; Agenda Item:10.3.1.2.
3GPP TS 38.213 V15.2.0 (Jun. 2018); Technical Specification; 3rd Generation Partnership Project; Technical Specification Group Radio Access Network; NR; Physical layer procedures for control (Release 15).
3GPP TS 38.321 V15.2.0 (Jun. 2018); Technical Specification; 3rd Generation Partnership Project; Technical Specification Group Radio Access Network; NR; Medium Access Control (MAC) protocol specification; (Release 15).
3GPP TS 38.331 V15.2.1 (Jun. 2018); Technical Specification; 3rd Generation Partnership Project; Technical Specification Group Radio Access Network; NR; Radio Resource Control (RRC) protocol specification; (Release 15).
R1-1801722—CATT; 3GPP TSG RAN WG1 Meeting #92; Athens, Greece, Feb. 26-Mar. 2, 2018; Source CATT; Title:Remaining issues on DL beam failure recovery; Agenda Item:7.1.2.2.4.
R1-1802824—Qualcomm Read; 3GPP TSG RAN WG1 Meeting #92; Athens, Greece, Feb. 26-Mar. 2, 2018; Agenda item:7.1.2.2.4; Source:Qualcomm Incorporated; Title:Beam recovery procedures.
R1-1803622—NEC; 3GPP TSG RAN WG1 Meeting #92b;Sanya, China, Apr. 16-Apr. 20, 2018; Agenda item:7.1.2.2.4; Source:NEC; Title:Remaining issues on beam failure recovery.
R1-1804211—Lenova+Motorola_READ; '3GPP TSG RAN WG1 Meeting #92; Sanya, China, Apr. 16 -20, 2018; Agenda Item:7.1.2.2.4; Source:Lenovo, Motorola Mobility; Title:Discussion of beam failure recovery for carrier aggregation.
R1-1806281—CATT; 3GPP TSG RAN WG1 Meeting #93; Busan, Korea, May 21-25, 2018; Source:CATT; Title: Remaining issues on beam failure recovery; Agenda Item:7.1.2.2.4.
R1-1806789—Mediatek; 3GPP TSG RAN WG1 Meeting #93; Busan, South Korea, May 21-May 25, 2018; Agenda Item: 7.1.2.2.4; Source: MediaTek Inc.; Title:Remaining Issues on Beam Failure Recovery; Document for: Discussion.
R2-1800049—Asustek read; 3GPP TSG-RAN WG2 Meeting #AH-1801; Vancouver, Canada, Jan. 22-26, 2018; Agenda Item:10.3.1.13; Source: ASUSTeK; Title:UE behaviours upon beam failure and recovery.
R2-1800632—Huawei; 3GPP TSG-RAN WG2 Ad Hoc; Vancouver, Canada,Jan. 22-Jan. 26, 2018; Agenda Item:10.2.2.1; Source: Huawei, HiSilicon; Title: Remaining issue for beam failure recovery.
R2-1800895_VIVO; 3GPP TSG-RAN WG2 NR Ad hoc 1801 R2-1800895 Vancouver, Canada, Jan. 22-26, 2018 ; ; Source:vivo; Title:Discussion on the impact on beam failure recovery; Agenda Item:10.3.1.4.3.
R2-1801009_Huawei; 3GPP TSG-RAN2 Meeting #AH-1801; Vancouver, Canada, Jan. 22-26, 2018; Agenda Item: 10.3.1.4.3; Source: Huawei, HiSilicon; Title: General consideration on RA procedure for beam failure recovery; Document for:Discussion and decision.
R2-1801049_Huawei; 3GPP TSG-RAN WG2#AH-1801; Vancouver, Canada, Jan. 22-26, 2018; ; Source: Huawei, HiSilicon; Title: non-contention based random access for beam failure recovery in CA; Agenda Item:10.3.1.4.3.
R2-1801814_Huawei; 3GPP TSG-RAN WG2 #101; Athens, Greece, Feb. 26-Mar. 2, 2018; ; Agenda item:10.3.1.13; Source: Huawei, HiSilicon; Title: Beam failure recovery for SCell.
R2-1801926_ZTE_READ; 3GPP TSG RAN WG2 NR MEETING#101 Athens, Greece, Feb. 26-Mar. 2, 2018; ; Source:ZTE, Sanechips; Title:Remaining Considerations on RACH procedure for BFR; Agenda Item:10.3.1.4.2.
R2-1802143_CATT_MAYREAD; 3GPP TSG-RAN WG2#101; Athens, Greece, Feb.26-Mar. 2, 2018; ; Source:CATT; Title:RACH reattempt considering beam selection; Agenda Item:10.3.1.4.2.
R2-1802151_CATT_READ; 3GPP TSG-RAN WG2#101; Athens, Greece, Feb. 26-Mar. 2, 2018; ; Source:CATT ; Title:Beam failure recovery; Agenda Item:10.3.1.4.2.
R2-1802490_CATT+Huawei; 3GPP TSG-RAN WG2 Meeting#101; Athens, Greece, Feb. 26-Mar. 3, 2018; ; Agenda item:10.3.1.4.2; Source: CATT, Huawei, HiSilicon; Title: Discussions on beam failure recovery for CA.
R2-1803229_Nokia_READ; 3GPP TSG-RAN WG2 Meeting #101; Athens, Greece, Feb. 26-Mar. 2, 2018Revision of R2-1800961; ; ; Agenda item:10.3.1.4.2; Source:Nokia, Nokia Shanghai Bell.
R2-1804279_Asustek; 3GPP TSG-RAN WG2 Meeting #101bis ; Sanya, China, Apr. 16-20, 2018(Revision of R2-1801892); ; Agenda Item:10.3.1.4.2; Source: ASUSTeK; Title:UE behaviours upon beam failure and recovery.
R2-1804303_Samsung; 3GPP TSG-RAN2 101bis; Sanya, China, Apr. 16-Apr. 20, 2018; ; Agenda item:10.3.1.4.2; Source:Samsung; Title:MAC Impacts: Beam Failure Recovery for SCell.
R2-1804407—ZTE; 3GPP TSG-RAN WG2 Meeting #101bis; Sanya, China, Apr. 16-20, 2018; Source:ZTE, Sanechips; Title:Consideration on Beam Failure Recovery for SCell; Agenda Item:10.3.1.4.3.
R2-1804410—Huawei; 3GPP TSG-RAN WG2 #101bis; Sanya, China, Apr. 16-Apr. 20, 2018 Update of R2-1801814; Agenda item:10.3.1.2; Source: Huawei, HiSilicon; Title: Beam failure recovery using MAC CE.
R2-1804411—Huawei; 3GPP TSG-RAN WG2 #101bis; Sanya, China, Apr. 16-Apr. 20, 2018; Agenda item:10.3.1.2; Source: Huawei, HiSilicon; Title: BWP issues for BFR.
R2-1804434—OPPO_Read; 3GPP TSG-RAN2 #101 bis; Sanya, China, Apr. 16-Apr. 20, 2018; Agenda Item:10.3.1.4.2; Source:OPPO; Title:Issues on supporting SCell BFR RACH.

(56) References Cited

OTHER PUBLICATIONS

R2-1804481—CATT; 3GPP TSG-RAN WG2#101-bis; Sanya, China, Apr. 16-20, 2018; Source:CATT ; Title: Leftover issues for BFR; Agenda Item:10.3.1.4.2.
R2-1804482—CATT_Meeting; 3GPP TSG-RAN WG2#101-bis; Sanya, China, Apr. 16-20, 2018; Source:CATT; Title:BFR configurations and fallback options; Agenda Item:10.3.1.4.2.
R2-1804483—CATT; 3GPP TSG-RAN WG2#101bis; Sanya, China, Apr. 16-Apr. 20, 2018; Source:CATT; Title:BFR on SCell; Agenda Item:10.3.1.4.2.
R2-1804696—VIVO; 3GPP TSG-RAN WG2 Meeting #101 bis; Sanya, China, Apr. 16-Apr. 20, 2018; Source:vivo; Title:Discussion on the SCell BFR; Agenda Item:10.3.1.4.2.
R2-1805414—Ericsson; 3GPP TSG-RAN WG2 #101BisTdoc; Sanya, P.R. of China, Apr. 16-20, 2018; Agenda Item:10.3.1.4.2; Source:Ericsson; Title:Beam Failure Recovery in Scell and contention-based BFR on SpCell.
R2-1805896—Huawei_READ; 3GPP TSG-RAN WG2 Meeting 101bis; Sanya, China, Apr. 16-20, 2018; Agenda Item:10.4.1.3.1.1; Source: Huawei, HiSilicon; Title: ASN.1 for Beam Failure Recovery.
R2-1805905—Huawei; 3GPP TSG-RAN WG2 Meeting 102; Sanya, China, Apr. 16-Apr. 20, 2018; Agenda Item:10.3.1.4.2; Source: Huawei, HiSilicon; Title: Discussions on BFR for SCells BFR.
R2-1806120—ITL_Read; 3GPP TSG-RAN WG2 Meeting #101bis; Sanya, China, Apr. 16-20, 2018; Agenda Item:10.3.1.4.2; Source: ITL; Title: Beam Failure Recovery on SCell.
R2-1806166—Mediatek_READ; 3GPP TSG-RAN WG2 Meeting #101Bis; Sanya, China, Apr. 16-20, 2018; Agenda Item:10.3.1.4.3; Source:MediaTek Inc.; Title:On swtiching between CFRA and CBRA.
R2-1806819—Samsung; 3GPP TSG-RAN2 102; Busan, South Korea, May 21-May 25, 2018; Agenda item:10.3.1.4.2; Source:Samsung; Title:MAC Impacts: Beam Failure Recovery for SCell.
R2-1807405—ZTE; 3GPP TSG-RAN WG2 Meeting #102; Busan, Korea, May 21-25, 2018; Source:ZTE; Title: Discussion on the Beam failure recovery timer; Agenda Item:10.3.1.4.2.
R2-1807415—OPPO; 3GPP TSG-RAN2 Meeting #102; Busan, Korea, May 21-25, 2018; Agenda Item:10.3.1.4.2; Source: OPPO; Title:MAC impacts on supporting BFR procedure on SCell.
R2-1807444—Huawei; 3GPP TSG-RAN WG2 Meeting #102; Busan, Korea, May 21-25, 2018 Resubmission of R2-1804411; Agenda item:10.3.1.2; Source: Huawei, HiSilicon; Title: BWP switch for BFR.
R2-1807584—VIVO; 3GPP TSG-RAN WG2 Meeting #102; Busan, Korea,May 21-25, 2018revision of R2-1804696; Source:vivo; Title:Discussion on the SCell BFR; Agenda Item:10.3.1.4.2.
R2-1807961—Huawei; 3GPP TSG-RAN WG2 Meeting 102; Busan, Korea, May 21-25, 2018; Agenda item:10.4.1.3.1.1; Source: Huawei, HiSilicon; Title: Discussion on BFR—config for SCell BFR.
R2-1807975—Huawei; 3GPP TSG-RAN WG2 Meeting 102; Busan, Korea, May 21-May 25, 2018; Agenda item:10.3.1.4.2; Source: Huawei, HiSilicon; Title: Discussion on beam failure recovery for SCell.
R2-1808024—Nokia; 3GPP TSG-RAN WG2 Meeting #102; Busan, South Korea, May 21-25, 2018Revision of R2-1805342; Agenda item:10.3.1.4.2; Source:Nokia, Nokia Shanghai Bell.
R2-1808658—ITL; 3GPP TSG-RAN WG2 Meeting #102; Busan, Korea, May 21-25, 2018; Agenda Item:10.3.1.4.2; Source: ITL.
R2-1809515—CATT_Read; 3GPP TSG-RAN WG2 AH-1807; Montreal, Canada, Jul. 2-Jul. 6, 2018Revision of R2-1806991; Source:CATT; Title:Further issues with DL BWP switching for CFRA; Agenda Item:10.3.1.2.
R2-1809523—Further discussion on BFR termination criterion—final; 3GPP TSG-RAN WG2 AH-1807; Montreal, Canada, Jul. 2-Jul. 6, 2018Revision of R2-1808763; ; Source:CATT; Title:Further discussion on BFR termination criterion; Agenda Item:10.3.1.4.2.
R2-1809721—(R15 AI 103142 BWP switching for RA-BFR ); 3GPP TSG-RAN WG2 Meeting NR AH 1807; Montreal, Canada, Jul. 2-6, 2018; Agenda Item:10.3.1.4.2; Source:InterDigital; Title:BWP switching for RA-BFR; Document for:Discussion, Decision.
R2-1809872—VIVO_READ; 3GPP TSG-RAN WG2 Meeting #Ad hoc 1802; Montreal, Canada, Jul. 2-6, 2018; Source:vivo; Title:Remaining configuration issues for BFR; Agenda Item:10.4.1.3.1.1.
R2-1809894—VIVO_READ; 3GPP TSG-RAN WG2 NR AH1807 Meeting; Montreal, Canada, Jul. 2-6, 2018; Source:vivo; Title:Preamble Selection When CFRA Resource Available.
R2-1809925—OPPO_Mayread; 3GPP TSG-RAN2 #AH 1807; Montreal, Canada, Jul. 2, 2018-Jul. 6, 2018; Agenda Item:10.3.1.2; Source:OPPO; Title:The issue of BWP switching for BFR RACH.

* cited by examiner

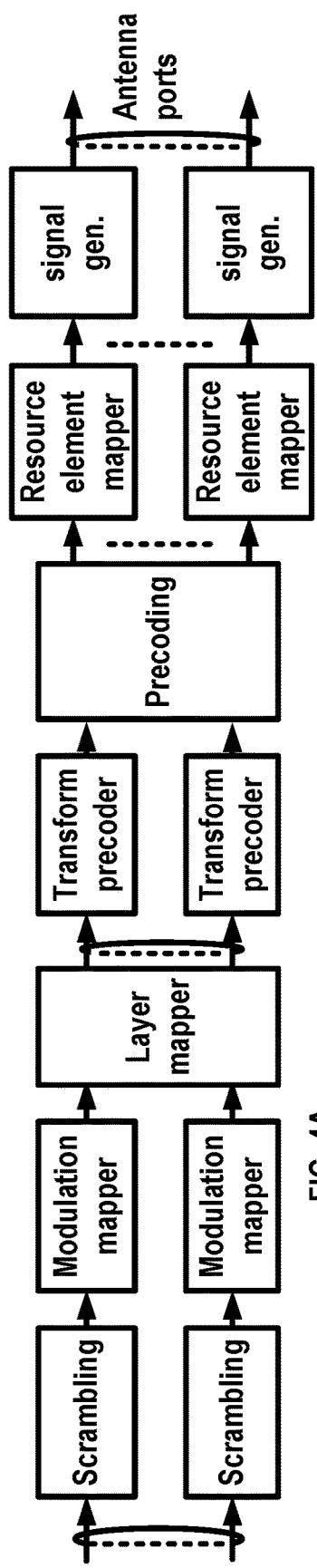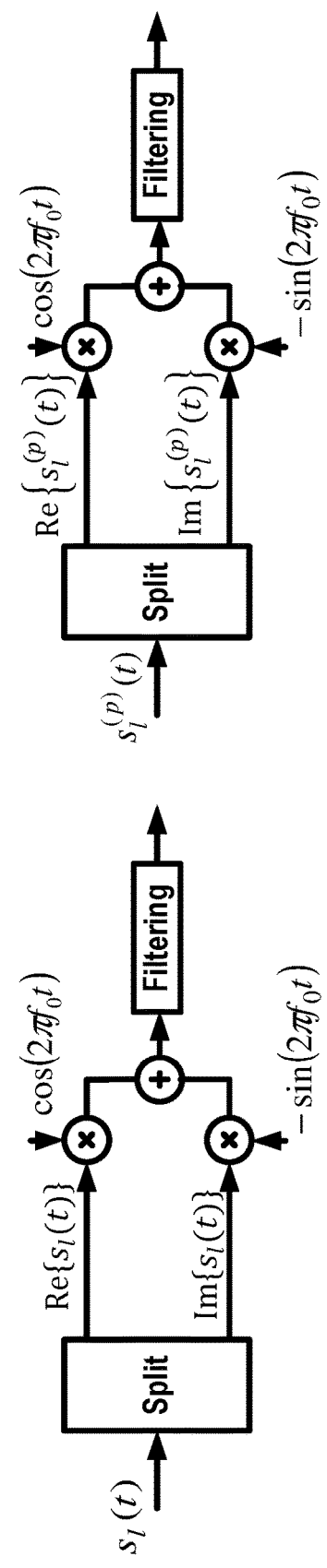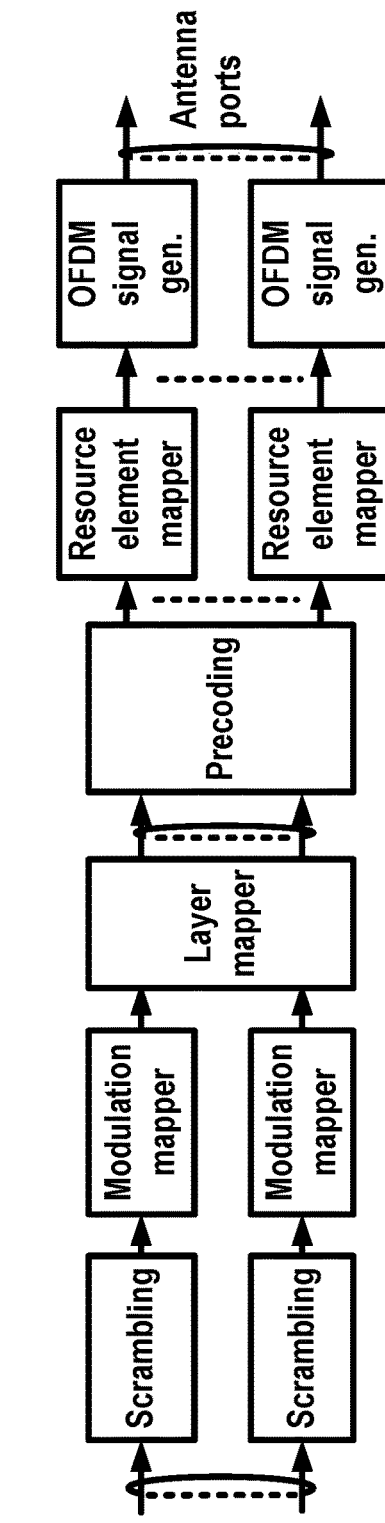
FIG. 4A
FIG. 4B
FIG. 4C
FIG. 4D

ACTIVE BANDWIDTH PART SWITCHING BASED ON BEAM FAILURE RECOVERY CONFIGURATION PARAMETERS OF ANOTHER CELL

CROSS-REFERENCE TO RELATED APPLICATIONS

This application is a continuation of U.S. patent application Ser. No. 17/092,275, filed Nov. 8, 2020, which is a continuation of U.S. patent application Ser. No. 16/530,211 filed Aug. 2, 2019, which claims the benefit of U.S. Provisional Application No. 62/715,372, filed Aug. 7, 2018, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
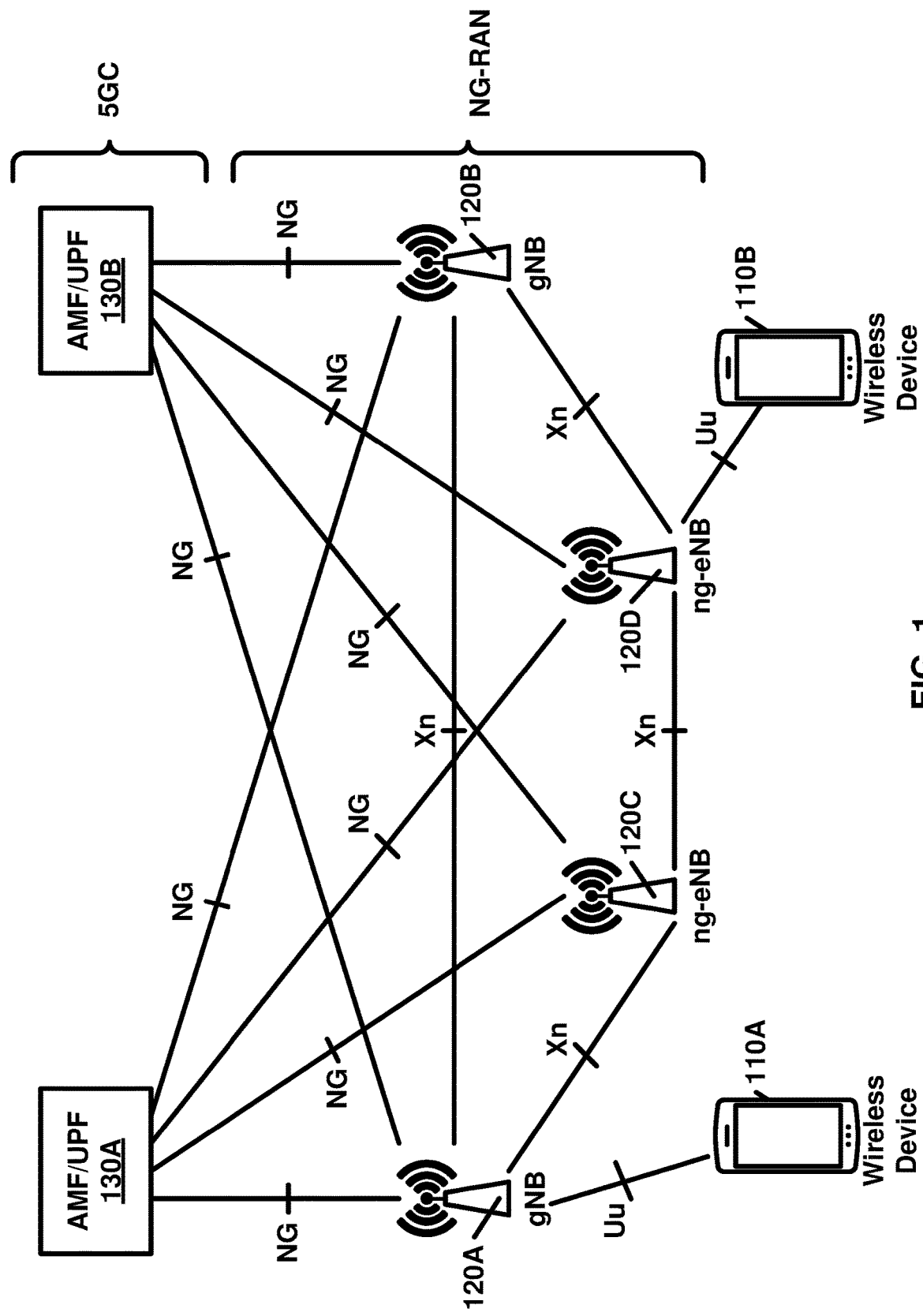
FIG. 1 is a diagram of an example RAN architecture as per an aspect of an embodiment of the present disclosure.

Example embodiments of the present disclosure enable operation of beam failure recovery procedure. Embodiments of the technology disclosed herein may be employed in the technical field of multicarrier communication systems. More particularly, the embodiments of the technology disclosed herein may relate to beam failure recovery procedure in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
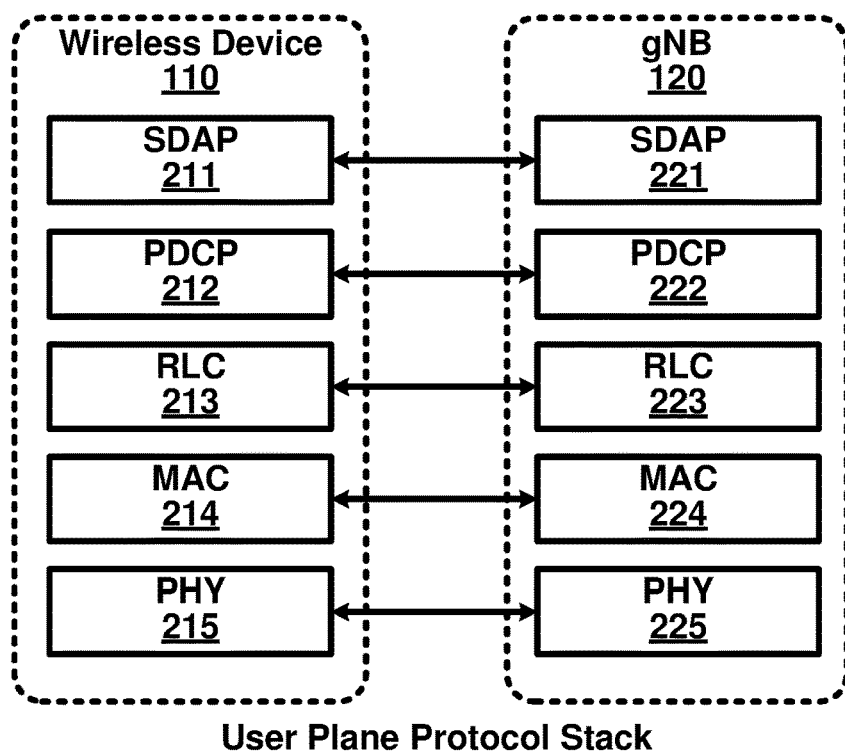
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
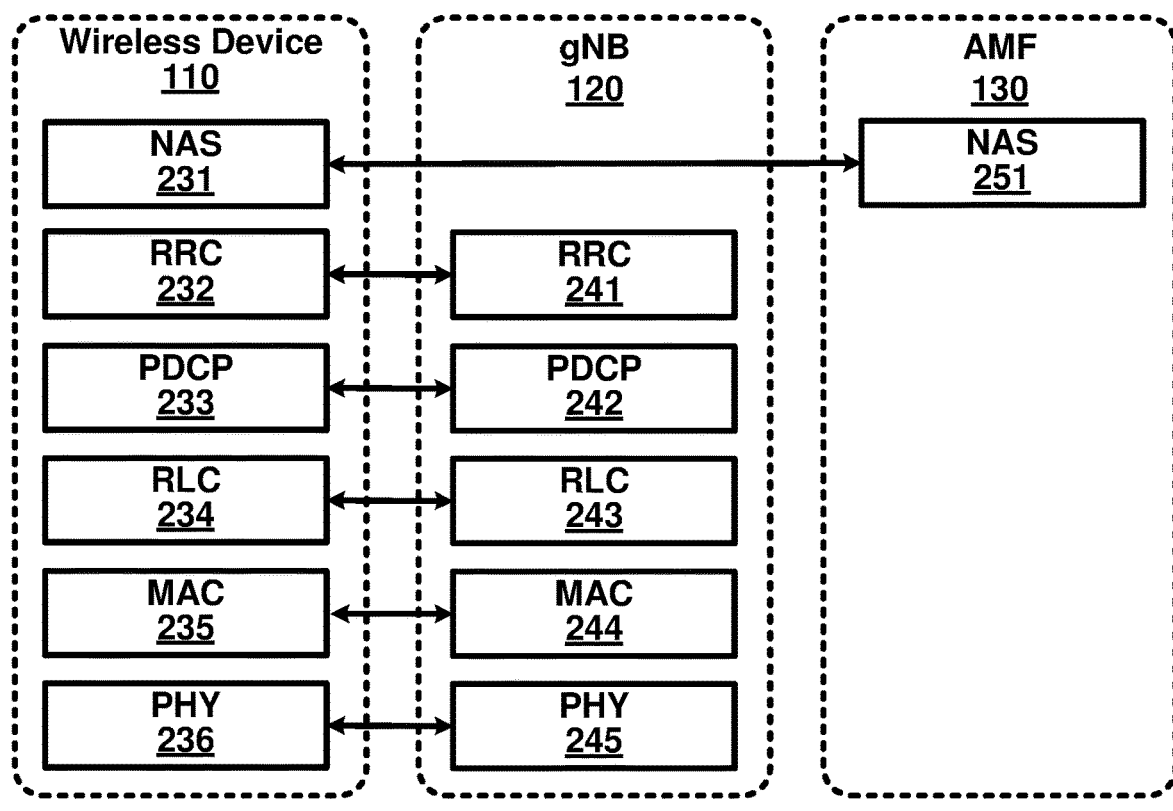
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
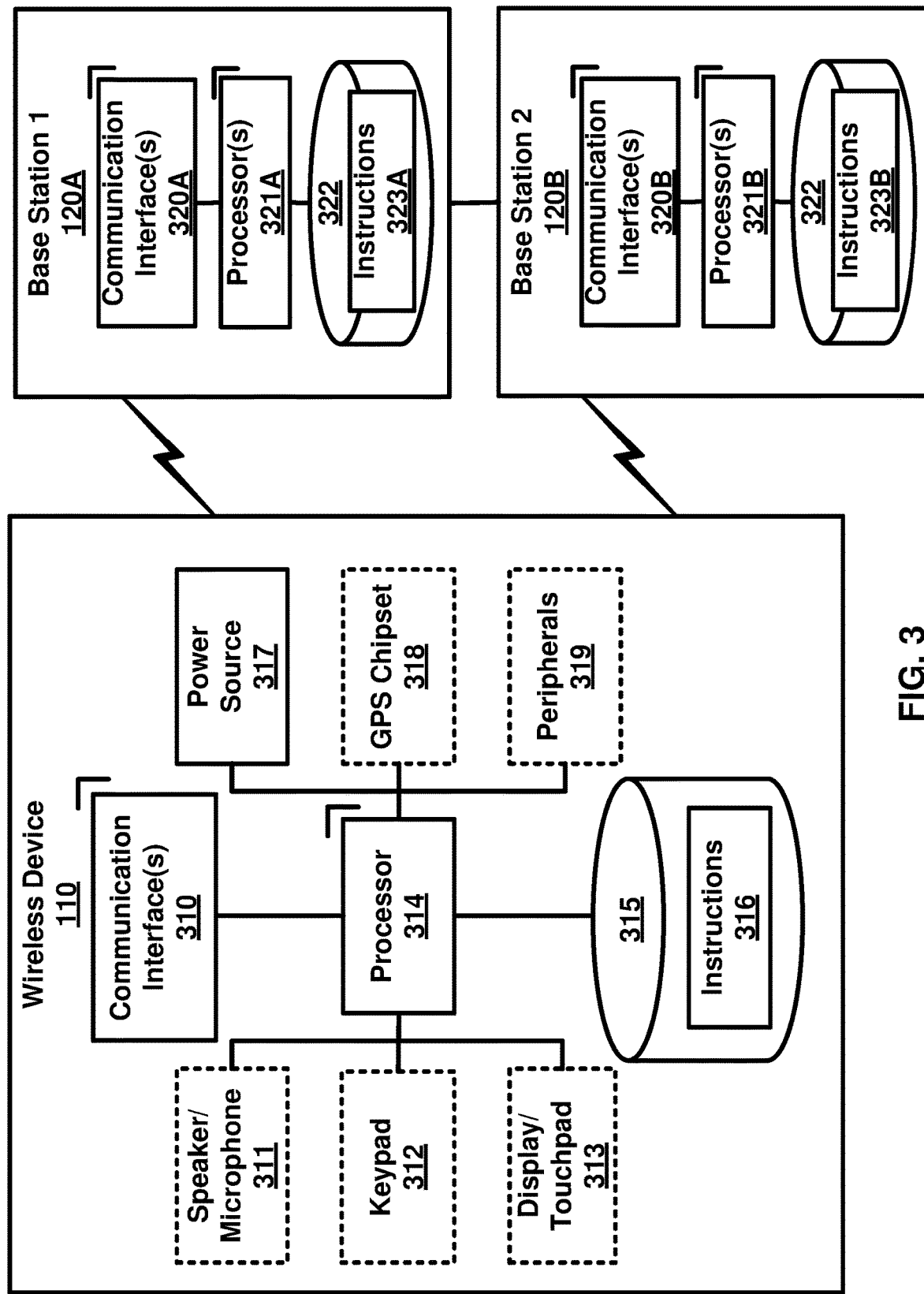
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
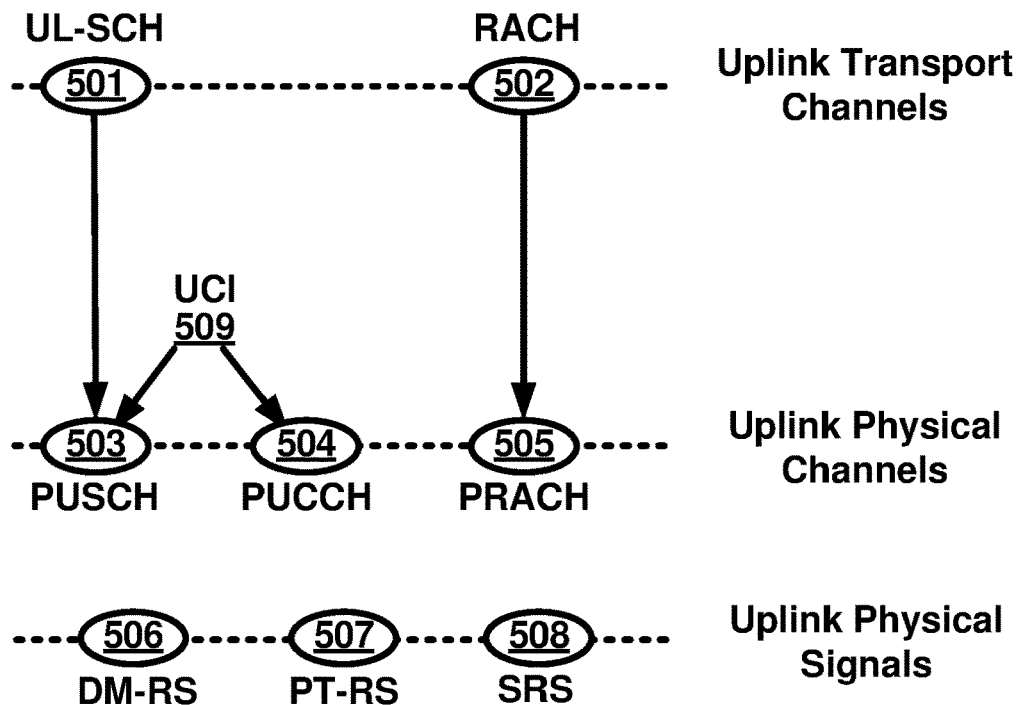
FIG. 5A is a diagram of an example uplink channel mapping and example uplink physical signals as per an aspect of an embodiment of the present disclosure.
Figure 5B:
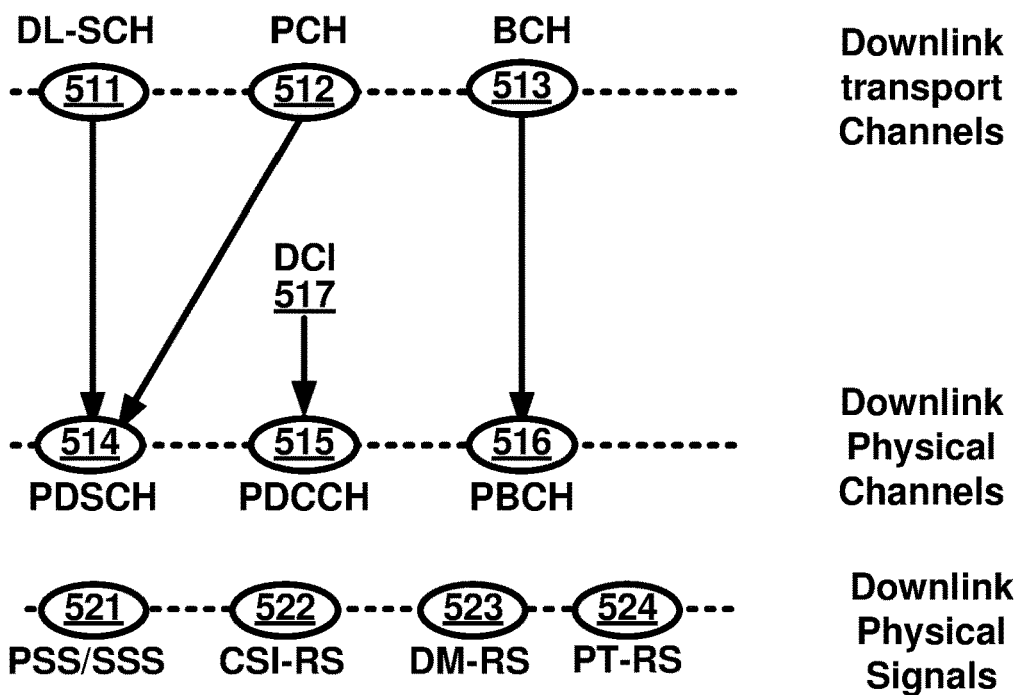
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
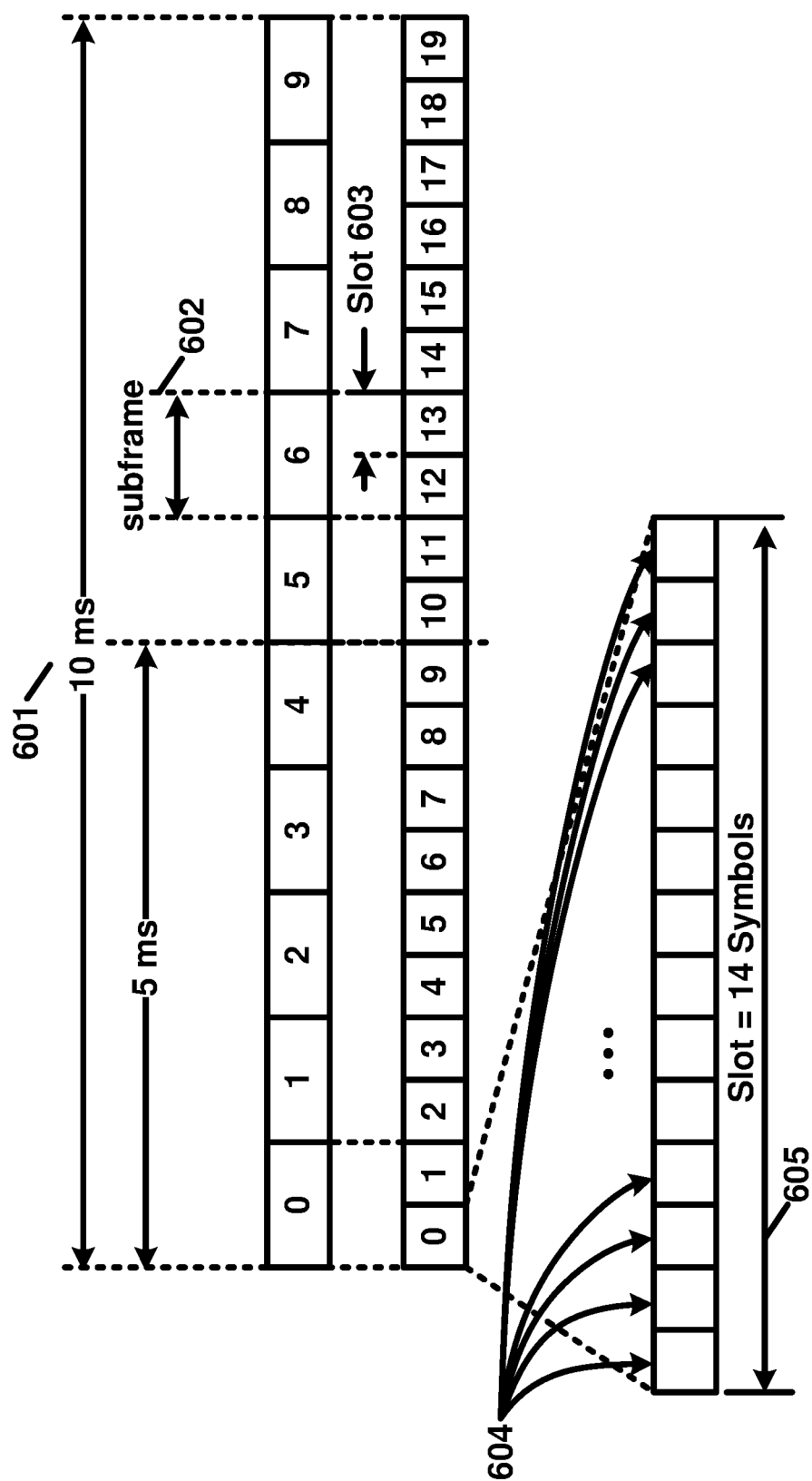
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
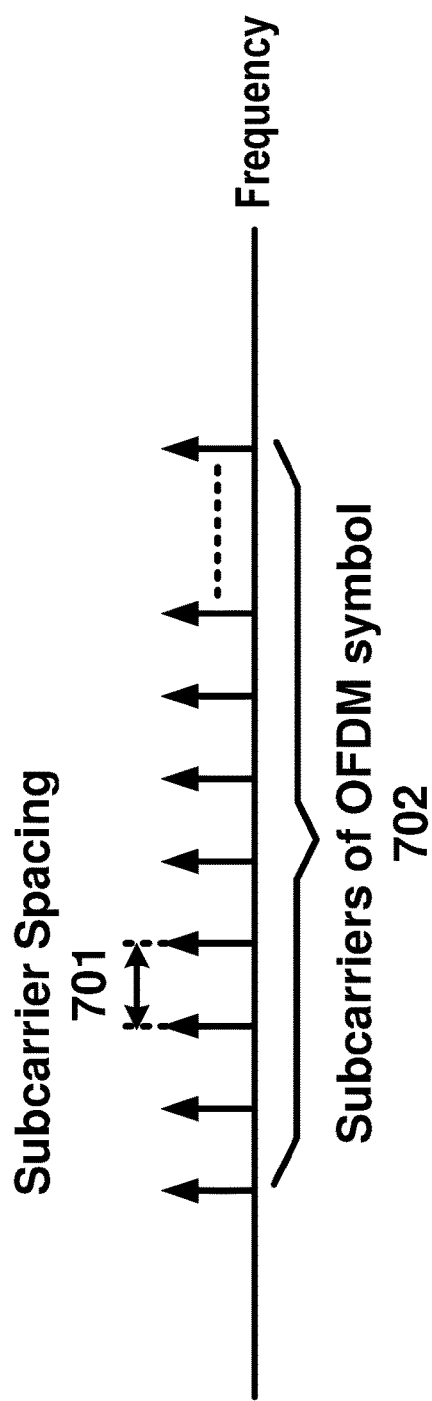
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
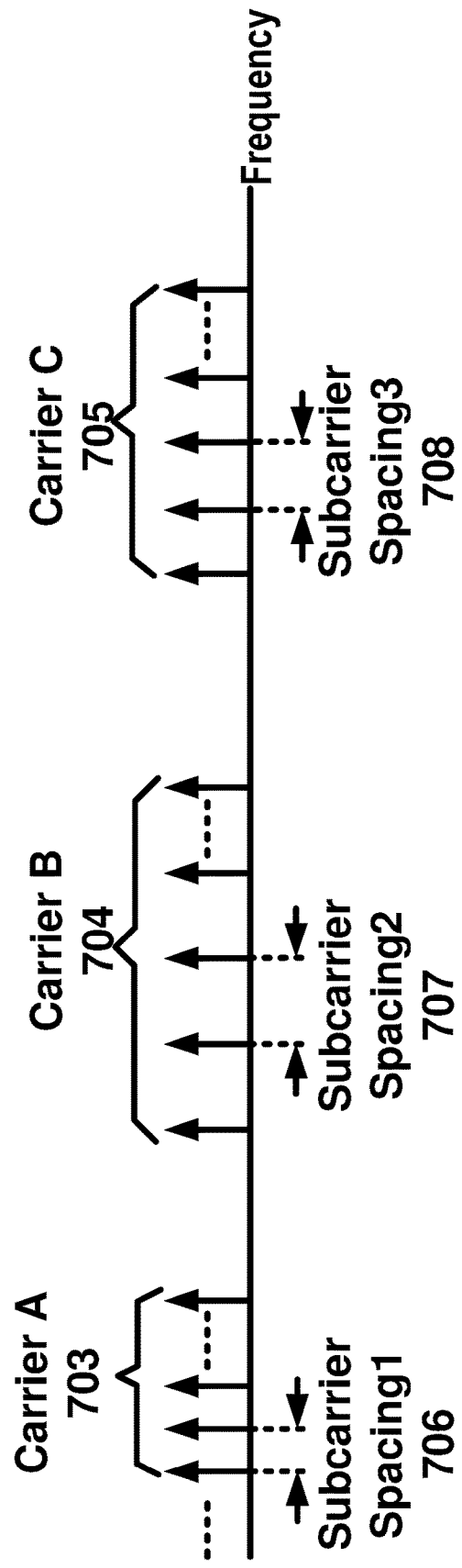

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
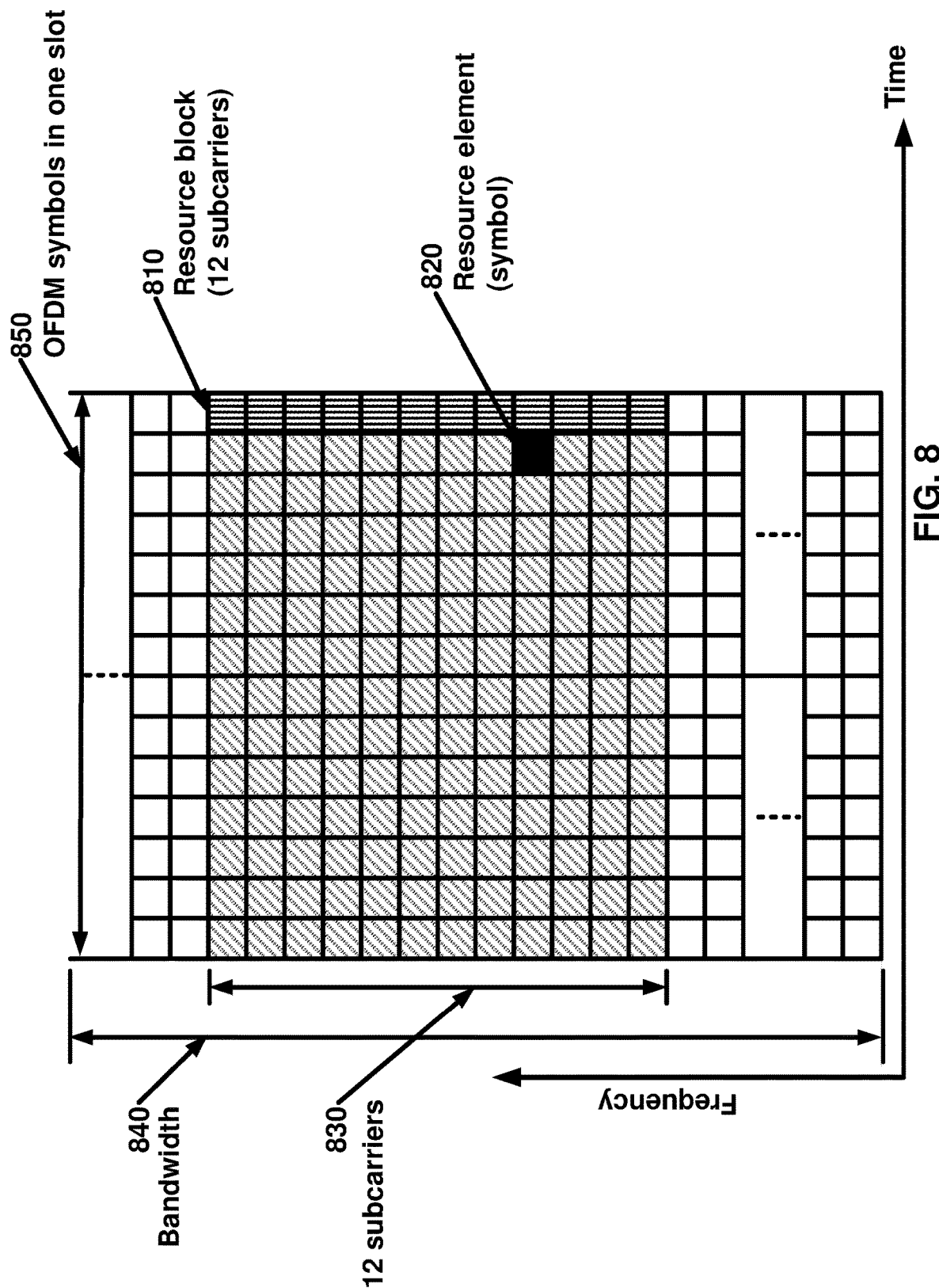
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
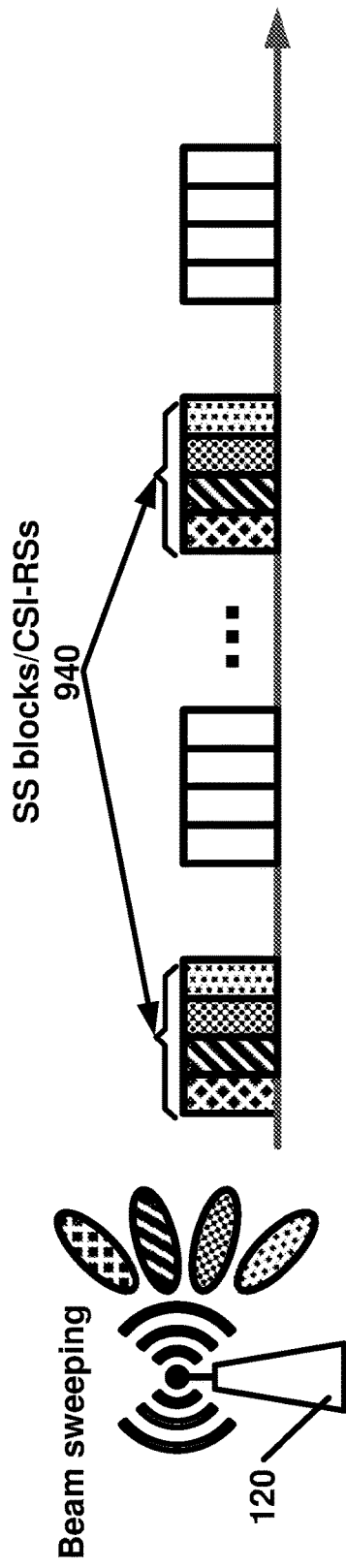
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
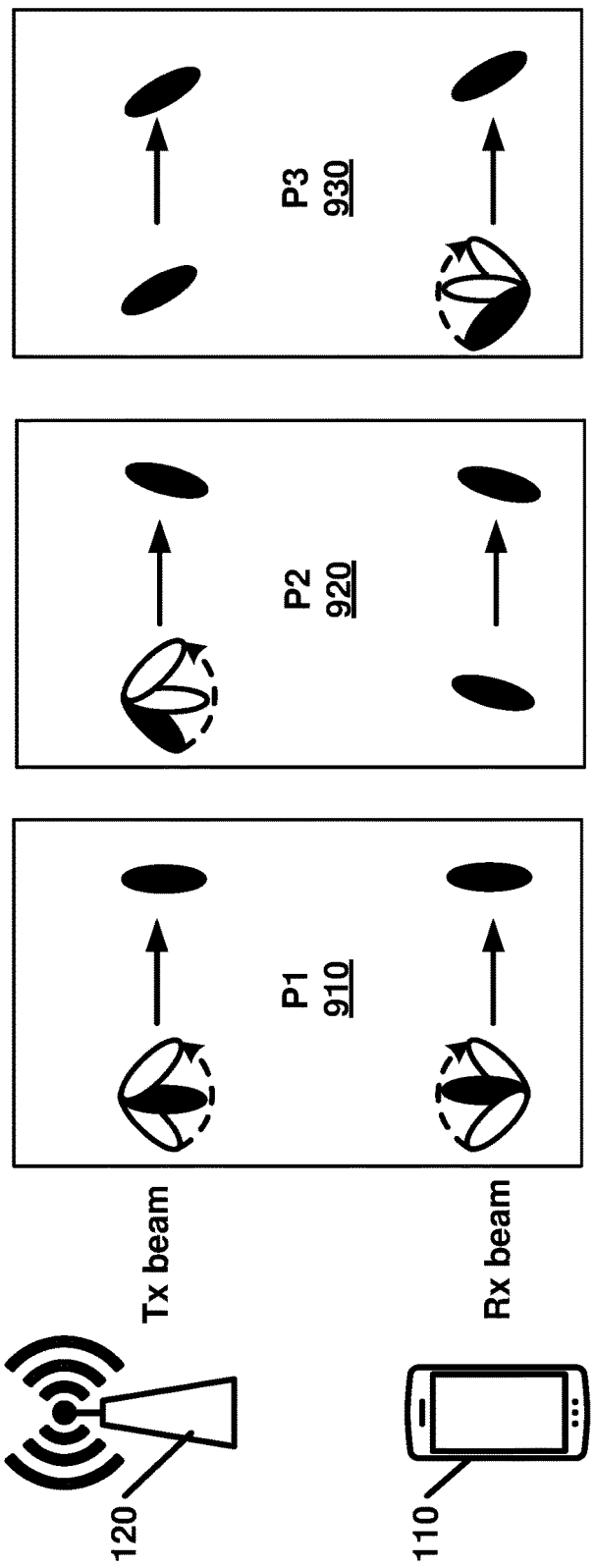
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
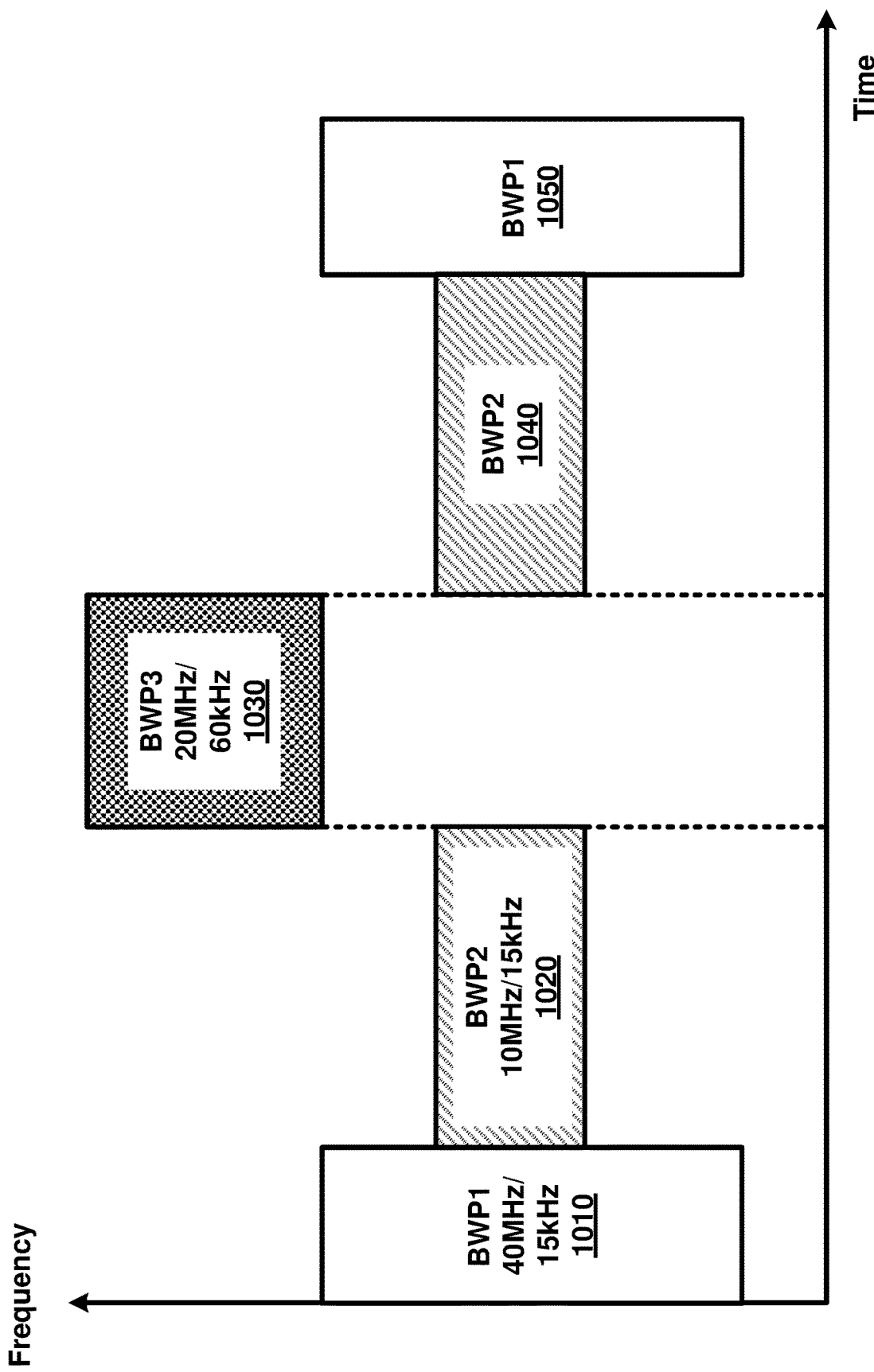
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
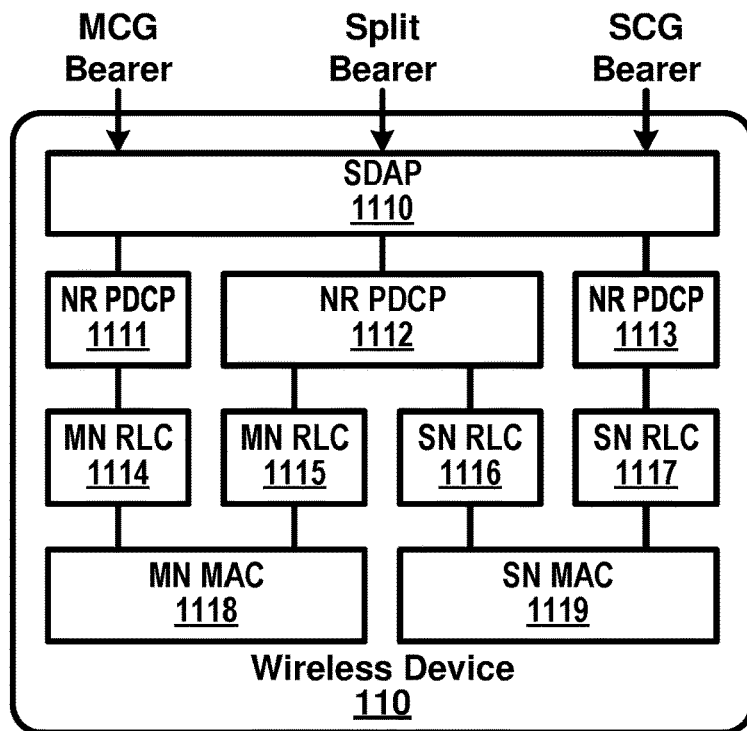
FIG. 11A, and FIG. 11B are diagrams of an example multi connectivity as per an aspect of an embodiment of the present disclosure.
Figure 11B:
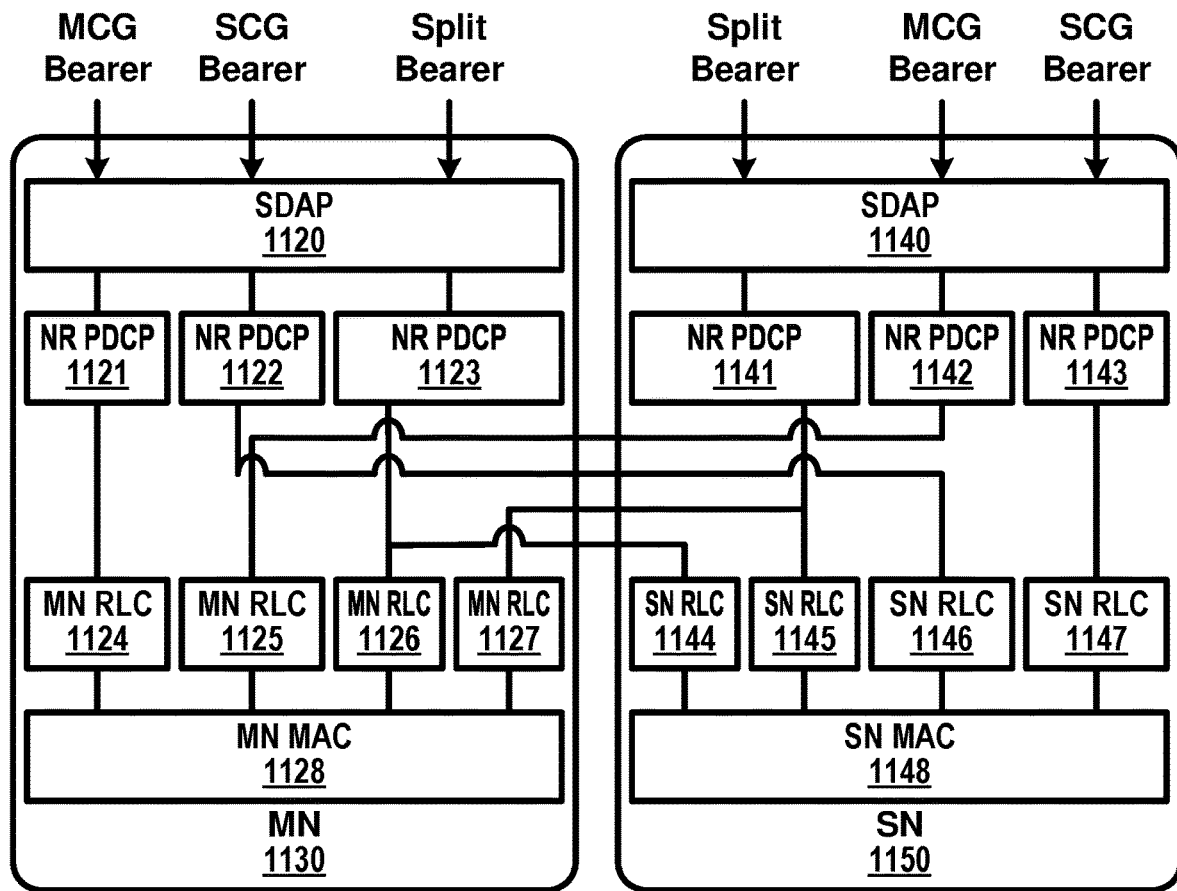

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
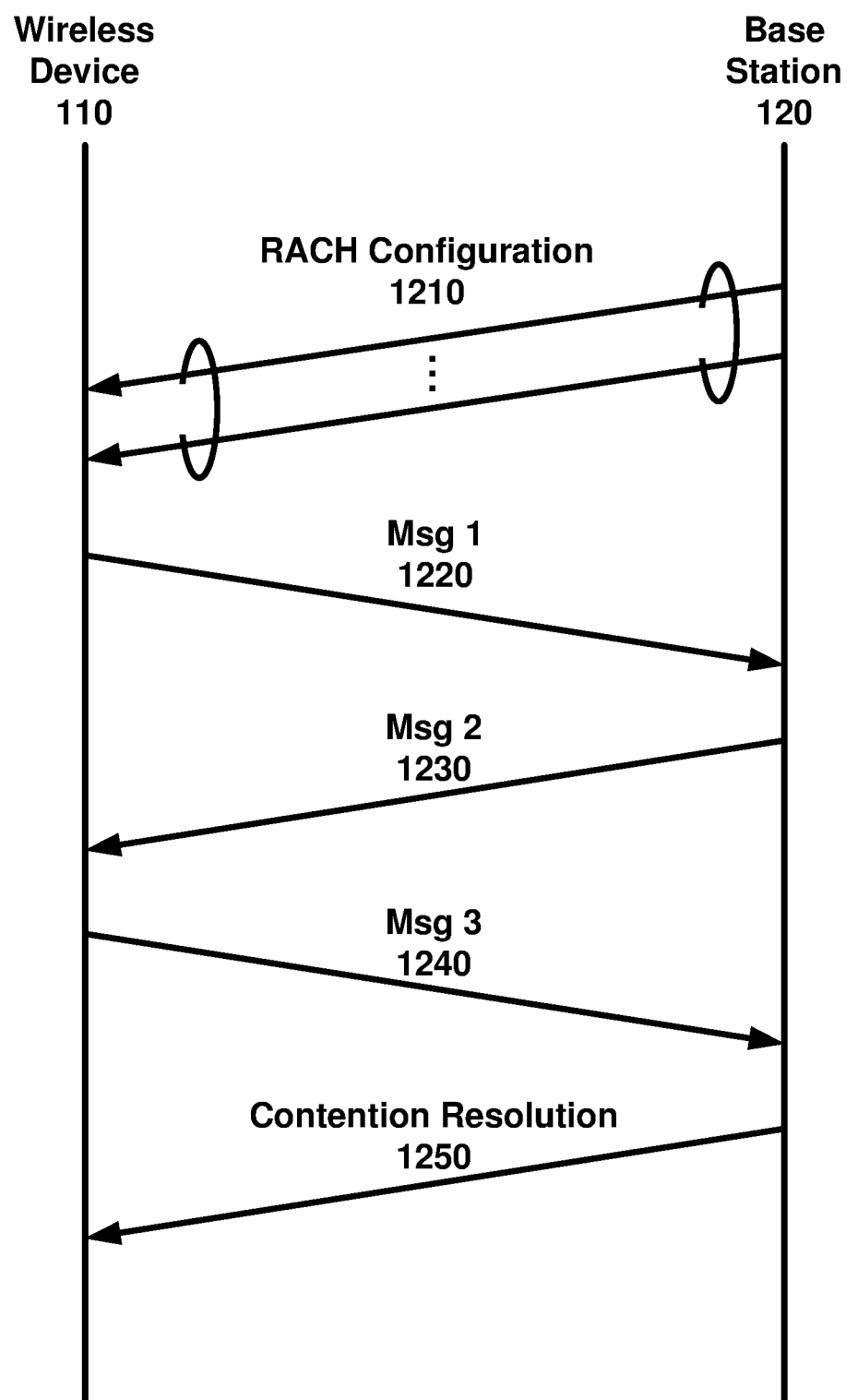
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
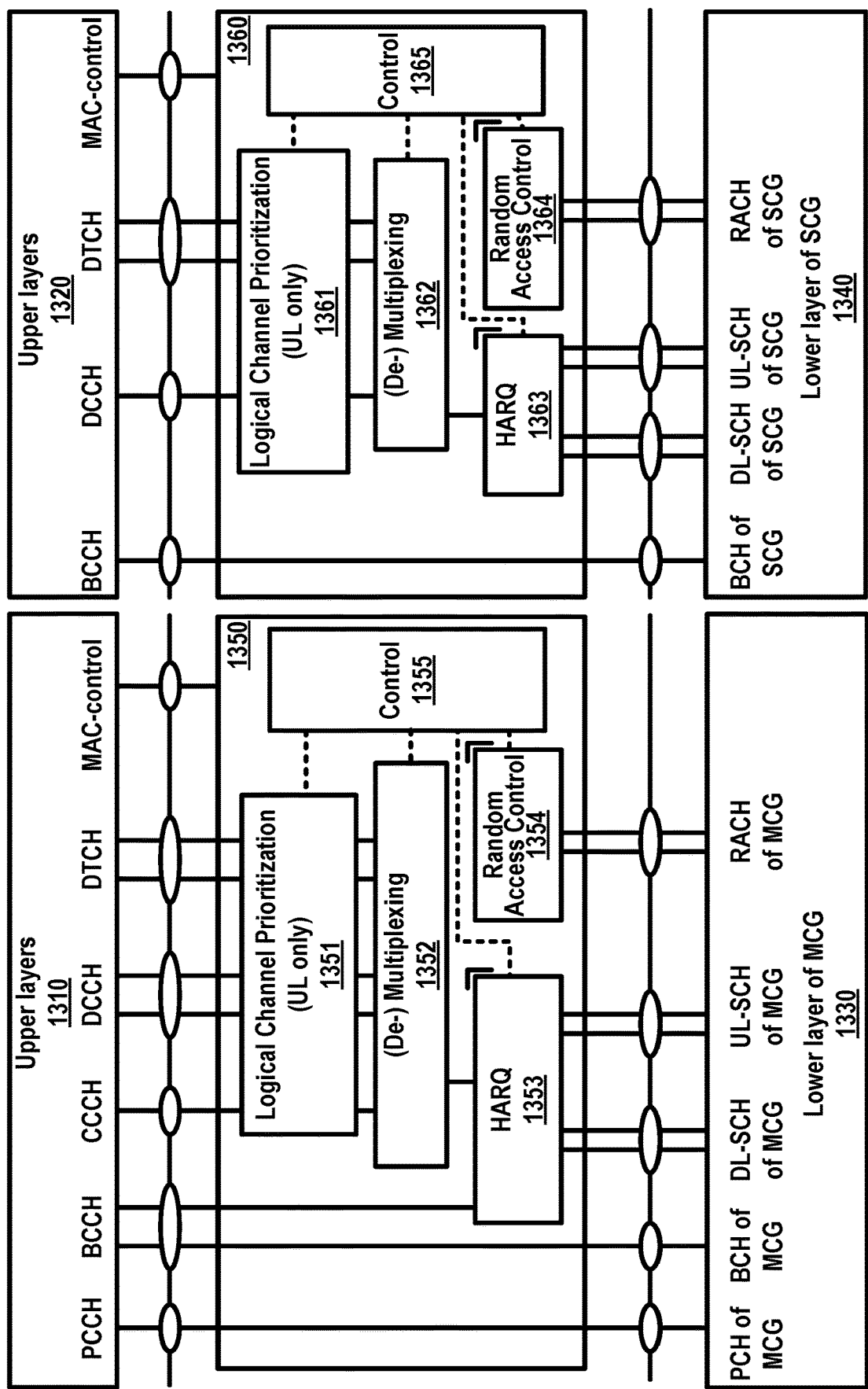
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
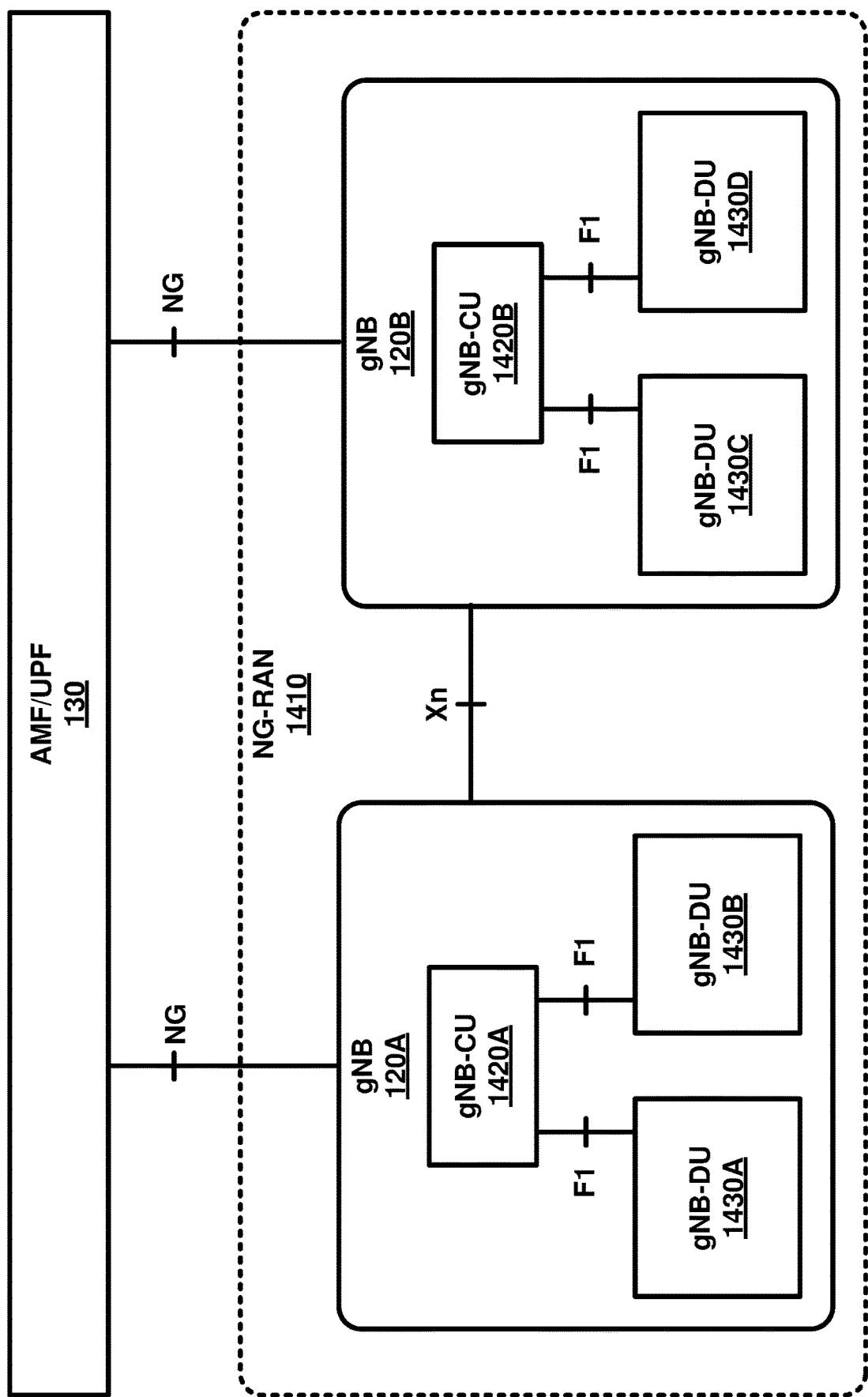
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
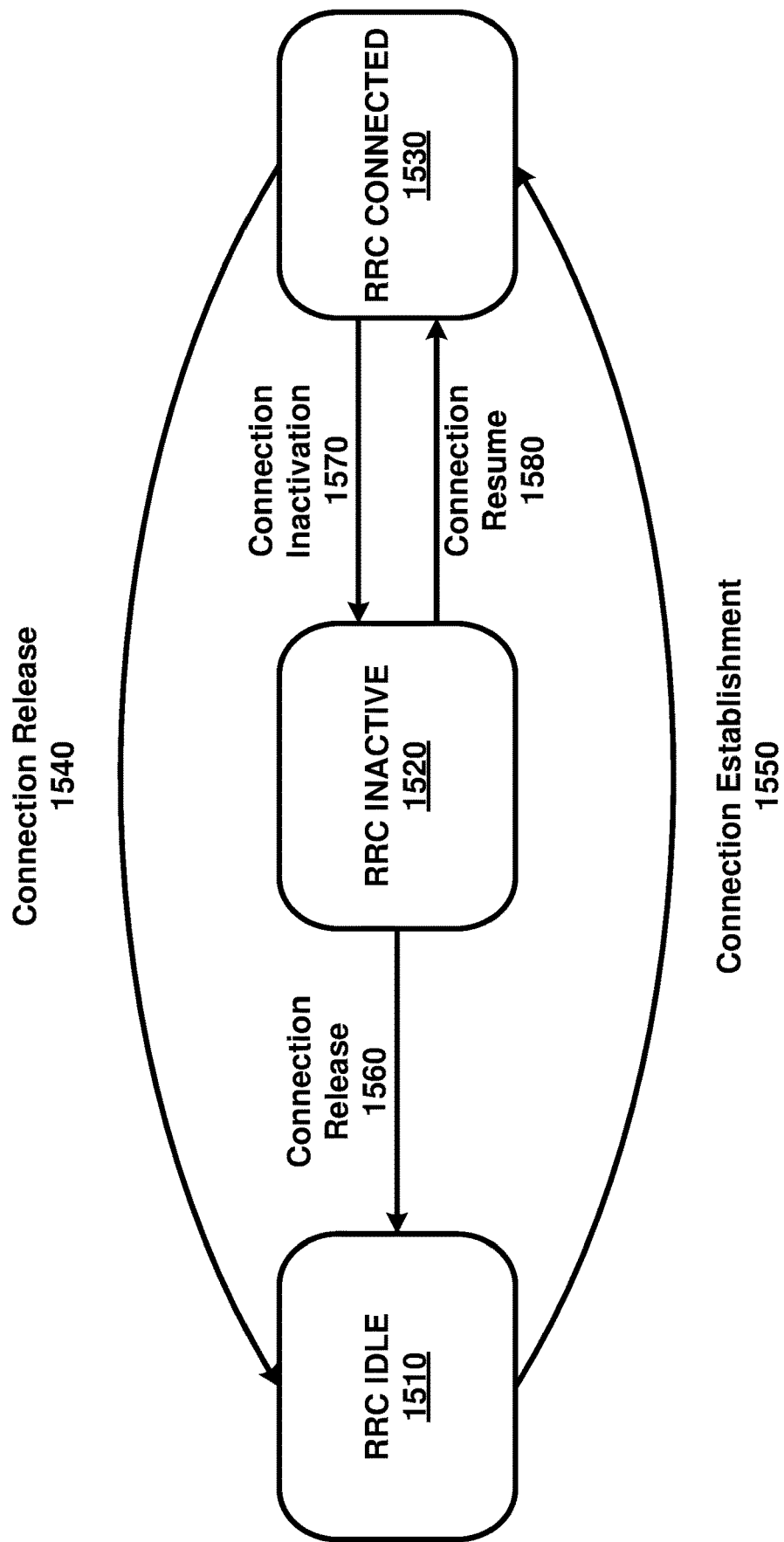
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission.

Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example Downlink Control Information (DCI)

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

A gNB may transmit one or more MAC PDU to a wireless device. In an example, a MAC PDU may be a bit string that is byte aligned (e.g., multiple of eight bits) in length. In an example, bit strings may be represented by tables in which the most significant bit is the leftmost bit of the first line of the table, and the least significant bit is the rightmost bit on the last line of the table, and more generally, the bit string may be read from the left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., multiple of eight bits) in length. In an example, a MAC SDU may be included into a MAC PDU from the first bit onward.

In an example, a MAC CE may be a bit string that is byte aligned (e.g., multiple of eight bits) in length.

In an example, a MAC subheader may be a bit string that is byte aligned (e.g., multiple of eight bits) in length. In an example, a MAC subheader may be placed immediately in front of the corresponding MAC SDU, or MAC CE, or padding.

In an example, a MAC entity may ignore a value of reserved bits in a DL MAC PDU.

In an example, a MAC PDU may comprise one or more MAC subPDUs. a MAC subPDU of the one or more MAC subPDUs may comprise at least one of: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, or a MAC CE, or padding.

In an example, a MAC subheader may comprise: an R field with one bit; a F field with one bit in length; a LCID field with multiple bits in length; a L field with multiple bits in length, when the MAC subheader corresponds to a MAC SDU, or a variable-sized MAC CE, or padding.

In an example, a MAC subheader may comprise an eight-bit L field. In the example, the LCID field may have six bits in length, and the L field may have eight bits in length. In an example, a MAC subheader may comprise a sixteen-bit L field. In the example, the LCID field may have six bits in length, and the L field may have sixteen bits in length.

In an example, a MAC subheader may comprise: a R field with two bits in length; and a LCID field with multiple bits in length, when the MAC subheader corresponds to a fixed sized MAC CE, or padding. In an example, the LCID field may have six bits in length, and the R field may have two bits in length.

In an example DL MAC PDU, multiple MAC CEs may be placed together. A MAC subPDU comprising MAC CE may be placed before any MAC subPDU comprising a MAC SDU, or a MAC subPDU comprising padding.

In an example UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

In an example, a MAC entity of a gNB may transmit to a MAC entity of a wireless device one or more MAC CEs. In an example, multiple LCIDs may be associated with the one or more MAC CEs. In the example, the one or more MAC CEs may comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; a SCell activation/deactivation MAC CE (1 Octet); a SCell activation/deactivation MAC CE (4 Octet); and/or a duplication activation/deactivation MAC CE. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a long DRX command MAC CE.

In an example, the MAC entity of the wireless device may transmit to the MAC entity of the gNB one or more MAC CEs. In an example, the one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a short-truncated command MAC CE.

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with a CA, a wireless device may have one RRC connection with a network. During an RRC connection establishment/re-establishment/handover, a cell providing a NAS mobility information may be a serving cell. During an RRC connection re-establishment/handover procedure, a cell providing a security input may be a serving cell. In an example, the serving cell may be referred to as a primary cell (PCell). In an example, a gNB may transmit, to a wireless device, one or more messages comprising configuration parameters of a plurality of one or more secondary cells (SCells), depending on capabilities of the wireless device.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCellDeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In an example, in response to the deactivating the activated SCell, the wireless device may clear one or more configured downlink assignments and/or one or more configured uplink grant Type 2 associated with the activated SCell. In an example, in response to the deactivating the activated SCell, the wireless device may further suspend one or more configured uplink grant Type 1 associated with the activated SCell. The wireless device may flush HARQ buffers associated with the activated SCell.

In an example, when an SCell is deactivated, a wireless device may not perform operations comprising transmitting SRS on the SCell, reporting CQI/PMI/RI/CRI for the SCell on a PCell, transmitting on UL-SCH on the SCell, transmitting on RACH on the SCell, monitoring at least one first PDCCH on the SCell, monitoring at least one second PDCCH for the SCell on the PCell, transmitting a PUCCH on the SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

In an example, an SCell Activation/Deactivation MAC CE may comprise one octet. A first MAC PDU subheader with a first LCID may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g. one).

In an example, an SCell Activation/Deactivation MAC CE may comprise four octets. A second MAC PDU subheader with a second LCID may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g. 31) and a fourth number of R-fields (e.g. 1).

In an example, a $C_i$ field may indicate an activation/deactivation status of an SCell with an SCell index i, if a SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In an example, an R field may indicate a reserved bit. The R field may be set to zero.

A base station may configure a wireless device with one or more TCI-States by higher layer signaling. A number of the one or more TCI states may depend on a capability of the wireless device. The wireless device may use the one or more TCI-States to decode a PDSCH according to a detected PDCCH. Each of the one or more TCI-States state may include one RS set TCI-RS-SetConfig. The one RS set TCI-RS-SetConfig may contain one or more parameters. In an example, the one or more parameters may be used to configure quasi co-location relationship between one or more reference signals in the RS set and the DM-RS port group of the PDSCH. The one RS set may contain a reference to either one or two DL RSs and an associated quasi co-location type (QCL-Type) for each one configured by the higher layer parameter QCL-Type. For the case of the two DL RSs, the QCL types may not be the same. In an example, the references of the two DL RSs may be to the same DL RS or different DL RSs. The quasi co-location types indicated to the UE may be based on a higher layer parameter QCL-Type. The higher layer parameter QCL-Type may take one or a combination of the following types: QCL-TypeA': {Doppler shift, Doppler spread, average delay, delay spread}; QCL-TypeB': {Doppler shift, Doppler spread}; QCL-TypeC': {average delay, Doppler shift} and QCL-TypeD': {Spatial Rx parameter}.

In an example, a wireless device may receive an activation command. The activation command may be used to map one or more TCI states to one or more codepoints of the DCI field Transmission Configuration Indication (TCI). After the wireless device receives a higher layer configuration of TCI states and before reception of the activation command, the wireless device may assume that one or more antenna ports of one DM-RS port group of PDSCH of a serving cell are spatially quasi co-located with an SSB. In an example, the SSB may be determined in an initial access procedure with respect to Doppler shift, Doppler spread, average delay, delay spread, spatial Rx parameters, where applicable.

In an example, a wireless device may be configured, by a base station, with a higher layer parameter TCI-PresentInDCI. When the higher layer parameter TCI-PresentInDCI is set as 'Enabled' for a CORESET scheduling a PDSCH, the wireless device may assume that the TCI field is present in a DL DCI of a PDCCH transmitted on the CORESET. When the higher layer parameter TCI-PresentInDCI is set as 'Disabled' for a CORESET scheduling a PDSCH or the PDSCH is scheduled by a DCI format 1_0, for determining PDSCH antenna port quasi co-location, the wireless device may assume that the TCI state for the PDSCH is identical to the TCI state applied for the CORESET used for the PDCCH transmission.

When the higher layer parameter TCI-PresentinDCI is set as 'Enabled', the wireless device may use one or more TCI-States according to a value of the 'Transmission Configuration Indication' field in the detected PDCCH with DCI for determining PDSCH antenna port quasi co-location. The wireless device may assume that the antenna ports of one DM-RS port group of PDSCH of a serving cell are quasi co-located with one or more RS(s) in the RS set with respect to the QCL type parameter(s) given by the indicated TCI state if the time offset between the reception of the DL DCI and the corresponding PDSCH is equal to or greater than a threshold Threshold-Sched-Offset. In an example, the threshold may be based on UE capability. When the higher layer parameter TCI-PresentInDCI='Enabled' and the higher layer parameter TCI-PresentInDCI='Disabled', if the offset between the reception of the DL DCI and the corresponding PDSCH is less than the threshold Threshold-Sched-Offset, the wireless device may assume that the antenna ports of one DM-RS port group of PDSCH of a serving cell are quasi co-located based on the TCI state used for PDCCH quasi co-location indication of the lowest CORESET-ID in the latest slot in which one or more CORESETs are configured for the UE. If all configured TCI states do not contain QCL-TypeD', the wireless device may obtain the other QCL assumptions from the indicated TCI states for its scheduled PDSCH irrespective of the time offset between the reception of the DL DCI and the corresponding PDSCH.

A gNB and/or a wireless device may have multiple antenna, to support a transmission with high data rate in a NR system. When configured with multiple antennas, a wireless device may perform one or more beam management procedures, as shown in FIG. 9B.

A wireless device may perform a downlink beam management based on one or more CSI-RSs, and/or one or more SSBs. In a beam management procedure, a wireless device may measure a channel quality of a beam pair link. The beam pair link may comprise a transmitting beam from a gNB and a receiving beam at the wireless device. When configured with multiple beams associated with multiple CSI-RSs or SSBs, a wireless device may measure the multiple beam pair links between the gNB and the wireless device.

In an example, a wireless device may transmit one or more beam management reports to a gNB. In a beam management report, the wireless device may indicate one or more beam pair quality parameters, comprising at least, one or more beam identifications; RSRP; PMI/CQI/RI of at least a subset of configured multiple beams.

In an example, a gNB and/or a wireless device may perform a downlink beam management procedure on one or multiple Transmission and Receiving Point (TRPs), as shown in FIG. 9B. Based on a wireless device's beam management report, a gNB may transmit to the wireless device a signal indicating that a new beam pair link is a serving beam. The gNB may transmit PDCCH and PDSCH to the wireless device using the serving beam.

In an example, a wireless device or a gNB may trigger a beam failure recovery mechanism. A wireless device may trigger a beam failure recovery (BFR) procedure, e.g., when at least a beam failure occurs. In an example, a beam failure may occur when quality of beam pair link(s) of at least one PDCCH falls below a threshold. The threshold may be a RSRP value (e.g., −140 dbm, −110 dbm) or a SINR value (e.g., −3 dB, −1 dB), which may be configured in a RRC message.

Figure 16A:
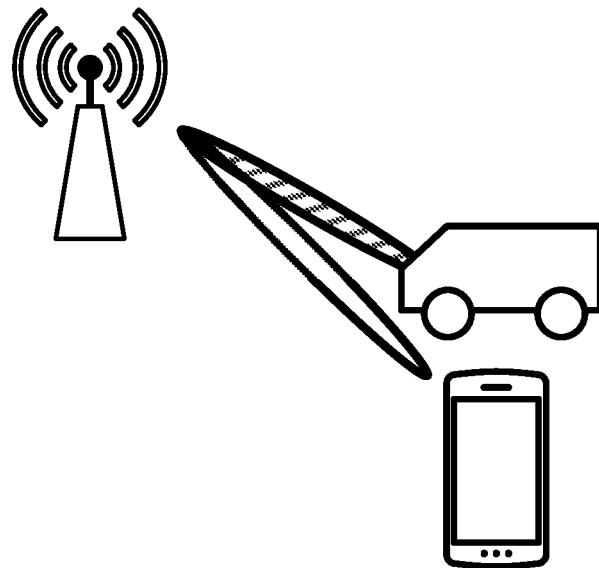
FIG. 16A and FIG. 16B are examples of downlink beam failure as per an aspect of an embodiment of the present disclosure.

FIG. 16A shows example of a first beam failure scenario. In the example, a gNB may transmit a PDCCH from a transmission (Tx) beam to a receiving (Rx) beam of a wireless device from a TRP. When the PDCCH on the beam pair link (between the Tx beam of the gNB and the Rx beam of the wireless device) have a lower-than-threshold RSRP/SINR value due to the beam pair link being blocked (e.g., by a moving car or a building), the gNB and the wireless device may start a beam failure recovery procedure on the TRP.

Figure 16B:
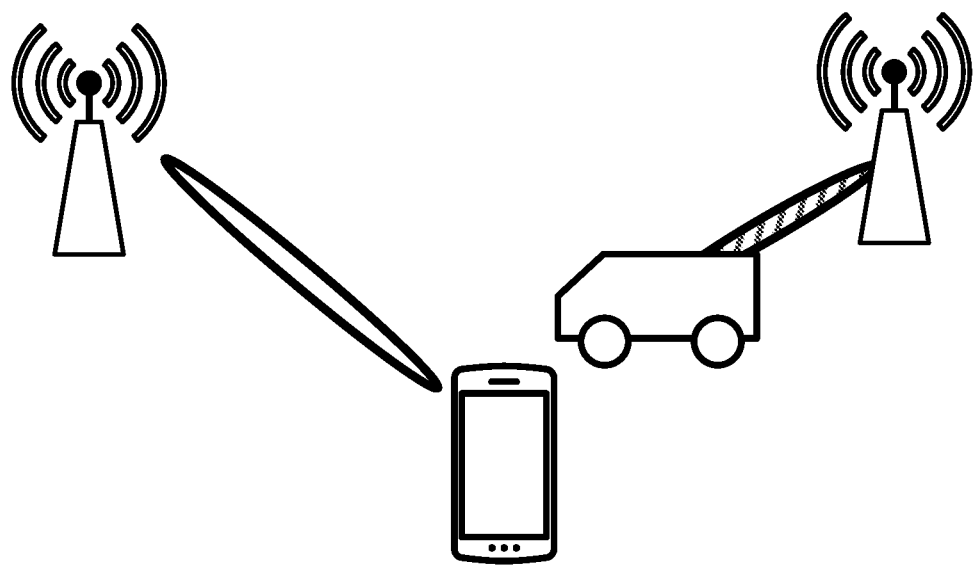

FIG. 16B shows example of a second beam failure scenario. In the example, the gNB may transmit a PDCCH from a beam to a wireless device from a first TRP. When the PDCCH on the beam is blocked, the gNB and the wireless device may start a beam failure recovery procedure on a new beam on a second TRP.

In an example, a wireless device may measure quality of beam pair link using one or more RSs. The one or more RSs may be one or more SSBs, or one or more CSI-RS resources. A CSI-RS resource may be identified by a CSI-RS resource index (CRI). In an example, quality of beam pair link may be defined as a RSRP value, or a reference signal received quality (e.g. RSRQ) value, and/or a CSI (e.g., SINR) value measured on RS resources. In an example, a gNB may indicate whether an RS resource, used for measuring beam pair link quality, is QCLed (Quasi-Co-Located) with DM-RSs of a PDCCH. The RS resource and the DM-RSs of the PDCCH may be called QCLed when the channel characteristics from a transmission on an RS to a wireless device, and that from a transmission on a PDCCH to the wireless device, are similar or same under a configured criterion. In an example, The RS resource and the DM-RSs of the PDCCH may be called QCLed when doppler shift and/or doppler shift of the channel from a transmission on an RS to a wireless device, and that from a transmission on a PDCCH to the wireless device, are same.

In an example, a wireless device may monitor PDCCH on M beam (e.g. 2, 4, 8) pair links simultaneously, where M≥1 and the value of M may depend at least on capability of the wireless device. In an example, monitoring a PDCCH may comprise detecting a DCI via the PDCCH transmitted on common search spaces and/or wireless device specific search spaces. In an example, monitoring multiple beam pair links may increase robustness against beam pair link blocking. In an example, a gNB may transmit one or more messages comprising parameters indicating a wireless device to monitor PDCCH on different beam pair link(s) in different OFDM symbols.

In an example, a gNB may transmit one or more RRC messages or MAC CEs comprising parameters indicating Rx beam setting of a wireless device for monitoring PDCCH on multiple beam pair links. A gNB may transmit an indication of spatial QCL between an DL RS antenna port(s) and DL RS antenna port(s) for demodulation of DL control channel. In an example, the indication may be a parameter in a MAC CE, or an RRC message, or a DCI, and/or combination of these signaling.

In an example, for reception of data packet on a PDSCH, a gNB may indicate spatial QCL parameters between DL RS antenna port(s) and DM-RS antenna port(s) of DL data channel. A gNB may transmit DCI comprising parameters indicating the RS antenna port(s) QCL-ed with DM-RS antenna port(s).

In an example, when a gNB transmits a signal indicating QCL parameters between CSI-RS and DM-RS for PDCCH, a wireless device may measure a beam pair link quality based on CSI-RSs QCLed with DM-RS for PDCCH. In an example, when multiple contiguous beam failures occur, the wireless device may start a BFR procedure.

In an example, a wireless device transmits a BFR signal on an uplink physical channel to a gNB when starting a BFR procedure. The gNB may transmit a DCI via a PDCCH in a coreset in response to receiving the BFR signal on the uplink physical channel. The wireless may consider the BFR procedure successfully completed when receiving the DCI via the PDCCH in the coreset.

In an example, a gNB may transmit one or more messages comprising configuration parameters of an uplink physical channel or signal for transmitting a beam failure recovery request. The uplink physical channel or signal may be based on one of: a contention-free PRACH (BFR-PRACH), which may be a resource orthogonal to resources of other PRACH transmissions; a PUCCH (BFR-PUCCH); and/or a contention-based PRACH resource (CF-PRACH). Combinations of these candidate signal/channels may be configured by the gNB. In an example, when configured with multiple resources for a BFR signal, a wireless device may autonomously select a first resource for transmitting the BFR signal. In an example, when configured with a BFR-PRACH resource, a BFR-PUCCH resource, and a CF-PRACH resource, the wireless device may select the BFR-PRACH resource for transmitting the BFR signal. In an example, when configured with a BFR-PRACH resource, a BFR-PUCCH resource, and a CF-PRACH resource, the gNB may transmit a message to the wireless device indicating a resource for transmitting the BFR signal.

In an example, a gNB may transmit a response to a wireless device after receiving one or more BFR signals. The response may comprise the CRI associated with the candidate beam the wireless device indicates in the one or multiple BFR signals.

In an NR system, when configured with multiple beams, a gNB and/or a wireless device may perform one or more beam management procedure. For example, the wireless device may perform a BFR procedure, if one or more beam pair links between the gNB and the wireless device fail.

Figure 17:
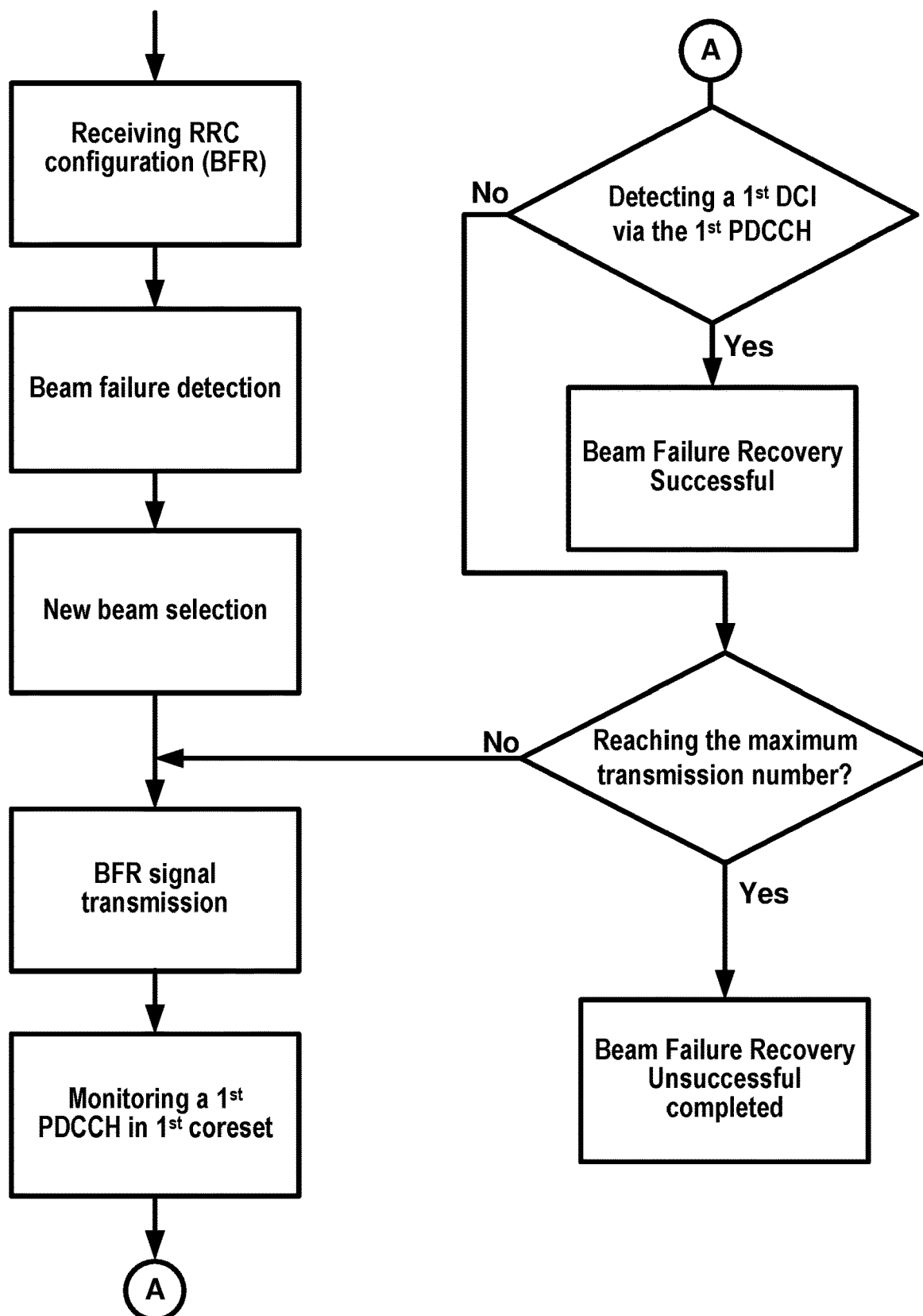
FIG. 17 is an example flowchart of a downlink beam failure recovery procedure as per an aspect of an embodiment of the present disclosure.

FIG. 17 shows an example flowchart of the BFR procedure. A wireless device may receive one or more RRC messages comprising BFR parameters. The one or more RRC messages may comprise an RRC message (e.g. RRC connection reconfiguration message, or RRC connection reestablishment message, or RRC connection setup message). The wireless device may detect at least one beam failure according to at least one of BFR parameters. The wireless device may start a first timer if configured in response to detecting the at least one beam failure. The wireless device may select a selected beam in response to detecting the at least one beam failure. The selected beam may be a beam with good channel quality (e.g., RSRP, SINR, or BLER) from a set of candidate beams. The candidate beams may be identified by a set of reference signals (e.g., SSBs, or CSI-RSs). The wireless device may transmit at least a first BFR signal to a gNB in response to the selecting the selected beam. The at least first BFR signal may be associated with the selected beam. The at least first BFR signal may be a preamble transmitted on a PRACH resource, or a beam failure request (e.g., similar to scheduling request) signal transmitted on a PUCCH resource, or a beam indication transmitted on a PUCCH/PUSCH resource. The wireless device may transmit the at least first BFR signal with a transmission beam corresponding to a receiving beam associated with the selected beam. The wireless device may start a response window in response to transmitting the at least first BFR signal. In an example, the response window may be a timer with a value configured by the gNB. When the response window is running, the wireless device may monitor a PDCCH in a first coreset. The first coreset may be associated with the BFR procedure. In an example, the wireless device may monitor the PDCCH in the first coreset in condition of transmitting the at least first BFR signal. The wireless device may receive a first DCI via the PDCCH in the first coreset when the response window is running. The wireless device may consider the BFR procedure successfully completed when receiving the first DCI via the PDCCH in the first coreset before the response window expires. The wireless device may stop the first timer if configured in response to the BFR procedure successfully being completed. The wireless device may stop the response window in response to the BFR procedure successfully being completed.

In an example, when the response window expires, and the wireless device does not receive the DCI, the wireless device may increment a transmission number, wherein, the transmission number is initialized to a first number (e.g., 0) before the BFR procedure is triggered. If the transmission number indicates a number less than the configured maximum transmission number, the wireless device may repeat one or more actions comprising at least one of: a BFR signal transmission; starting the response window; monitoring the PDCCH; incrementing the transmission number if no response received during the response window is running. If the transmission number indicates a number equal or greater than the configured maximum transmission number, the wireless device may declare the BFR procedure is unsuccessfully completed.

A MAC entity of a wireless device may be configured by an RRC with a beam failure recovery procedure. The beam failure recovery procedure may be used for indicating to a serving base station of a new (e.g., candidate) SSB or CSI-RS when a beam failure is detected. The beam failure may be detected on one or more serving SSB(s)/CSI-RS(s) of the serving base station. In an example, the beam failure may be detected by counting a beam failure instance indication from a lower layer of the wireless device (e.g. PHY layer) to the MAC entity.

In an example, an RRC may configure a wireless device with one or more parameters in BeamFailureRecoveryConfig for a beam failure detection and recovery procedure. The one or more parameters may comprise at least: beamFailureInstanceMaxCount for a beam failure detection; beamFailureDetectionTimer for the beam failure detection; beamFailureRecoveryTimer for the beam failure recovery procedure; rsrp-ThresholdSSB: an RSRP threshold for a beam failure recovery; PowerRampingStep for the beam failure recovery; preambleReceivedTargetPower for the beam failure recovery; preambleTxMax for the beam failure recovery; and ra-ResponseWindow. The ra-ResponseWindow may be a time window to monitor one or more responses for the beam failure recovery using a contention-free Random Access preamble.

Figure 18:
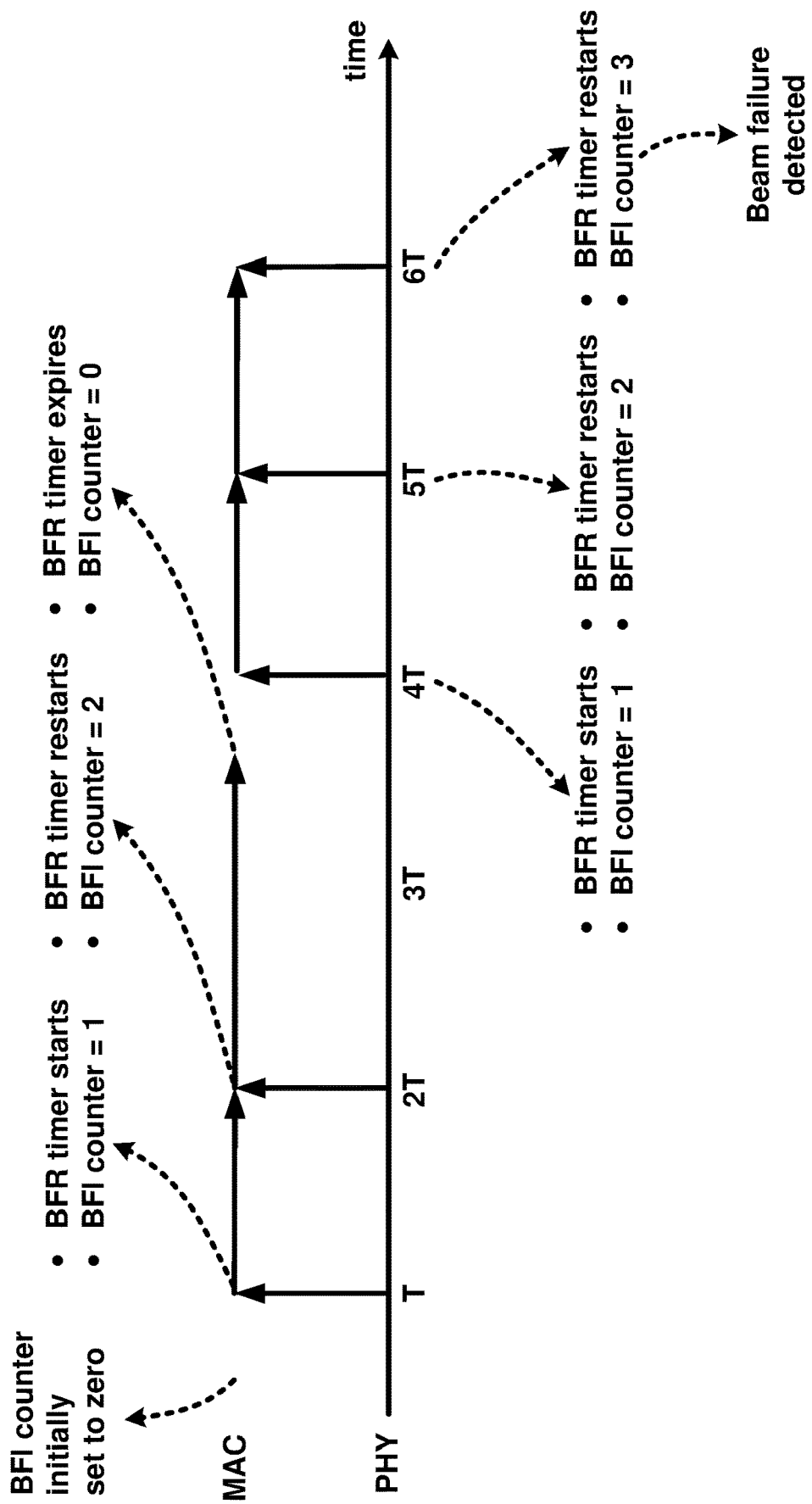
FIG. 18 is an example of downlink beam failure instance indication as per an aspect of an embodiment of the present disclosure.

FIG. 18 shows an example of beam failure instance (BFI) indication. In an example, a wireless device may use at least one UE variable for a beam failure detection. BFI_COUNTER may be one of the at least one UE variable. The BFI_COUNTER may be a counter for a beam failure instance indication. The BFI_COUNTER may be initially set to zero.

In an example, if a MAC entity of a wireless device receives a beam failure instance indication from a lower layer (e.g. PHY) of the wireless device, the wireless device may start or restart beamFailureDetectionTimer (e.g., BFR timer in FIG. 18). In addition to starting or restarting the beamFailureDetectionTimer, the wireless device may increment BFI_COUNTER by one (e.g., at time T, 2T, 5T in FIG. 18).

In an example, if configured with BeamFailureRecoveryConfig, the wireless device may initiate a random access procedure (e.g. on an SpCell) for a beam failure recovery in response to the BFI_COUNTER being equal to or greater than the beamFailureInstanceMaxCount. In an example, if configured with BeamFailureRecoveryConfig, the wireless device may start the beamFailureRecoveryTimer (if configured) in response to the BFI_COUNTER being equal to or greater than the beamFailureInstanceMaxCount. The wireless device may apply the one or more parameters in the BeamFailureRecoveryConfig (e.g., powerRampingStep, preambleReceivedTargetPower, and preambleTransMax) in response to the initiating the random access procedure. In an example, the random access procedure may be contention-free random access procedure.

In an example, if not configured with BeamFailureRecoveryConfig, the wireless device may initiate a random access procedure (e.g. on an SpCell) for a beam failure recovery in response to the BFI_COUNTER being equal to or greater than the beamFailureInstanceMaxCount. In an example, the random access procedure may be contention-based random access procedure.

In an example, in FIG. 18, the wireless device may initiate the random access procedure at time 6T, when the first number (e.g., 3) is reached.

In an example, if the beamFailureDetectionTimer expires, the wireless device may set the BFI_COUNTER to zero (e.g., in FIG. 18, between time 3T and 4T).

In an example, if the random access procedure (e.g., contention-free random access or contention-based random access) is successfully completed, the wireless device may consider the beam failure recovery procedure successfully completed.

In an example, if the random access procedure (e.g., contention-free random access) is successfully completed, the wireless device may stop the beamFailureRecoveryTimer (if configured).

If a MAC entity of a wireless device transmits a contention-free random access preamble for a beam failure recovery request, the MAC entity may start ra-ResponseWindow at a first PDCCH occasion from the end of the transmitting the contention-free random access preamble. The ra-ResponseWindow may be configured in BeamFailureRecoveryConfig. While the ra-ResponseWindow is running, the wireless device may monitor at least one PDCCH (e.g. of an SpCell) for a response to the beam failure recovery request. The beam failure recovery request may be identified by a C-RNTI.

In an example, if a MAC entity of a wireless device receives, from a lower layer of the wireless device, a notification of a reception of at least one PDCCH transmission and if the at least one PDCCH transmission is addressed to a C-RNTI and if a contention-free random access preamble for a beam failure recovery request is transmitted by the MAC entity, the wireless device may consider a random access procedure successfully completed.

In an example, a wireless device may initiate a contention-based random access preamble for a beam failure recovery request. When the wireless device transmits Msg3, a MAC entity of the wireless device may start ra-ContentionResolutionTimer. The ra-ContentionResolutionTimer may be configured by RRC. In response to the starting the ra-ContentionResolutionTimer, the wireless device may monitor at least one PDCCH while the ra-ContentionResolutionTimer is running. In an example, if the MAC entity receives, from a lower layer of the wireless device, a notification of a reception of the at least one PDCCH transmission; if a C-RNTI MAC-CE is included in the Msg3; if a random access procedure is initiated for a beam failure recovery and the at least one PDCCH transmission is addressed to a C-RNTI of the wireless device, the wireless device may consider the random access procedure successfully completed. In response to the random access procedure being successfully completed, the wireless device may stop the ra-ContentionResolutionTimer.

In an example, if a random access procedure of a beam failure recovery is successfully completed, the wireless device may consider the beam failure recovery successfully completed.

A wireless device may be configured, for a serving cell, with a first set of periodic CSI-RS resource configuration indexes by higher layer parameter Beam-Failure-Detection-RS-ResourceConfig (e.g., failureDetectionResources). The wireless device may further be configured with a second set of CSI-RS resource configuration indexes and/or SS/PBCH block indexes by higher layer parameter Candidate-Beam-RS-List (e.g., candidateBeamRSList). In an example, the first set and/or the second set may be used for radio link quality measurements on the serving cell. If a wireless device is not provided with higher layer parameter Beam-Failure-Detection-RS-ResourceConfig, the wireless device may determine a first set to include SS/PBCH block indexes and periodic CSI-RS resource configuration indexes. In an example, the SS/PBCH block indexes and the periodic CSI-RS resource configuration indexes may be with same values as one or more RS indexes in one or more RS sets. In an example, the one or more RS indexes in the one or more RS sets may be indicated by one or more TCI states. In an example, the one or more TCI states may be used for respective control resource sets that the wireless device is configured for monitoring PDCCH. The wireless device may expect a single port RS in the first set.

In an example, the wireless device may expect the first set of periodic CSI-RS resource configurations to include up to two RS indexes. In an example, if the first set of periodic CSI-RS resource configurations includes two RS indexes, the first set of periodic CSI-RS resource configurations may include one or more RS indexes with QCL-TypeD configuration. In an example, the wireless device may expect a single port RS in the first set of periodic CSI-RS resource configurations.

In an example, a first threshold (e.g. Qout,LR) may correspond to a first default value of higher layer parameter RLM-IS-OOS-thresholdConfig (e.g., rlmInSyncOutOfSyncThreshold). In an example, a second threshold (e.g. Qin,LR) may correspond to a second default value of higher layer parameter Beam-failure-candidate-beam-threshold (e.g., rsrp-ThresholdSSB).

In an example, a physical layer in the wireless device may assess a first radio link quality according to the first set of periodic CSI-RS resource configurations against the first threshold. For the first set, the wireless device may assess the first radio link quality according to periodic CSI-RS resource configurations or SS/PBCH blocks. In an example, the periodic CSI-RS resource configurations or the SS/PBCH blocks may be associated (e.g. quasi co-located) with at least one DM-RS of PDCCH receptions monitored by the wireless device.

In an example, the wireless device may apply the second threshold to a first L1-RSRP measurement obtained from one or more SS/PBCH blocks. In an example, the wireless device may apply the second threshold to a second L1-RSRP measurement obtained for one or more periodic CSI-RS resources after scaling a respective CSI-RS reception power with a value provided by higher layer parameter Pc_SS (e.g., powerControlOffsetSS).

In an example, a wireless device may assess the first radio link quality of the first set. A physical layer in the wireless device may provide an indication to higher layers (e.g. MAC) when the first radio link quality for all corresponding resource configurations in the first set is worse than the first threshold. In an example, the wireless device may use the all corresponding resource configurations in the first set to assess the first radio link quality. The physical layer may inform the higher layers (e.g. MAC, RRC) when the first radio link quality is worse than the first threshold with a first periodicity. The first periodicity may be determined by the maximum between the shortest periodicity of periodic CSI-RS configurations or SS/PBCH blocks in the first set and X (e.g. 2 msec). In an example, the wireless device may assess the periodic CSI-RS configurations or the SS/PBCH blocks for the first radio link quality.

In an example, in response to a request from higher layers (e.g. MAC), a wireless device may provide to the higher layers the periodic CSI-RS configuration indexes and/or the SS/PBCH blocks indexes from the second set. The wireless device may further provide, to the higher layers, corresponding L1-RSRP measurements that are larger than or equal to the second threshold.

A wireless device may be provided/configured with a control resource set (coreset) through a link to a search space set. In an example, the search space set may be provided by higher layer parameter recoverySearchSpaceId. The search space may be used for monitoring PDCCH in the control resource set. In an example, if the wireless device is provided by the higher layer parameter recoverySearchSpaceId, the wireless device may not expect to be provided with a second search space set for monitoring the coreset. In an example, the coreset may be associated with the search space set provided by the higher layer parameter recoverySearchSpaceId.

The wireless device may receive from higher layers (e.g. MAC), by parameter PRACH-ResourceDedicatedBFR, a configuration for a PRACH transmission. For the PRACH transmission in slot n and according to antenna port quasi co-location parameters associated with periodic CSI-RS configuration or SS/PBCH block with a first RS index, the wireless device may monitor the PDCCH in a search space set (e.g., provided by the higher layer parameter recoverySearchSpaceId) for detection of a DCI format starting from slot n+4 within a window. The window may be configured by higher layer parameter BeamFailureRecoveryConfig. The DCI format may be with CRC scrambled by C-RNTI. In an example, the first RS index may be provided by the higher layers.

In an example, for the PDCCH monitoring and for the corresponding PDSCH reception, the wireless device may assume the same antenna port quasi-collocation parameters with the first RS index (e.g. as for monitoring the PDCCH) until the wireless device receives by higher layers an activation for a TCI state or a parameter TCI-StatesPDCCH-ToAddlist and/or TCI-StatesPDCCH-ToReleaseList In an example, after the wireless device detects the DCI format with CRC scrambled by the C-RNTI in the search space set (e.g., provided by the higher layer parameter recoverySearchSpaceId), the wireless device may monitor PDCCH candidates in the search space set until the wireless device receives a MAC-CE activation command for a TCI state or a higher layer parameters TCI-StatesPDCCH-ToAddlist and/or TCI-StatesPDCCH-ToReleaseList.

In an example, if the wireless device is not provided with a coreset for a search space set (e.g., provided by a higher layer parameter recoverySearchSpaceId), the wireless device may not expect to receive a PDCCH order triggering a PRACH transmission. In an example, the wireless device may initiate a contention-based random-access procedure for a beam failure recovery in response to not being provided with the coreset.

In an example, if the wireless device is not provided with a higher layer parameter recoverySearchSpaceId, the wireless device may not expect to receive a PDCCH order triggering a PRACH transmission. In an example, the wireless device may initiate a contention-based random-access procedure for a beam failure recovery in response to not being provided with the higher layer parameter recoverySearchSpaceId.

A base station (gNB) may configure a wireless device (UE) with one or more uplink (UL) bandwidth parts (BWPs) and one or more downlink (DL) BWPs to enable bandwidth adaptation (BA) on a PCell. If carrier aggregation is configured, the gNB may configure the UE with at least one or more DL BWP(s) (i.e. there may be no UL BWPS in the UL) to enable BA on an SCell. For the PCell, a first initial BWP may be a first BWP used for initial access. For the SCell, a second initial BWP is a second BWP configured for the UE to first operate at the SCell when the SCell is activated.

In paired spectrum (e.g. FDD), a wireless device can switch an active DL BWP and an active UL BWP independently. In unpaired spectrum (e.g. TDD), a wireless device can switch an active DL BWP and an active UL BWP simultaneously. Switching between configured BWPs may happen by means of a DCI or an inactivity timer. When the inactivity timer is configured for a serving cell, an expiry of the inactivity timer associated to that cell may switch an active BWP to a default BWP. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may enable reasonable UE battery consumption. BWPs other than the one UL BWP and the one DL BWP that the UE may be configured with may be deactivated. On deactivated BWPs, the UE may not monitor PDCCH, may not transmit on PUCCH, PRACH and UL-SCH.

In an example, a Serving Cell may be configured with at most a first number (e.g., four) BWPs. In an example, for an activated Serving Cell, there may be one active BWP at any point in time.

In an example, a BWP switching for a serving cell (e.g., PCell, SCell) may be used to activate an inactive BWP and deactivate an active BWP at a time. In an example, the BWP switching may be controlled by a PDCCH indicating a downlink assignment or an uplink grant. In an example, the BWP switching may be controlled by an inactivity timer (e.g. bwpInactivityTimer). In an example, the BWP switching may be controlled by an RRC signaling. In an example, the BWP switching may be controlled by a MAC entity in response to initiating a random access procedure. Upon addition of an SpCell or activation of an SCell, a DL BWP indicated by firstActiveDownlinkBWP-ID (e.g., included in RRC signaling) and an UL BWP indicated by firstActiveUplinkBWP-ID (e.g., included in RRC signaling) are active without receiving a PDCCH indicating a downlink assignment or an uplink grant. The active BWP for a serving cell may be indicated by RRC and/or PDCCH. In an example, for unpaired spectrum (e.g., time-division-duplex (TDD)), a DL BWP may be paired with an UL BWP, and BWP switching may be common for both UL and DL.

In an example, for an activated serving cell (e.g., PCell, SCell) configured with one or more BWPs, if the BWP is activated, a MAC entity may perform at least one of: transmitting on UL-SCH on the one or more BWPs; transmitting on RACH on the one or more BWPs; monitoring a PDCCH on the one or more BWPs; transmitting SRS on the one or more BWPs; transmitting PUCCH on the one or more BWPs; receiving DL-SCH on the one or more BWPs; (re-)initializing any suspended configured uplink grants of configured grant Type 1 on the one or more BWPs according to a stored configuration, if any, and to start in a symbol based on some procedure.

In an example, for an activated serving cell (e.g., PCell, SCell) configured with one or more BWPs, if the BWP is deactivated, a MAC entity may not transmit on UL-SCH on the one or more BWPs; may not transmit on RACH on the one or more BWPs; may not monitor a PDCCH on the one or more BWPs; may not report CSI for the one or more BWPs; may not transmit PUCCH on the one or more BWPs; may not transmit SRS on the one or more BWPs, may not receive DL-SCH on the one or more BWPs; may clear any configured downlink assignment and configured uplink grant of configured grant Type 2 on the one or more BWPs; may suspend any configured uplink grant of configured Type 1 on the one or more BWPs (e.g., inactive BWPs).

In an example, upon initiation of a random access procedure (e.g., contention-based random access, contention-free random access) on a serving cell, if PRACH occasions are configured for an active UL BWP, of the serving cell, with an uplink BWP ID; and if the serving cell is an SpCell; and if a downlink BWP ID of an active DL BWP of the serving cell is not the same as the uplink BWP ID, a MAC entity may switch from the active DL BWP to a DL BWP with a second downlink BWP ID same as the uplink BWP ID. In response to the switching, the MAC entity may perform the random access procedure on the DL BWP of the serving cell (e.g., SpCell) and the active UL BWP of the serving cell.

In an example, upon initiation of a random access procedure (e.g., contention-based random access, contention-free random access) on a serving cell (e.g., SCell), if PRACH occasions are configured for an active UL BWP of the serving cell; and if the serving cell is not an SpCell, a MAC entity may perform the random access procedure on an active DL BWP of an SpCell and an active UL BWP of the serving cell.

In an example, upon initiation of a random access procedure on a serving cell, if PRACH resources are not configured for an active UL BWP of the serving cell, a MAC entity may switch the active UL BWP to an uplink BWP (initial uplink BWP). In an example, the uplink BWP may be indicated by RRC signaling (e.g., initialULBWP). In an example, if the serving cell is an SpCell, the MAC entity may switch an active DL BWP to a downlink BWP (e.g., initial downlink BWP). In an example, the downlink BWP may be indicated by RRC signaling (e.g., initialDLBWP). In response to the switching, the MAC entity may perform the random access procedure on the uplink BWP and the downlink BWP.

In an example, upon initiation of a random access procedure on a serving cell, if PRACH resources are not configured for an active UL BWP of the serving cell (e.g., SCell), a MAC entity may switch the active UL BWP to an uplink BWP (initial uplink BWP). In an example, the uplink BWP may be indicated by RRC signaling (e.g., initialULBWP). In an example, if the serving cell is not an SpCell, the MAC entity may perform the random access procedure on the uplink BWP and an active downlink BWP of an SpCell.

In an example, if a MAC entity receives a PDCCH for a BWP switching for a serving cell while a random access procedure associated with the serving cell is not ongoing, a UE may perform the BWP switching to a BWP indicated by the PDCCH.

In an example, if a MAC entity receives a PDCCH for a BWP switching for a serving cell while a random access procedure is ongoing in the MAC entity, it may be up to UE implementation whether to switch BWP or ignore the PDCCH for the BWP switching. In an example, if the PDCCH for the BWP switching is addressed to C-RNTI for a successful completion of the random access procedure, the UE may perform the BWP switching to a new BWP indicated by the PDCCH.

In an example, if the MAC entity decides to perform the BWP switching to the new BWP (indicated by the PDCCH) in response to the receiving the PDCCH (other than successful contention resolution), the MAC entity may stop the ongoing random access procedure and initiate a second random access procedure on the new BWP. In an example, if the MAC decides to ignore the PDCCH for the BWP switching, the MAC entity may continue with the ongoing random access procedure on an active BWP.

In an example, if a BWP inactivity timer is configured, for an activated serving cell, if a default DL BWP is configured (e.g., via RRC signaling including defaultDownlinkBWP parameter), and an active DL BWP is not a BWP indicated by the default DL BWP; or if the default DL BWP is not configured, and an active DL BWP is not the initial downlink BWP (e.g., via RRC signaling including initialDownlinkBWP parameter): if a PDCCH addressed to C-RNTI or CS-RNTI indicating downlink assignment or uplink grant is received on the active BWP or for the active BWP: if there is not an ongoing random access procedure associated with the activated serving cell, the MAC entity may start or restart the BWP inactivity timer associated with the active DL BWP.

In an example, if a BWP inactivity timer is configured, for an activated serving cell, if a default DL BWP is configured, and an active DL BWP is not a BWP indicated by the default DL BWP; or if the default DL BWP is not configured, and an active DL BWP is not the initial downlink BWP: if a MAC-PDU is transmitted in a configured uplink grant or received in a configured downlink assignment; if there is not an ongoing random access procedure associated with the activated serving cell, the MAC entity may start or restart the BWP inactivity timer associated with the active DL BWP.

In an example, if a BWP inactivity timer is configured, for an activated serving cell, if a default DL BWP is configured, and an active DL BWP is not a BWP indicated by the default DL BWP; or if the default DL BWP is not configured, and an active DL BWP is not the initial downlink BWP: if a PDCCH addressed to C-RNTI or CS-RNTI indicating downlink assignment or uplink grant is received on the active BWP or for the active BWP; or if a MAC-PDU is transmitted in a configured uplink grant or received in a configured downlink assignment: if an ongoing random access procedure associated with the activated serving cell is successfully completed in response to receiving a PDCCH addressed to C-RNTI, the MAC entity may start or restart the BWP inactivity timer associated with the active DL BWP.

In an example, if a BWP inactivity timer is configured, for an activated serving cell, if a default DL BWP is configured, and an active DL BWP is not a BWP indicated by the default DL BWP; or if the default DL BWP is not configured, and the active DL BWP is not the initial downlink BWP: if a PDCCH for a BWP switching is received on the active DL BWP, a MAC entity may start or restart the BWP inactivity timer associated with the active DL BWP in response to switching the active BWP.

In an example, if BWP inactivity timer is configured, for an activated serving cell, if the default DL BWP is configured, and the active DL BWP is not the BWP indicated by the default DL BWP; or if the default DL BWP is not configured, and the active DL BWP is not the initial downlink BWP: if random access procedure is initiated on the activated serving cell, the MAC entity may stop the BWP inactivity timer (if running) associated with the active DL BWP of the activated serving cell. If the activated serving cell is an SCell (other than a PSCell), the MAC entity may stop a second BWP inactivity timer (if running) associated with a second active DL BWP of an SpCell.

In an example, if BWP inactivity timer is configured, for an activated serving cell, if the default DL BWP is configured, and the active DL BWP is not the BWP indicated by the default DL BWP; or if the default DL BWP is not configured, and the active DL BWP is not the initial downlink BWP: if BWP inactivity timer associated with the active DL BWP expires: if the default DL BWP is configured, the MAC entity may perform BWP switching to a BWP indicated by the default DL BWP. Otherwise, the MAC entity may perform BWP switching to the initial downlink BWP.

In an example, a UE may be configured for operation in bandwidth parts (BWPs) of a serving cell. In an example, the UE may be configured by higher layers for the serving cell a first set of (e.g., at most four) BWPs for receptions by the UE (e.g., DL BWP set) in a downlink (DL) bandwidth by a parameter DL-BWP (e.g., BWP-Downlink) for the serving cell. In an example, the UE may be configured with a second set of (e.g., at most four) BWPs for transmissions by the UE (e.g., UL BWP set) in an uplink (UL) bandwidth by a parameter UL-BWP (e.g., BWP-Uplink) for the serving cell.

In an example, an initial active DL BWP may be defined, for example, by a location and a number of contiguous PRBs, a subcarrier spacing, and a cyclic prefix, for the control resource set for Type0-PDCCH common search space. In an example, for operation on a primary cell or on a secondary cell, a UE may be provided with an initial active UL BWP by a higher layer parameter (e.g., initialuplinkBWP). In an example, if a wireless device is configured with a supplementary carrier, the wireless device can be provided with an initial uplink BWP on the supplementary carrier by a second higher layer parameter (e.g., initialUplinkBWP in supplementaryUplink).

In an example, if a UE has a dedicated BWP configuration, the UE may be provided by a higher layer parameter (e.g., firstActiveDownlinkBWP-Id). The higher layer parameter may indicate a first active DL BWP for receptions.

In an example, if a UE has a dedicated BWP configuration, the UE may be provided by a second higher layer parameter (e.g., firstActiveUplinkBWP-Id). The higher layer parameter may indicate a first active UL BWP for transmissions on the primary cell.

In an example, for a DL BWP or an UL BWP in a first set of DL BWPs or a second set of UL BWPs, respectively, the UE may be configured with at least one of the following parameters for a serving cell: a subcarrier spacing provided by higher layer parameter subcarrierSpacing or UL-BWP-mu; a cyclic prefix provided by higher layer parameter cyclicPrefix; an index in the first set of DL BWPs or in the second set of UL BWPs by respective higher layer parameters bwp-Id (e.g., DL-BWP-ID, UL-BWP-ID); a third set of BWP-common and a fourth set of BWP-dedicated parameters by a higher layer parameter bwp-Common and a higher layer parameter bwp-Dedicated, respectively.

In an example, for an unpaired spectrum operation, a DL BWP from a first set of configured DL BWPs with a DL BWP index provided by higher layer parameter bwp-ID for the DL BWP may be paired/linked with an UL BWP from a second set of configured UL BWPs with an UL BWP index provided by a higher layer parameter bwp-ID for the UL BWP when the DL BWP index and the UL BWP index are equal.

In an example, for an unpaired spectrum operation, the UE may not expect to receive a configuration where the center frequency for the DL BWP is different than the center frequency for the UL BWP when the DL BWP index of the DL BWP is equal to the UL BWP index of the UL BWP.

In an example, for a DL BWP in a first set of DL BWPs on a primary cell, a UE may be configured with control resource sets for every type of common search space and for UE-specific search space. In an example, the UE may not expect to be configured without a common search space on the primary cell (or on the PSCell), in the DL BWP (e.g., active DL BWP).

In an example, for an UL BWP in a second set of UL BWPs, the UE may be configured with one or more resource sets for PUCCH transmissions. In an example, a UE may receive PDCCH and PDSCH in a DL BWP according to a configured subcarrier spacing and CP length for the DL BWP.

In an example, a UE may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate an active DL BWP, from the first set of configured DL BWPs, for DL receptions. In an example, if a bandwidth part indicator field is configured in DCI format 0_1, the bandwidth part indicator field value may indicate an active UL BWP, from the second set of configured UL BWPs, for UL transmissions.

In an example, if a bandwidth part indicator field is configured in DCI format 0_1 and the bandwidth part indicator field value indicates an UL BWP different from an active UL BWP, the UE may set the active UL BWP to the UL BWP indicated by the bandwidth part indicator field in the DCI format 0_1.

In an example, if a bandwidth part indicator field is configured in DCI format 1_1 and the bandwidth part indicator field value indicates a DL BWP different from an active DL BWP, the UE may set the active DL BWP to the DL BWP indicated by the bandwidth part indicator field in the DCI format 1_1.

In an example, for a primary cell, a UE may be provided by a higher layer parameter defaultDownlinkBWP-Id. In an example, the higher layer parameter defaultDownlinkBWP-Id may indicate a default DL BWP among the configured DL BWPs. In an example, if a UE is not provided a default DL BWP by the higher layer parameter defaultDownlinkBWP-Id, the default BWP may be the initial active DL BWP.

In an example, a UE may be expected to detect a DCI format 0_1 indicating active UL BWP change, or a DCI format 1_1 indicating active DL BWP change, only if a corresponding PDCCH is received within first 3 symbols of a slot.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, if a UE is configured for a secondary cell with higher layer parameter defaultDownlinkBWP-Id indicating a default DL BWP among the configured DL BWPs and the UE is configured with higher layer parameter bwp-inactivitytimer indicating a timer value, the UE procedures on the secondary cell may be same as on a primary cell. In an example, using the timer value for the secondary cell and the default DL BWP for the secondary cell may be same as using a timer value for the primary cell and a default DL BWP for the primary cell.

In an example, a UE may be provided by a higher layer parameter BWP-InactivityTimer. In an example, the higher layer parameter BWP-InactivityTimer may indicate a timer with a timer value for a serving cell (e.g., primary cell, secondary cell). If configured with the timer and the timer is running, the UE may increment the timer every interval of 1 millisecond for frequency range 1 or every 0.5 milliseconds for frequency range 2 if the UE does not detect a DCI format for PDSCH reception on the serving cell for paired spectrum operation.

In an example, if configured with the timer and the timer is running, the UE may increment the timer every interval of 1 millisecond for frequency range 1 or every 0.5 milliseconds for frequency range 2 if the UE does not detect a first DCI format for PDSCH reception or a second DCI format for PUSCH transmission on the serving cell for unpaired spectrum operation during the interval.

In an example, if a UE is configured by a higher layer parameter firstActiveDownlinkBWP-Id and/or a higher layer parameter firstActiveUplinkBWP-Id. In an example, the higher layer parameter firstActiveDownlinkBWP-Id may indicate a first active DL BWP on a serving cell (e.g., secondary cell) or on a supplementary carrier. In an example, the wireless device may use the first active DL BWP on the serving cell as the respective first active DL BWP.

In an example, the higher layer parameter firstActiveUplinkBWP-Id may indicate a first active UL BWP on a serving cell (e.g., secondary cell) or on a supplementary carrier. In an example, the wireless device may use the first active UL BWP on the serving cell or on the supplementary carrier as the respective first active UL BWP.

In an example, for paired spectrum operation, a UE may not expect to transmit HARQ-ACK on a PUCCH resource indicated by a DCI format 1_0 or a DCI format 1_1 if the UE changes its active UL BWP on a primary cell between a time of a detection of the DCI format 1_0 or the DCI format 1_1 and a time of a corresponding HARQ-ACK transmission on the PUCCH.

In an example, a UE may not monitor PDCCH when the UE performs RRM measurements over a bandwidth that is not within the active DL BWP for the UE.

In an example, a DL BWP index (ID) may be an identifier for a DL BWP. One or more parameters in an RRC configuration may use the DL BWP-ID to associate the one or more parameters with the DL BWP. In an example, the DL BWP ID=0 may be associated with the initial DL BWP.

In an example, an UL BWP index (ID) may be an identifier for an UL BWP. One or more parameters in an RRC configuration may use the UL BWP-ID to associate the one or more parameters with the UL BWP. In an example, the UL BWP ID=0 may be associated with the initial UL BWP.

If a higher layer parameter firstActiveDownlinkBWP-Id is configured for an SpCell, a higher layer parameter firstActiveDownlinkBWP-Id indicates an ID of a DL BWP to be activated upon performing the reconfiguration.

If a higher layer parameter firstActiveDownlinkBWP-Id is configured for an SCell, a higher layer parameter firstActiveDownlinkBWP-Id indicates an ID of a DL BWP to be used upon MAC-activation of the SCell.

If a higher layer parameter firstActiveUplinkBWP-Id is configured for an SpCell, a higher layer parameter firstActiveUplinkBWP-Id indicates an ID of an UL BWP to be activated upon performing the reconfiguration.

If a higher layer parameter firstActiveUplinkBWP-Id is configured for an SCell, a higher layer parameter firstActiveUplinkBWP-Id indicates an ID of an UL BWP to be used upon MAC-activation of the SCell.

In an example, a wireless device, to execute a reconfiguration with sync, may consider an uplink BWP indicated in a higher layer parameter firstActiveUplinkBWP-Id to be an active uplink BWP.

In an example, a wireless device, to execute a reconfiguration with sync, may consider a downlink BWP indicated in a higher layer parameter firstActiveDownlinkBWP-Id to be an active downlink BWP.

Figure 19:
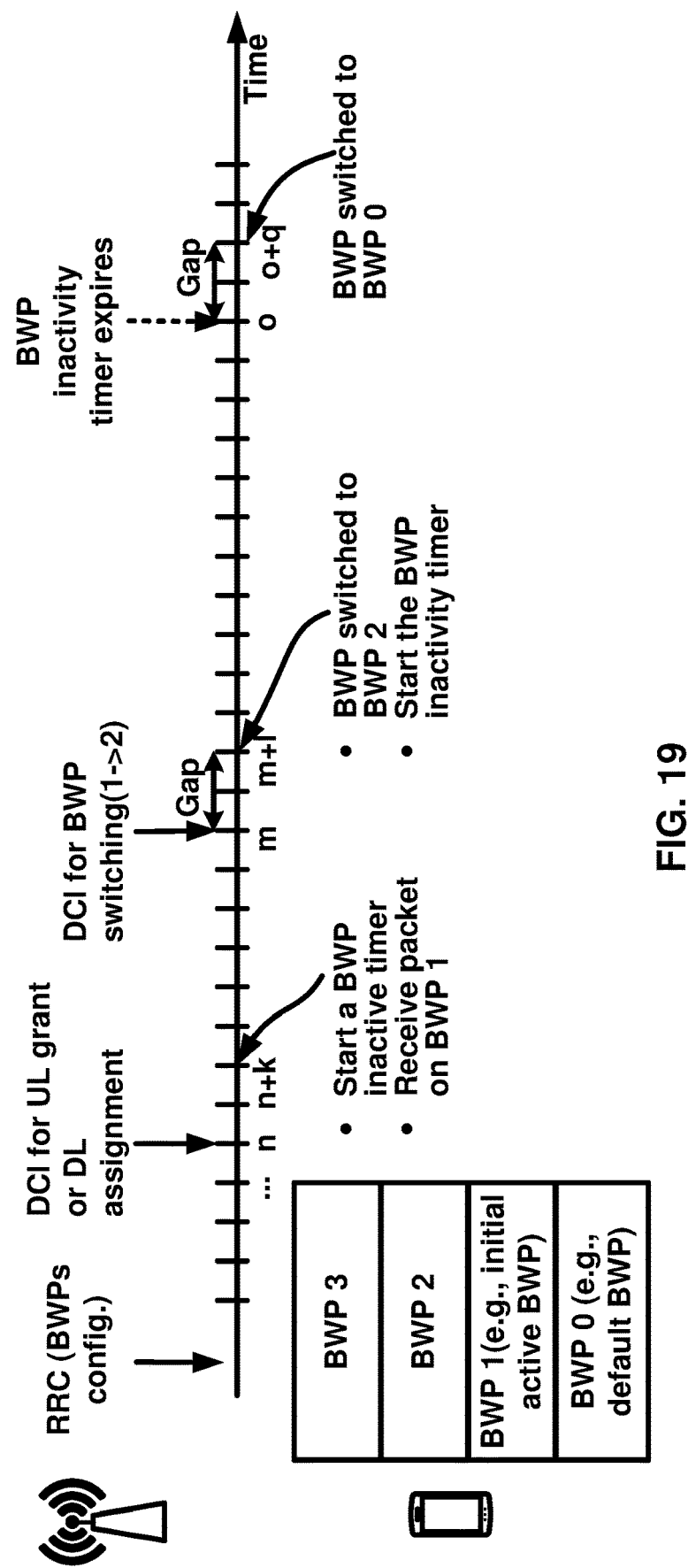
FIG. 19 is an example of bandwidth part operation as per an aspect of an embodiment of the present disclosure.

FIG. 19 shows an example of BWP switching on a PCell.

Figure 20:
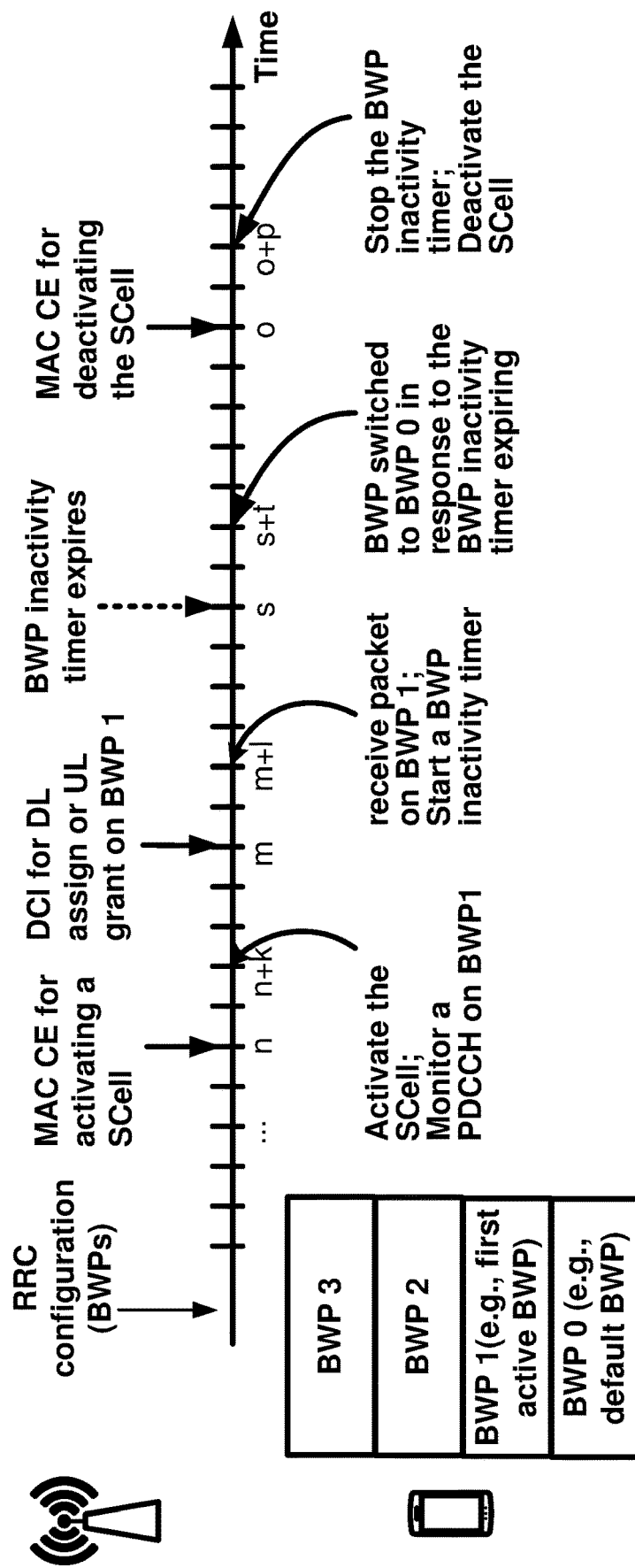
FIG. 20 is an example of bandwidth part operation as per an aspect of an embodiment of the present disclosure.

FIG. 20 shows an example of BWP switching on an SCell.

Figure 21A:
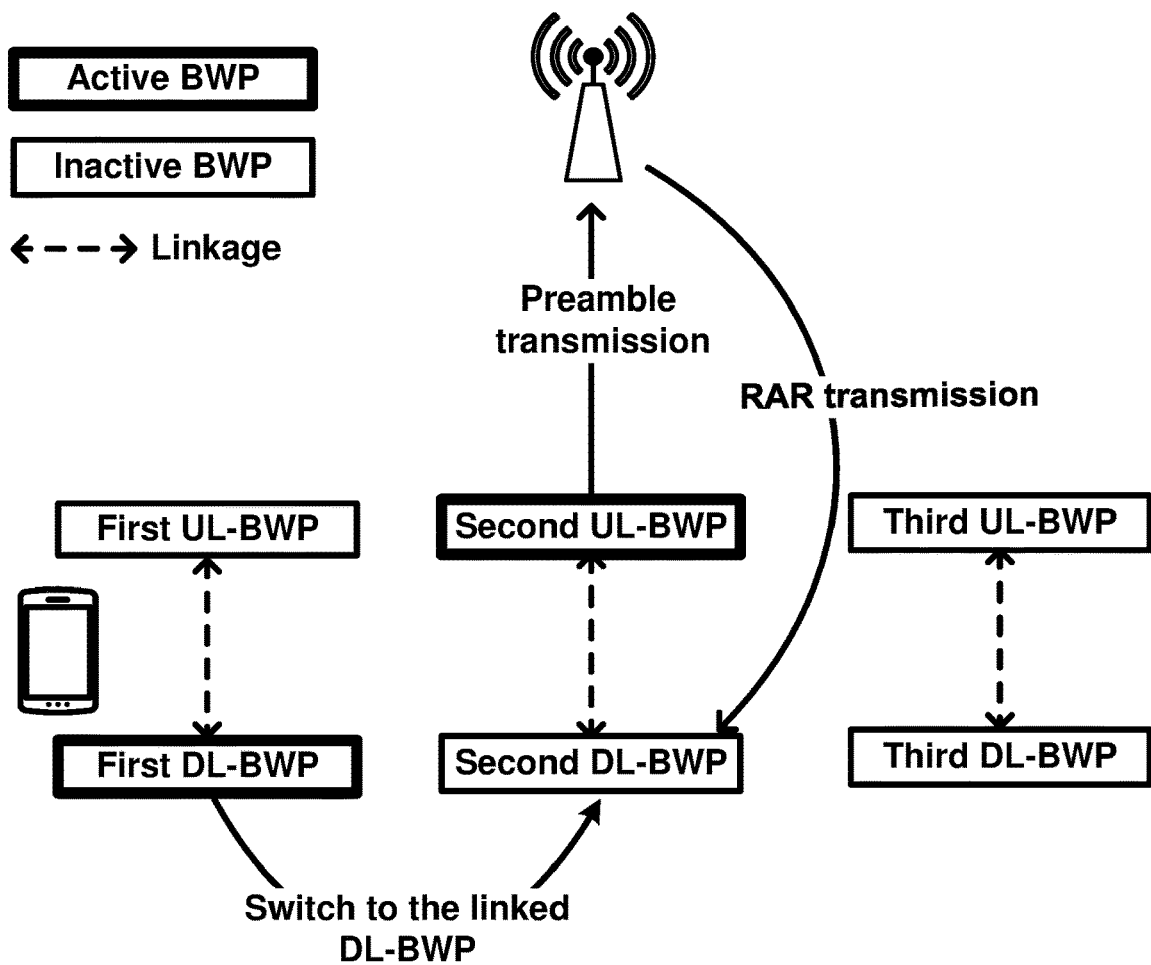
FIG. 21A and FIG. 21B are examples of bandwidth part (BWP) switching operation as per an aspect of an embodiment of the present disclosure.
Figure 21B:
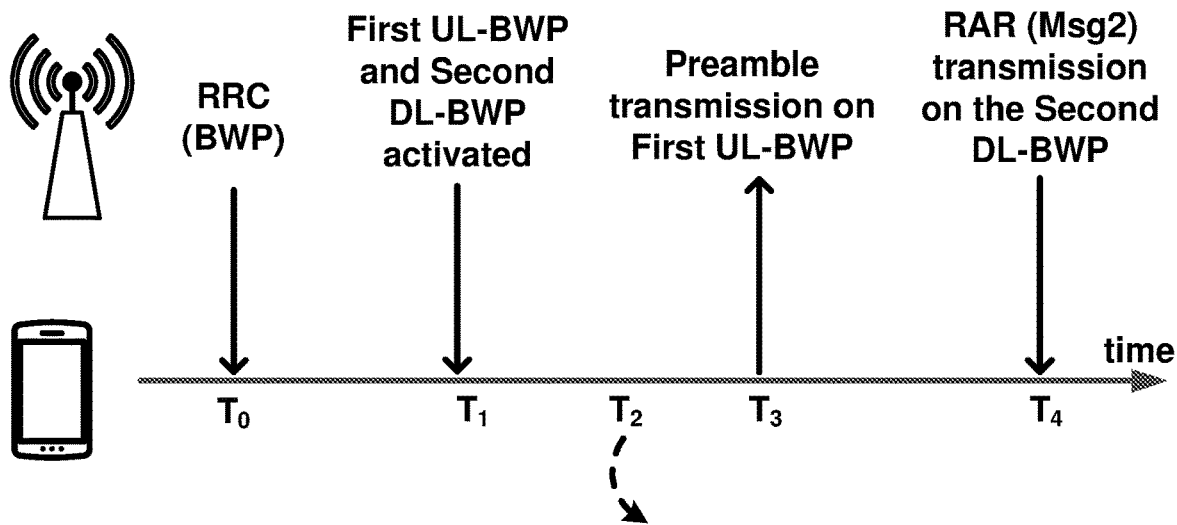

FIG. 21A and FIG. 21B show an example of an existing random access procedure with BWP switching. In an example, a wireless device may operate on a first uplink BWP of a cell and a first downlink BWP of the cell. The wireless device may initiate a random access procedure (e.g., contention based, contention-free) via the first uplink BWP. In an example, if one or more PRACH occasions are not configured, by a base station, for the first uplink BWP, the wireless device may switch from the first downlink BWP to an initial downlink BWP and switch from the first uplink BWP to an initial uplink BWP. The wireless device may perform the random access procedure on the initial uplink BWP and the initial downlink BWP.

In an example, a wireless device may operate on a first uplink BWP of a cell and a first downlink BWP of the cell. The first uplink BWP may be identified by a first uplink BWP specific index. The first downlink BWP may be identified by a first downlink BWP specific index. The wireless device may initiate a random access procedure (e.g., contention based, contention-free) via the first uplink BWP. In an example, if one or more PRACH occasions are configured, by a base station, for the first uplink BWP, and if the first uplink BWP specific index is same as the first downlink BWP specific index, the wireless device may perform the random access procedure on the first uplink BWP and the first downlink BWP.

In an example, a wireless device may operate on a first uplink BWP of a cell and a first downlink BWP of the cell. The first uplink BWP may be identified by a first uplink BWP specific index. The first downlink BWP may be identified by a first downlink BWP specific index. The wireless device may initiate a random access procedure (e.g., contention based, contention-free) via the first uplink BWP. In an example, if one or more PRACH occasions are configured, by a base station, for the first uplink BWP, and if the first downlink BWP specific index is different from the first uplink BWP specific index, the wireless device may switch from the first downlink BWP to a third downlink BWP of the cell with a third downlink BWP specific index. In an example, the third downlink BWP specific index may be same as the first uplink BWP specific index. In response to the switching, the wireless device may perform the random access procedure on the first uplink BWP and the third downlink BWP.

In an example, the random access procedure may be contention-based random access procedure. In an example, the random access procedure may be contention-free random access procedure. In an example, the base station and the wireless device may operate in a paired spectrum (e.g., frequency division duplex (FDD)).

Figure 22:
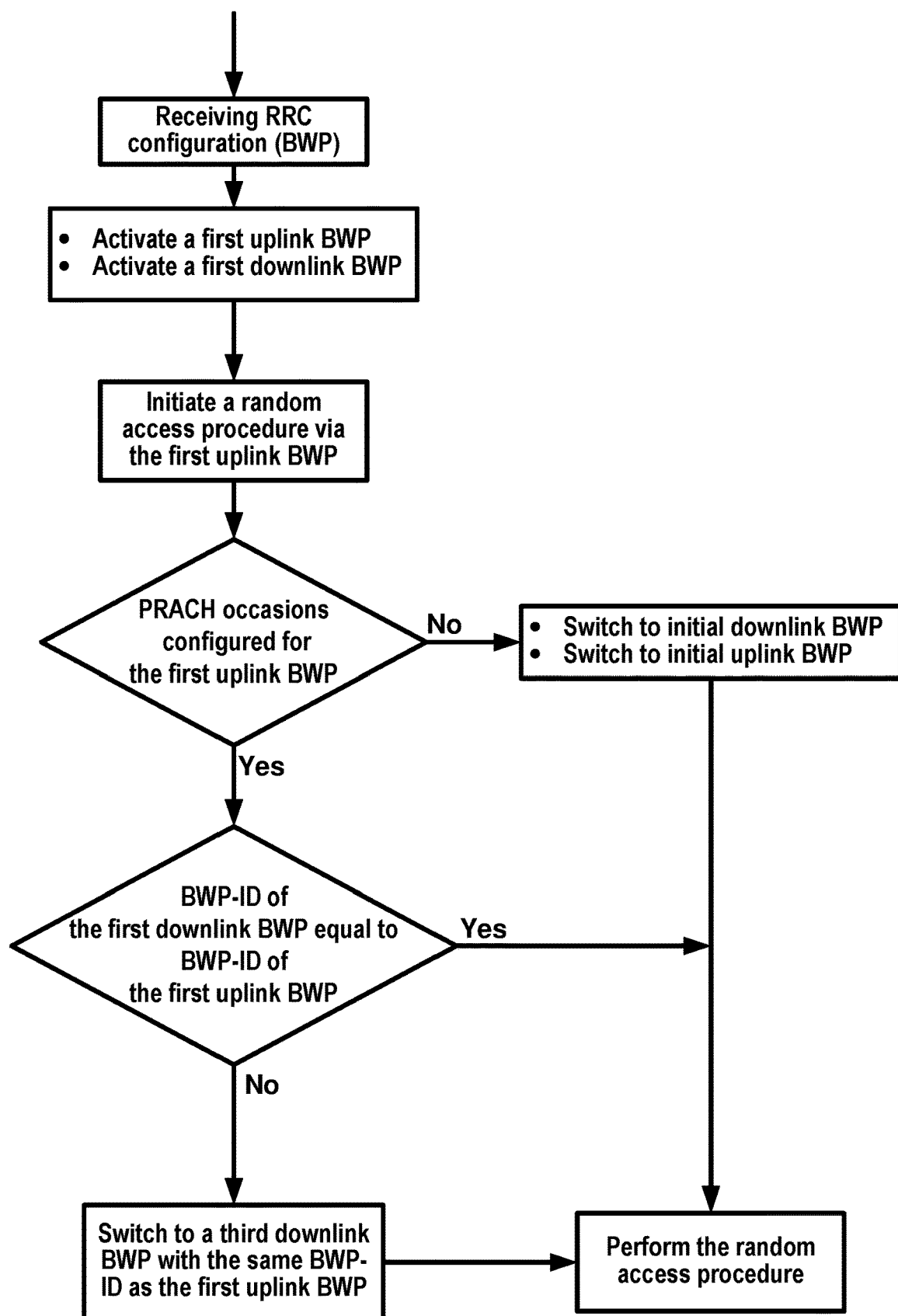
FIG. 22 is an example flowchart of BWP switching operation as per an aspect of an embodiment of the present disclosure.

FIG. 22 shows an example flowchart of FIG. 21A and FIG. 21B.

In existing beam failure recovery (BFR) procedures, a wireless device may perform a BFR procedure on an SpCell (e.g., PCell or PSCell). In an example, a base station may transmit, to a wireless device, one or more messages comprising configuration parameters of one or more cells. The one or more cells may comprise at least one PCell/PSCell and one or more SCells. In an example, an SpCell (e.g., PCell or PSCell) and one or more SCells may operate on different frequencies and/or different bands.

In an example, an SCell of the one or more SCells may support a multi-beam operation. In the multi-beam operation, a wireless device may perform one or more beam management procedures (e.g., a BFR procedure) on/for the SCell. The wireless device may perform a BFR procedure for the SCell when at least one of one or more beam pair links between the SCell and the wireless device fails. Existing BFR procedures may result in inefficiencies when there is a beam failure for the SCell. Existing BFR procedures may be inefficient, take a long time, or increase battery power consumption.

Example embodiments enhance existing BFR procedures to improve downlink radio efficiency and reduce uplink signaling overhead when there is a beam failure for one or more SCells. For example, an example enhanced process uses a first cell random access resources when a beam failure for an SCell of the one or more SCells occurs. In an example, downlink signaling processes are enhanced for recovery of a beam failure for an SCell. In an example, uplink signaling is enhanced for a BFR procedure of the SCell.

Example embodiments provide processes for a wireless device and a base station to enhance a BFR procedure for an SCell. Example embodiments may reduce a duration of the BFR procedure and may reduce battery power consumption.

In an example, a base station may configure a wireless device with uplink resources on a first cell (e.g., PCell) for a beam failure recovery of a second cell (e.g., SCell). In an example, the second cell may not have an uplink channel. The base station may not configure the second cell with the uplink channel (e.g., downlink only SCells).

In an example, when the wireless device detects a beam failure for the second cell, the wireless device may transmit an uplink signal (e.g., scheduling request, preamble, etc.), via the uplink resources of the first cell, indicating the beam failure of the second cell.

In an example, the base station may not configure each uplink bandwidth part (BWP) of the first cell with uplink resources used for a beam failure recovery procedure of the second cell. In an example, the base station may configure the uplink resources on a first uplink BWP of the first cell. The base station may not configure uplink resources for a beam failure recovery procedure of the second cell on a second uplink BWP of the first cell.

In an example, the wireless device may detect a beam failure for the second cell when the second uplink BWP of the first cell is active (e.g., the second uplink BWP is an active uplink BWP of the first cell). Based on the second uplink BWP not being configured with the uplink resources used for a beam failure recovery procedure of the second cell, the wireless device may fail to indicate the beam failure of the second cell timely. In an example, the wireless device may wait until the active uplink BWP of the first cell switches to an uplink BWP (e.g., the first uplink BWP) configured with uplink resources used for a beam failure recovery procedure of the second cell. This may increase the latency/delay of the beam failure recovery procedure. Increased latency/delay of the beam failure recovery procedure may lead to declaring a radio link failure (RLF) of the second cell. The wireless device may initiate a reconnection establishment procedure based on the declared RLF. The reconnection establishment procedure may be long (e.g., in seconds) resulting in a high-power consumption (e.g., due to increased downlink channel monitoring, and/or measurement of beams (or reference signals)), increased uplink interference to other cells and/or wireless devices (e.g., due to additional uplink transmission for the reconnection); and increased duration of lost communication between the wireless device and the base station.

There may be inefficiencies with existing beam failure recovery procedures when an active uplink BWP of a first cell is not configured with beam failure recovery resources of a second cell and when a beam failure is detected for the second cell. The inefficiencies may be include: increased latency, uplink interference, power consumption, declaring RLF, and/or the like. There is a need to implement an enhanced beam failure recovery procedure when an active uplink BWP of a first cell is not configured with beam failure recovery resources of a second cell when a beam failure is detected for the second cell.

Example embodiments implement an enhanced procedure when an active uplink BWP of a first cell is not configured with beam failure recovery resources of a second cell and when a beam failure is detected for the second cell. In an example embodiment, when the active uplink BWP of the first cell is not configured with beam failure recovery resources of the second cell and when the beam failure is detected for the second cell, the wireless device may switch to a second uplink BWP of the first cell. The second uplink BWP may be configured with beam failure recovery resources of the second cell. Based on the switching to the second uplink BWP configured with the beam failure recovery resources of the second cell, the wireless device may transmit an uplink signal, via the second uplink BWP, to indicate the beam failure of the second cell timely. Based on receiving the uplink signal, the base station may take measures such as, for example, deactivating the second cell, initiating a beam management procedure to identify a beam with a high quality, and/or the like.

In an example embodiment, a first uplink BWP of the first cell may comprise beam failure recovery resources of a first downlink BWP of the second cell. Based on the first uplink BWP of the first cell comprising the beam failure recovery resources of the first downlink BWP of the second cell, the wireless device may be active or activated (e.g., simultaneously on) the first uplink BWP of the first cell and the first downlink BWP of the second cell. The being active on the first uplink BWP and the first downlink BWP may comprise the first uplink BWP and the first downlink BWP being linked. In an example, when the wireless device switches to the first downlink BWP of the second cell, based on being linked, the wireless device may switch to the first uplink BWP of the first cell. In an example, the wireless device may detect a beam failure for the first downlink BWP. Based on the first downlink BWP and the first uplink BWP being active simultaneously, the wireless device may transmit an uplink signal, via the first uplink BWP, to indicate the beam failure of the second cell timely. Based on receiving the uplink signal, the base station may take measures such as, for example, deactivating the second cell, initiating a beam management procedure to identify a beam with a high quality, and/or the like.

This enhanced process reduces latency/delay of the beam failure recovery procedure, reduces declaring RLF, reduces uplink interference to other cells/devices, and/or reduces battery power consumption.

In an example, a wireless device may be configured with an SCell by a base station. The SCell may not have uplink resources. The SCell may comprise downlink-only resources. When the wireless device detects a beam failure on the SCell. the wireless device may not transmit an uplink signal (e.g., preamble) for a BFR procedure of the SCell on the SCell in response to not having uplink resources. The wireless device may not perform a BFR procedure on the SCell. The base station may not be aware of the beam failure on the SCell in response to the wireless device not performing the BFR procedure. An example embodiment enhances BFR procedures when an SCell comprises downlink-only resources.

In an example, an SCell may operate in a high frequency (e.g. 23 GHz, 60 GHz, 70 GHz). In an example, an SpCell may operate in a low frequency (e.g. 2.4 GHz, 5 GHz). The channel condition of the SCell may be different from the channel condition of the SpCell. The wireless device may use uplink resources of the SpCell to transmit a preamble for a beam failure recovery request for the SCell, to improve robustness of transmission of the preamble. An example embodiment enhances BFR procedures when an Scell operates in a different frequency than PCell. An example embodiment enhances BFR procedures when an Scell used uplink resources (e.g., random access resources, uplink BWPs of the PCell) of the PCell for a BFR procedure of the SCell.

A base station, such as a next generation Node B (gNB), may configure a wireless device (UE) with one or more uplink (UL) bandwidth parts (BWPs) and one or more downlink (DL) BWPs of a cell (e.g., PCell or SCell). A first UL BWP of the one or more UL BWPs may be identified with a first UL BWP index. A first DL BWP of the one or more DL BWPs may be identified with a first DL BWP index.

In an example, the wireless device may operate on the first DL BWP and the first UL BWP.

In an example, the first DL BWP and the first UL BWP may be active during the operating.

In an example, the first DL BWP may be an active DL BWP of the cell and the first UL BWP may be active UL BWP of the cell in response to the operating.

In an example, in a paired spectrum (e.g., FDD), the wireless device may switch the first DL BWP and the first UL BWP independently. The first UL BWP index and the first DL BWP index may be different.

In an example, in an unpaired spectrum (e.g., TDD), the wireless device may switch the first DL BWP and the first UL BWP simultaneously (e.g., together). In the unpaired spectrum, the first DL BWP index and the first UL BWP index may be the same. In an example, the first UL BWP and the first DL BWP may be linked (or paired) in response to the first DL BWP index and the first UL BWP index being the same.

Figure 23:
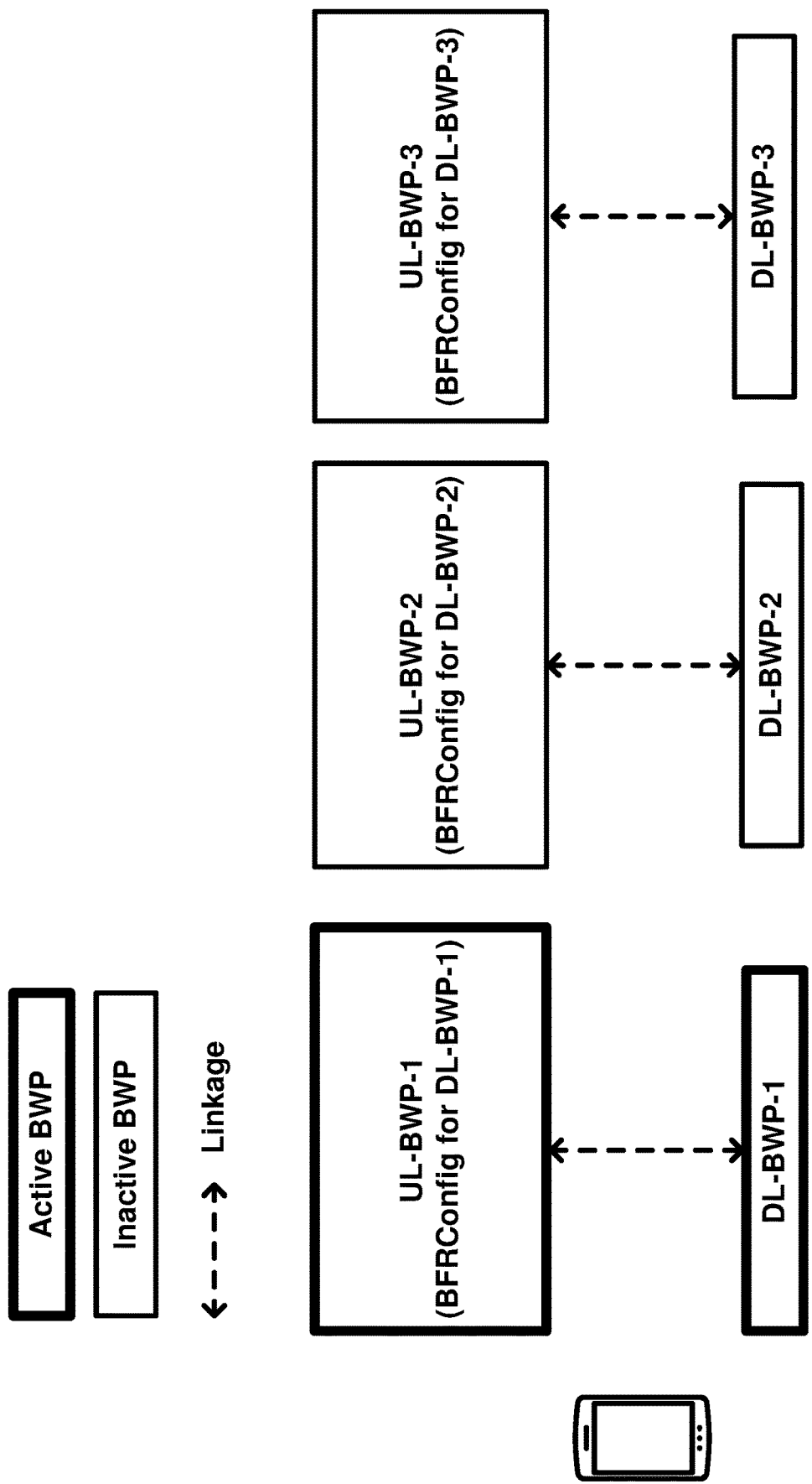
FIG. 23 shows an example of a BWP linkage in beam failure recovery procedure as per an aspect of an embodiment of the present disclosure.

FIG. 23 shows an example of a BWP linkage in a paired spectrum (e.g., FDD) for a beam failure recovery (BFR) procedure as per an aspect of an embodiment of the present disclosure. In an example, a wireless device may receive one or more messages comprising configuration parameters of a cell from a base station. In an example, the configuration parameters may comprise BWP configuration parameters for a plurality of DL BWPs comprising DL-BWP-1, DL-BWP-2 and DL-BWP-3 and for a plurality of UL BWPs comprising UL-BWP-1, UL-BWP-2 and UL-BWP-3.

In an example, the DL-BWP-1, the DL-BWP-2, and the DL-BWP-3 may be identified with DL-BWP-1 index, DL-BWP-2 index, and DL-BWP-3 index (e.g., provided by a higher layer parameter bwp-ID), respectively. In an example, the UL-BWP-1, the UL-BWP-2, and the UL-BWP-3 may be identified with UL-BWP-1 index, UL-BWP-2 index, and UL-BWP-3 index (e.g., provided by a higher layer parameter bwp-ID), respectively.

In an example, the DL-BWP-1 index and the UL-BWP-1 index may be the same, the DL-BWP-2 index and the UL-BWP-2 index may be the same, and the DL-BWP-3 index and the UL-BWP-3 index may be the same.

In an example, the configuration parameters may further comprise DL-BWP-specific BFR configuration parameters (e.g., RadioLinkMonitoringConfig) for at least one of the plurality of DL BWPs (e.g., DL-BWP-1, DL-BWP-2, DL-BWP-3). In an example, the DL-BWP-specific BFR configuration parameters may be BWP specific. In an example, the DL-BWP-specific BFR configuration parameters may be BWP dedicated.

In an example, first DL-BWP-specific BFR configuration parameters for the DL-BWP-1 may comprise one or more first RSs (e.g., RadioLinkMonitoringRS) of the DL-BWP-1. In an example, the wireless device may assess the one or more first RSs (e.g., SSBs, CSI-RSs) to detect a beam failure of the DL-BWP-1.

In an example, second DL-BWP-specific BFR configuration parameters for the DL-BWP-2 may comprise one or more second RSs (e.g., RadioLinkMonitoringRS) of the DL-BWP-2. In an example, the wireless device may assess the one or more second RSs (e.g., SSBs, CSI-RSs) to detect a beam failure of the DL-BWP-2.

In an example, third DL-BWP-specific BFR configuration parameters for the DL-BWP-3 may comprise one or more third RSs (e.g., RadioLinkMonitoringRS) of the DL-BWP-3. In an example, the wireless device may assess the one or more third RSs (e.g., SSBs, CSI-RSs) to detect a beam failure of the DL-BWP-3.

In an example, the configuration parameters may further comprise UL-BWP-specific BFR configuration parameters (e.g., BeamFailureRecoveryConfig) for at least one of the plurality of UL BWPs (e.g., UL-BWP-1, UL-BWP-2, UL-BWP-3). In an example, the UL-BWP-specific BFR configuration parameters may be BWP specific. In an example, the UL-BWP-specific BFR configuration parameters may be BWP dedicated.

In an example, first UL-BWP-specific BFR configuration parameters for the UL-BWP-1 may comprise one or more first candidate RSs (e.g., candidateBeamRSList) of the DL-BWP-1 and a first search space set (e.g., recoverySearchSpaceID) on the DL-BWP-1 in response to the DL-BWP-1 index and the UL-BWP-1 index being same. In an example, second UL-BWP-specific BFR configuration parameters for the UL-BWP-2 may comprise one or more second candidate RSs (e.g., candidateBeamRSList) of the DL-BWP-2 and a second search space set on the DL-BWP-2 in response to the DL-BWP-2 index and the UL-BWP-2 index being same. In an example, third UL-BWP-specific BFR configuration parameters for the UL-BWP-3 may comprise one or more third candidate RSs (e.g., candidateBeamRSList) of the DL-BWP-3 and a third search space set on the DL-BWP-3 in response to the DL-BWP-3 index and the UL-BWP-3 index being same.

In an example, in a paired spectrum (e.g., FDD) and in response to the UL-BWP-1 being configured with BFR parameters (e.g., the one or more first candidate RSs, the first search space set) of the DL-BWP-1, the UL-BWP-1 and the DL-BWP-1 may be linked/paired. In an example, when the DL-BWP-1 and the UL-BWP-1 are linked, the DL-BWP-1 index and the UL-BWP-1 index may be the same.

In an example, when the DL-BWP-1 and the UL-BWP-1 are linked, BWP switching may be common for the DL-BWP-1 and the UL-BWP-1. In an example, the wireless device may switch the DL-BWP-1 and the UL-BWP-1 simultaneously in response to the DL-BWP-1 being linked/paired with the UL-BWP-1.

As shown in FIG. 23, the DL-BWP-2 and the UL-BWP-2 are linked/paired and the DL-BWP-3 and the UL-BWP3 are linked/paired.

In an example, one or more linked BWPs may comprise a first pair of the DL-BWP-1 and the UL-BWP-1; a second pair of the DL-BWP-2 and the UL-BWP-2; and a third pair of the DL-BWP-3 and the UL-BWP-3.

In an example, the wireless device may operate on at least one of the one or more linked BWPs (e.g., DL-BWP-1 and UL-BWP-1, DL-BWP-2 and UL-BWP-2, or DL-BWP-3 and UL-BWP-3 in FIG. 23) simultaneously. In an example, at a first time (e.g., slot, subframe, frame), the DL-BWP-1 and the UL-BWP-1 may be active in response to the DL-BWP-1 being linked/paired with the UL-BWP-1. In an example, at a second time, the DL-BWP-2 and the UL-BWP-2 may be active in response to the DL-BWP-2 being linked/paired with the UL-BWP-2. In an example, at a third time, the DL-BWP-3 and the UL-BWP-3 may be active in response to the DL-BWP-3 being linked/paired with the UL-BWP-3.

In an example, at a first time (e.g., slot), the DL-BWP-1 and the UL-BWP-2 may not be active in response to the DL-BWP-1 not being linked/paired with the UL-BWP-2. In an example, at a first time (e.g., slot), the DL-BWP-2 and the UL-BWP-1 may not be active in response to the DL-BWP-2 not being linked/paired with the UL-BWP-1.

In an example, the wireless device may operate on the DL-BWP-1 and the UL-BWP-1 simultaneously. The DL-BWP-1 and the UL-BWP-1 may be an active DL BWP and an active UL BWP, respectively in response to the operating. In an example, when the wireless device switches the active DL BWP from the DL-BWP-1 to the DL-BWP-2, the wireless device may switch the active UL BWP from the UL-BWP-1 to the UL-BWP-2 in response to the DL-BWP-2 being linked to the UL-BWP-2. In an example, the switching may be triggered in response to receiving a DCI indicating the DL-BWP-2 index, an expiry of BWP inactivity timer associated with the DL-BWP-1 or receiving an RRC message indicating the DL-BWP-2 index.

In an example, the wireless device may operate on the DL-BWP-1 and the UL-BWP-1 simultaneously. The DL-BWP-1 and the UL-BWP-1 may be an active DL BWP and an active UL BWP, respectively in response to the operating. In an example, when the wireless device switches the active UL BWP from the UL-BWP-1 to the UL-BWP-2, the wireless device may switch the active DL BWP from the DL-BWP-1 to the DL-BWP-2 in response to the DL-BWP-2 being linked to the UL-BWP-2. In an example, the switching may be triggered in response to receiving a DCI indicating the UL-BWP-2 index or receiving an RRC message indicating the UL-BWP-2 index.

Figure 24:
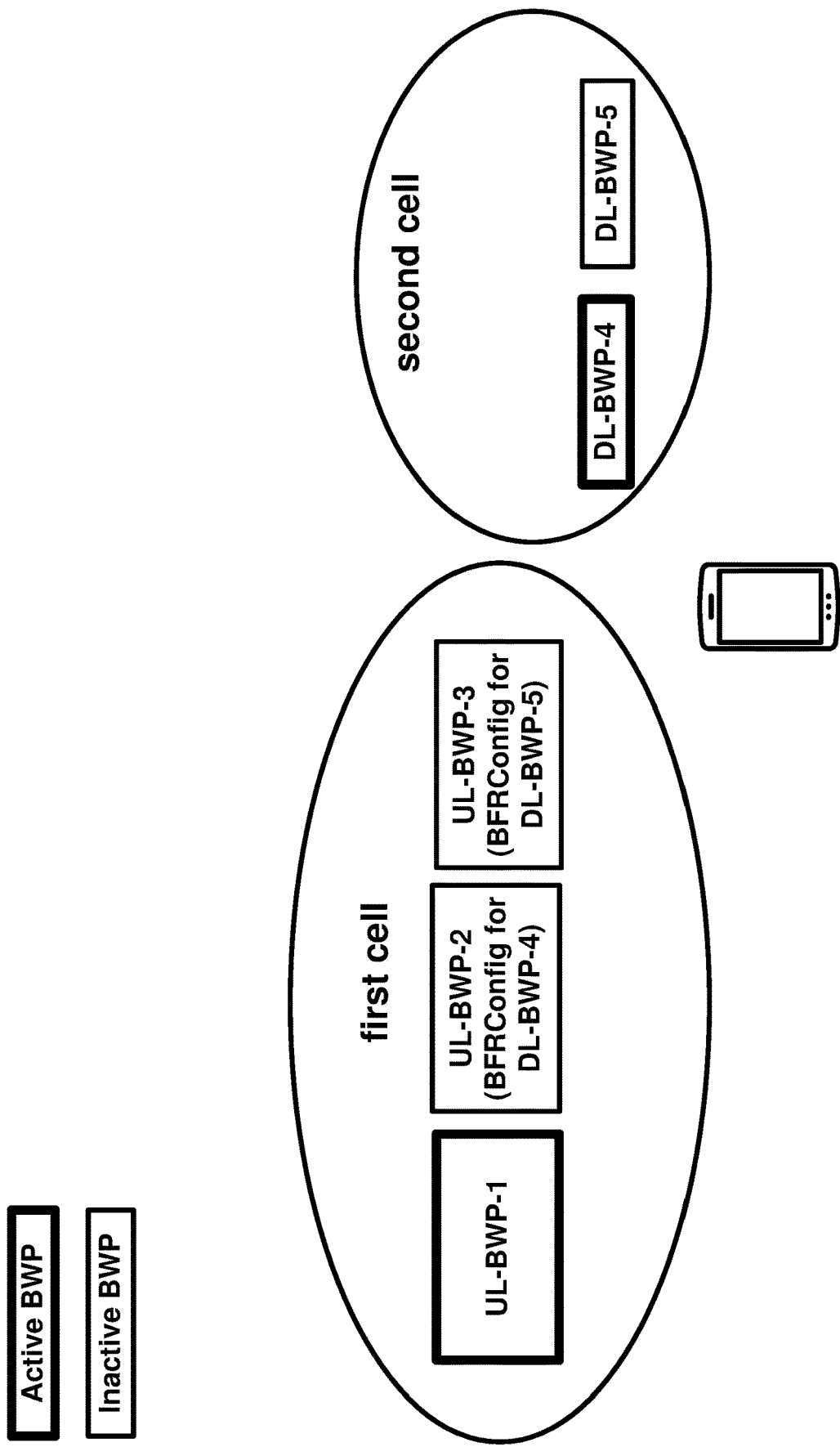
FIG. 24 shows an example of a BWP switching in beam failure recovery procedure as per an aspect of an embodiment of the present disclosure.

FIG. 24 shows an example of a beam failure recovery procedure as per an aspect of an embodiment of the present disclosure.

A wireless device may receive, from a base station, one or more messages comprising configuration parameters for a first cell (e.g., PCell, SCell) and one or more secondary cells. The one or more secondary cells may comprise a second cell (e.g., SCell). The one or more messages may comprise one or more RRC messages (e.g. RRC connection reconfiguration message, or RRC connection reestablishment message, or RRC connection setup message).

In an example, the configuration parameters may comprise bandwidth part (BWP) configuration parameters for a plurality of BWPs. The plurality of BWPs may comprise a first plurality of DL BWPs of the first cell and a first plurality of UL BWPs of the first cell. In FIG. 24, the first plurality of DL BWPs may comprise DL-BWP-1, DL-BWP-2 and DL-BWP-3. In FIG. 24, the first plurality of UL BWPs may comprise UL-BWP-1, UL-BWP-2 and UL-BWP-3.

In an example, the plurality of BWPs may comprise a second plurality of DL BWPs of the second cell. In FIG. 24, the second plurality of DL BWPs may comprise DL-BWP-4 and DL-BWP-5.

In an example, each of the plurality of BWPs may be identified by a BWP specific index.

In an example, the DL-BWP-1, the DL-BWP-2, the DL-BWP-3, the DL-BWP-4, and the DL-BWP-5 may be identified with DL-BWP-1 index, DL-BWP-2 index, DL-BWP-3 index, DL-BWP-4 index, and DL-BWP-5 index (e.g., provided by a higher layer parameter bwp-ID), respectively.

In an example, the UL-BWP-1, the UL-BWP-2, and the UL-BWP-3 may be identified with UL-BWP-1 index, UL-BWP-2 index, and UL-BWP-3 index (e.g., provided by a higher layer parameter bwp-ID), respectively.

In an example, the configuration parameters may further comprise DL-BWP-specific BFR configuration parameters (e.g., RadioLinkMonitoringConfig) for at least one of the second plurality of DL BWPs (e.g., DL-BWP-4, DL-BWP-5) of the second cell.

In an example, in FIG. 24, fourth DL-BWP-specific BFR configuration parameters for the DL-BWP-4 of the second cell may comprise one or more fourth RSs (e.g., RadioLinkMonitoringRS) of the DL-BWP-4 and a fourth beam failure instance (BFI) counter (e.g., beamFailureInstanceMaxCount). In an example, the wireless device may assess the one or more fourth RSs (e.g., SSBs, CSI-RSs) to detect a beam failure of the DL-BWP-4.

In an example, fifth DL-BWP-specific BFR configuration parameters for the DL-BWP-5 of the second cell may comprise one or more fifth RSs (e.g., RadioLinkMonitoringRS) of the DL-BWP-5 and a fifth BFI counter (e.g., beamFailureInstanceMaxCount). In an example, the wireless device may assess the one or more fifth RSs (e.g., SSBs, CSI-RSs) to detect a beam failure of the DL-BWP-5.

In an example, the configuration parameters may further comprise UL-BWP-specific BFR configuration parameters (e.g., BeamFailureRecoveryConfig) for at least one of the first plurality of UL BWPs (e.g., UL-BWP-1, UL-BWP-2, UL-BWP-3) of the first cell.

In an example, in FIG. 24, second UL-BWP-specific BFR configuration parameters for the UL-BWP-2 may comprise one or more fourth candidate RSs (e.g., candidateBeamRSList) of the DL-BWP-4 of the second cell and a fourth search space set (e.g., recoverySearchSpaceID) on the DL-BWP-4. In an example, third UL-BWP-specific BFR configuration parameters for the UL-BWP-3 may comprise one or more fifth candidate RSs (e.g., candidateBeamRSList) of the DL-BWP-5 of the second cell and a fifth search space set on the DL-BWP-5.

Figure 25:
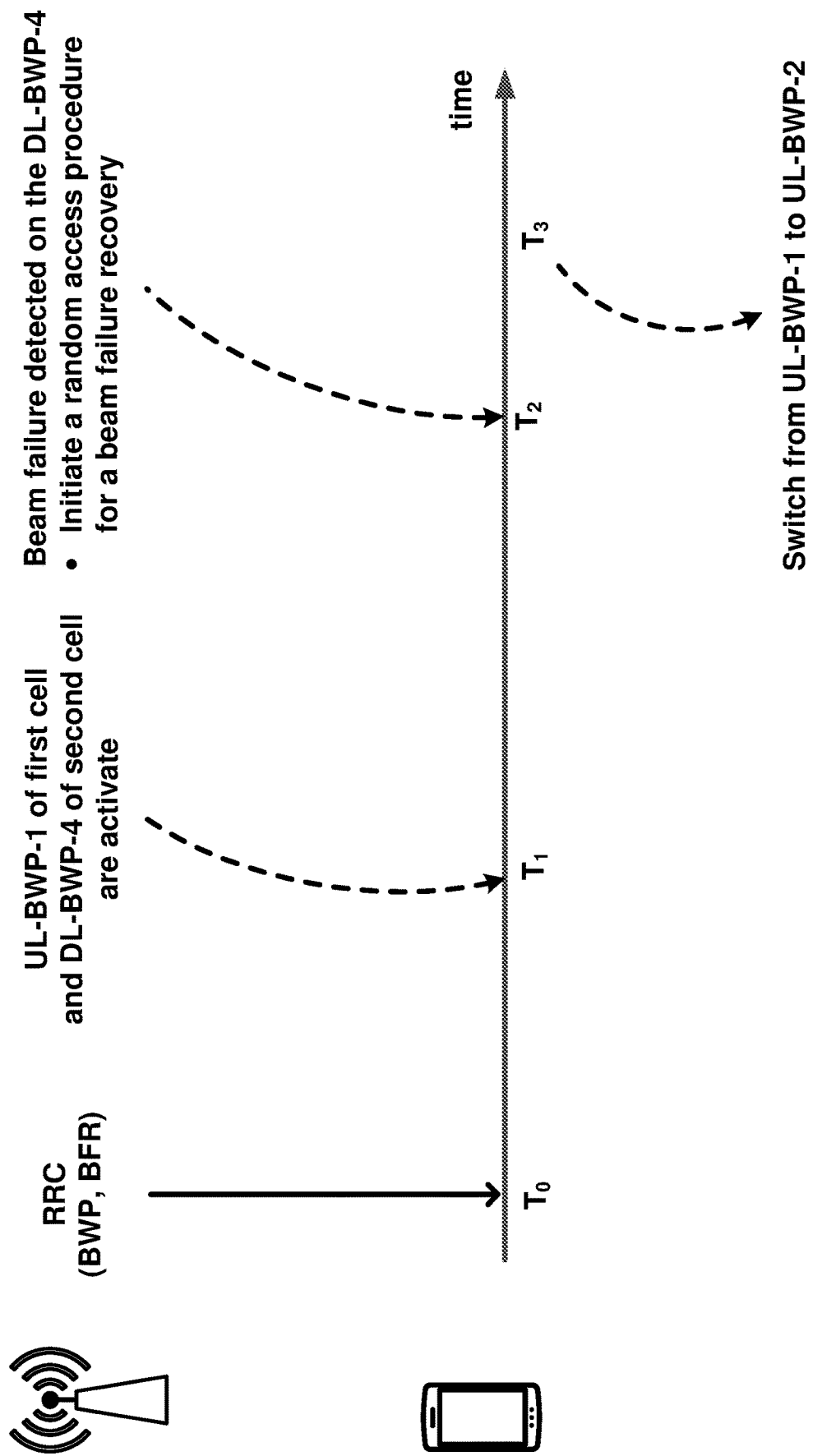
FIG. 25 shows an example of a BWP switching in beam failure recovery procedure as per an aspect of an embodiment of the present disclosure.

FIG. 25 shows an example embodiment. As discussed above in regard to FIG. 24, the wireless device receives the one or more messages comprising the configuration parameters at time T0.

In an example, at time T1, the wireless device may operate on the UL-BWP-1 of the first cell and the DL-BWP-4 of the second cell simultaneously. In an example, in response to the operating, the UL-BWP-1 of the first cell and the DL-BWP-4 of the second cell may be active.

In an example, at time T1, the UL-BWP-1 may be a first active UL BWP of the first cell. In an example, at time T1, the DL-BWP-4 may be a second active DL BWP of the second cell.

In an example, when the DL-BWP-4 is active (e.g., the second active DL BWP of the second cell), a physical layer in the wireless device may assess a radio link quality according to the one or more fourth RSs against a first threshold (e.g., rlmInSyncOutOfSyncThreshold). In an example, the first threshold (e.g. BLER, L1-RSRP) may be a value provided by a higher layer (e.g. RRC, MAC). The physical layer in the wireless device may provide a beam failure instance (BFI) indication to higher layers (e.g. MAC) when the radio link quality of the one or more fourth RSs is worse (e.g., higher BLER, lower L1-RSRP, lower SINR) than the first threshold.

In an example, if the higher layers (e.g. MAC) of the wireless device receives the BFI indication from the physical layer of the wireless device, the wireless device may increment BFI_COUNTER by one (e.g., at time T, 2T, 5T as shown in FIG. 18). The BFI_COUNTER may be a counter for a BFI indication. The BFI_COUNTER may be initially set to zero.

In an example, in response to the incrementing the BFI_COUNTER, the BFI_COUNTER may be equal to or greater than the fourth BFI counter (e.g., beamFailureInstanceMaxCount).

In an example, at time T2, the wireless device may initiate a random access procedure for a beam failure recovery of the second cell (e.g., DL-BWP-4) in response to the BFI_COUNTER being equal to or greater than the fourth BFI counter.

In an example, UL-BWP-specific BFR configuration parameters for the at least one of the first plurality of UL BWPs may comprise one or more candidate RSs (e.g., candidateBeamRSList) of the at least one of the second plurality of DL BWPs of the second cell and a search space set (e.g., recoverySearchSpaceID) on the at least one of the second plurality of DL BWPs.

In an example, when the wireless device initiates a random access procedure for a beam failure recovery of the at least one of the second plurality of DL BWPs, the wireless device may set a first active uplink BWP of the first cell to at least one of the first plurality of UL BWPs in response to the at least one of the first plurality of UL BWPs being configured with UL-BWP-specific BFR configuration parameters associated with the at least one of the second plurality of DL BWPs.

In an example, in FIG. 25, the UL-BWP-1 may not be configured with BFR associated with the DL-BWP-4 parameters (e.g., the second UL-BWP-specific BFR configuration parameters). The BFR parameters may comprise the one or more fourth candidate RSs of the DL-BWP-4 and the fourth search space set on the DL-BWP-4. In an example, the wireless device may not complete the random access procedure for the beam failure recovery successfully in response to the UL-BWP-1 not being configured with the BFR parameters associated with the DL-BWP-4.

In an example, the UL-BWP-2 may be configured with the BFR parameters (e.g., the second UL-BWP-specific BFR configuration parameters). In an example, at time T3, when the wireless device initiates the random access procedure for the beam failure recovery, the wireless device may switch the first active UL BWP of the first cell from the UL-BWP-1 to the UL-BWP-2 in response to the UL-BWP-2 being configured with the BFR parameters.

In an example, in response to the switching the first active UL BWP, the wireless device may perform the random access procedure on the UL-BWP-2 of the first cell. In an example, the performing the random access procedure may comprise selecting a selected beam of the one or more fourth candidate RSs and transmitting at least a first BFR signal (e.g., preamble) to the base station via the UL-BWP-2 in response to the selecting the selected beam.

Figure 26:
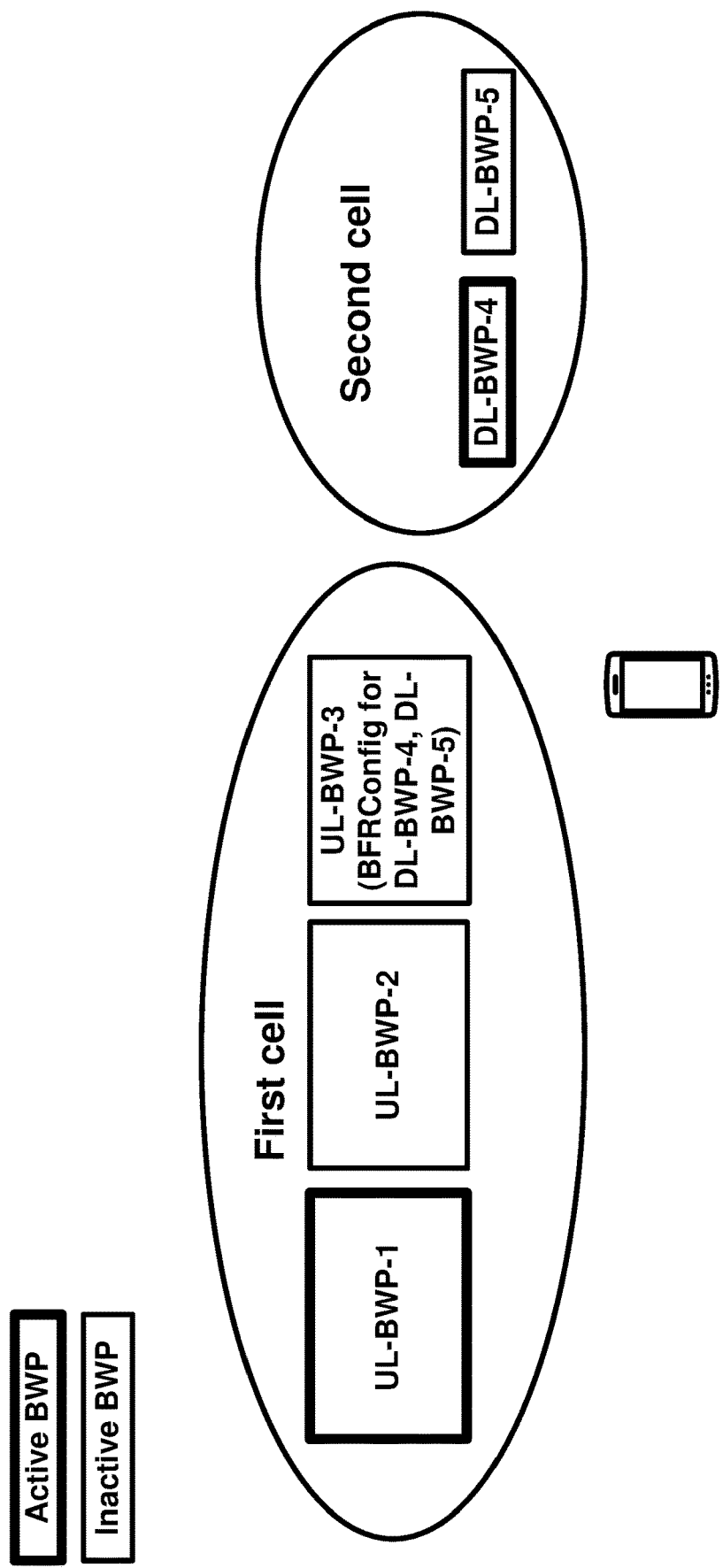
FIG. 26 shows an example of a BWP switching in beam failure recovery procedure as per an aspect of an embodiment of the present disclosure.

FIG. 26 shows an example embodiment. In an example, a base station may configure one of the first plurality of UL BWPs (e.g., UL-BWP-3 in FIG. 26) of the first cell for a beam failure recovery of at least one of the second plurality of DL BWPs of the second cell (e.g., DL-BWP-4 and DL-BWP-5 in FIG. 26).

In an example, the one of the first plurality of UL BWPs may be an initial uplink BWP of the first cell.

In an example, the one of the first plurality of UL BWPs may be a default uplink BWP (if configured) of the first cell. In an example, the default uplink BWP may be configured, to a wireless device, via RRC signaling including defaultUplinkBWP parameter.

In an example, the default uplink BWP may be identified by a default uplink BWP index. In an example, the default uplink BWP index may be the same as a default downlink BWP index. The default downlink BWP index may identify a default downlink BWP of the first cell.

In an example, the one of the first plurality of UL BWPs may be an uplink BWP with a lowest subcarrier spacing among the first plurality of UL BWPs of the first cell.

In an example, the configuration parameters may further comprise a default UL-BWP-specific BFR configuration parameters (e.g., BeamFailureRecoveryConfig) for the one of the first plurality of UL BWPs (e.g., UL-BWP-3 in FIG. 26) of the first cell.

In an example, the default UL-BWP-specific BFR configuration parameters for the one of the first plurality of UL BWPs may comprise one or more candidate RSs (e.g., candidateBeamRSList) of the at least one of the second plurality of DL BWPs of the second cell and a search space set (e.g., recoverySearchSpaceID) on the at least one of the second plurality of DL BWPs of the second cell.

In an example, in FIG. 26, the default UL-BWP-specific BFR configuration parameters for the one of the first plurality of UL BWPs may comprise one or more fourth candidate RSs (e.g., candidateBeamRSList) of the DL-BWP-4 of the second cell and a fourth search space set (e.g., recoverySearchSpaceID) on the DL-BWP-4. In an example, the default UL-BWP-specific BFR configuration parameters for the one of the first plurality of UL BWPs may comprise one or more fifth candidate RSs (e.g., candidateBeamRSList) of the DL-BWP-5 of the second cell and a fifth search space set on the DL-BWP-5.

In an example, the wireless device may initiate a random access procedure for a beam failure recovery of the at least one of the second plurality of DL BWPs (e.g., DL-BWP-4 in FIG. 26).

In an example, when the wireless device initiates the random access procedure, a first active UL BWP (e.g., UL-BWP-1) of the first cell may not be the one of the first plurality of UL BWPs (e.g., UL-BWP-3).

In an example, when the wireless device initiates the random access procedure for the beam failure recovery of the at least one of the second plurality of DL BWPs, the wireless device may set the first active UL BWP of the first cell to the one of the first plurality of UL BWPs (e.g., UL-BWP-3) in response to the one of the first plurality of UL BWPs being configured with the default UL-BWP-specific BFR configuration parameters associated with the at least one of the second plurality of DL BWPs.

In an example, when the wireless device initiates the random access procedure for the beam failure recovery of the at least one of the second plurality of DL BWPs, the wireless device may switch from the first active UL BWP (e.g., UL-BWP-1) of the first cell to the one of the first plurality of UL BWPs (e.g., UL-BWP-3) in response to the one of the first plurality of UL BWPs being configured with the default UL-BWP-specific BFR configuration parameters associated with the at least one of the second plurality of DL BWPs.

In an example, in response to the switching to the one of the first plurality of UL BWPs, the wireless device may perform the random access procedure on the one of the first plurality of UL BWPs of the first cell. In an example, the performing the random access procedure may comprise selecting a selected beam of the one or more candidate RSs and transmitting at least a first BFR signal (e.g., preamble) to the base station via the one of the first plurality of UL BWPs in response to the selecting the selected beam.

In an example, switching a first active UL BWP of the first cell in response to initiating a random access procedure for a second cell may interrupt one or more transmissions/receptions on the first cell. In an example, the base station may avoid the switching the first active UL BWP of the first cell.

Figure 27:
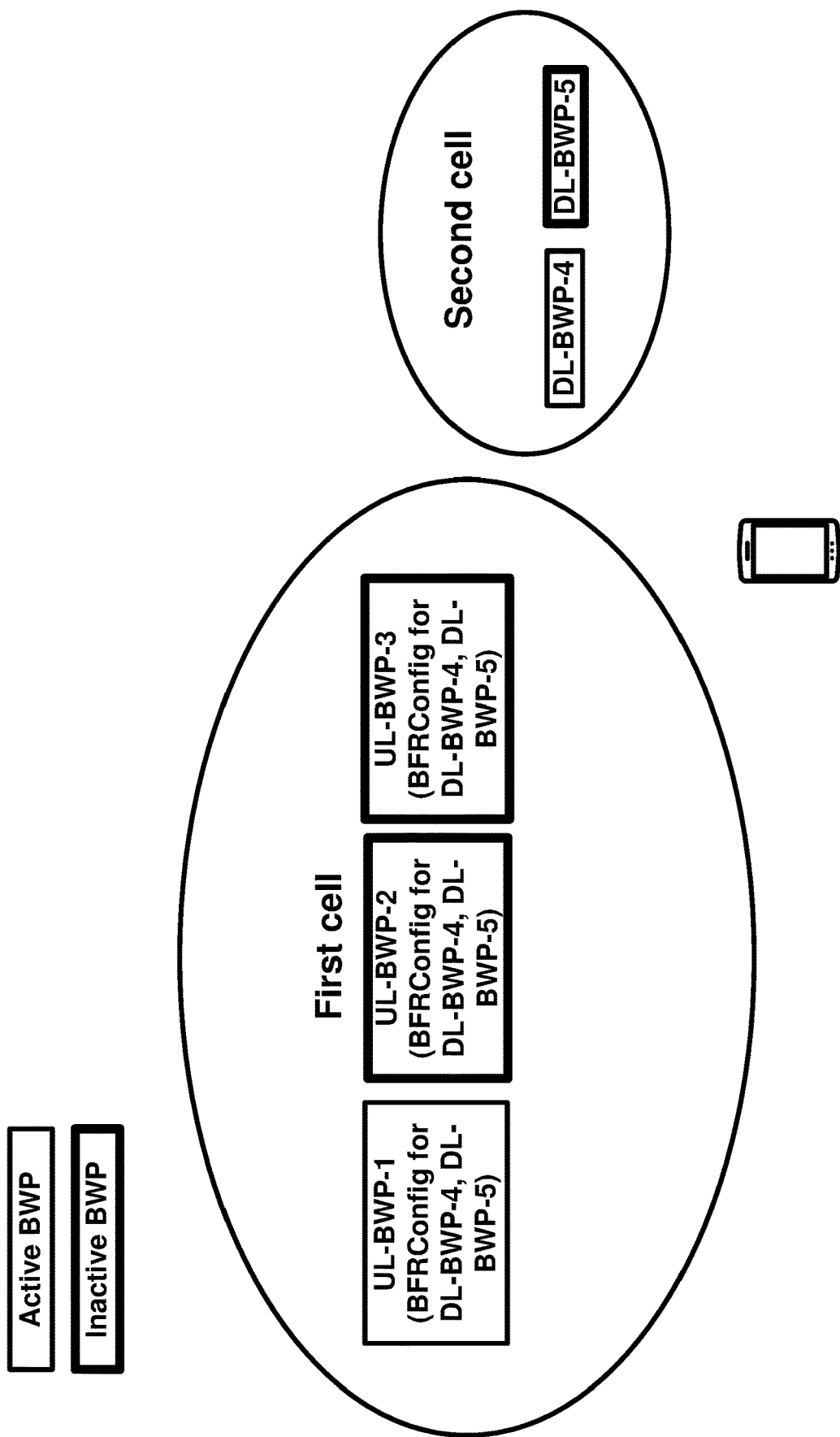
FIG. 27 shows an example of a BWP switching in beam failure recovery procedure as per an aspect of an embodiment of the present disclosure.

FIG. 27 shows an example embodiment. In an example, a base station may configure each of the first plurality of UL BWPs (e.g., UL-BWP-1, UL-BWP-2, UL-BWP-3 in FIG. 27) of the first cell for a beam failure recovery of at least one of the second plurality of DL BWPs of the second cell (e.g., DL-BWP-4 and DL-BWP-5 in FIG. 27).

In an example, a base station may configure each of the first plurality of UL BWPs (e.g., UL-BWP-1, UL-BWP-2, UL-BWP-3 in FIG. 27) of the first cell for a beam failure recovery of each of the second plurality of DL BWPs of the second cell (e.g., DL-BWP-4 and DL-BWP-5 in FIG. 27).

In an example, a base station may configure at least one of the first plurality of UL BWPs (e.g., UL-BWP-1, UL-BWP-2, UL-BWP-3 in FIG. 27) of the first cell for a beam failure recovery of at least one of the second plurality of DL BWPs of the second cell (e.g., DL-BWP-4 and DL-BWP-5 in FIG. 27).

In an example, the configuration parameters may further comprise UL-BWP-specific BFR configuration parameters (e.g., BeamFailureRecoveryConfig) for each of the first plurality of UL BWPs (e.g., UL-BWP-1, UL-BWP-2, UL-BWP-3 in FIG. 27) of the first cell.

In an example, first UL-BWP-specific BFR configuration parameters for the UL-BWP-1 may comprise one or more fourth candidate RSs (e.g., candidateBeamRSList) of the DL-BWP-4 of the second cell and a fourth search space set (e.g., recoverySearchSpaceID) on the DL-BWP-4 of the second cell. In an example, the first UL-BWP-specific BFR configuration parameters for the UL-BWP-1 may comprise one or more fifth candidate RSs (e.g., candidateBeamRSList) of the DL-BWP-5 of the second cell and a fifth search space set (e.g., recoverySearchSpaceID) on the DL-BWP-5 of the second cell.

In an example, second UL-BWP-specific BFR configuration parameters for the UL-BWP-2 may comprise the one or more fourth candidate RSs (e.g., candidateBeamRSList) of the DL-BWP-4 of the second cell and the fourth search space set (e.g., recoverySearchSpaceID) on the DL-BWP-4 of the second cell. In an example, the second UL-BWP-specific BFR configuration parameters for the UL-BWP-2 may comprise the one or more fifth candidate RSs (e.g., candidateBeamRSList) of the DL-BWP-5 of the second cell and the fifth search space set (e.g., recoverySearchSpaceID) on the DL-BWP-5 of the second cell.

In an example, third UL-BWP-specific BFR configuration parameters for the UL-BWP-3 may comprise the one or more fourth candidate RSs (e.g., candidateBeamRSList) of the DL-BWP-4 of the second cell and the fourth search space set (e.g., recoverySearchSpaceID) on the DL-BWP-4 of the second cell. In an example, the third UL-BWP-specific BFR configuration parameters for the UL-BWP-3 may comprise the one or more fifth candidate RSs (e.g., candidateBeamRSList) of the DL-BWP-5 of the second cell and the fifth search space set (e.g., recoverySearchSpaceID) on the DL-BWP-5 of the second cell.

In an example, the wireless device may initiate a random access procedure for a beam failure recovery of the at least one of the second plurality of DL BWPs (e.g., DL-BWP-4 in FIG. 27).

In an example, when the wireless device initiates the random access procedure for the beam failure recovery for the at least one of the second plurality of DL BWPs, the wireless device may not switch the first active UL BWP (e.g., UL-BWP-1 in FIG. 27) of the first cell in response to each of the first plurality of UL BWPs being configured with UL-BWP-specific BFR configuration parameters associated with the at least one of the second plurality of DL BWPs of the second cell.

Figure 28:
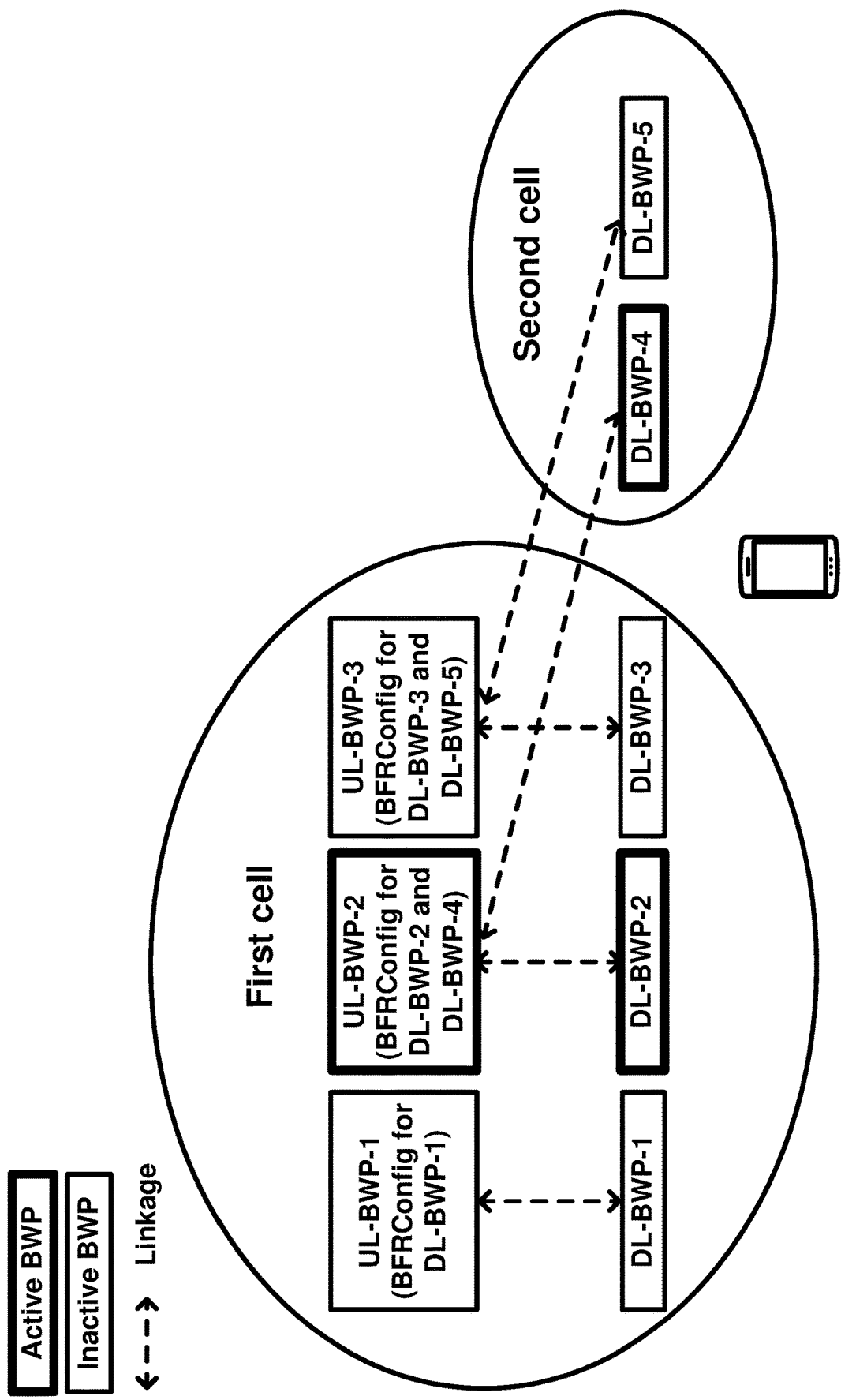
FIG. 28 shows an example of a BWP linkage in beam failure recovery procedure as per an aspect of an embodiment of the present disclosure.

FIG. 28 shows an example of a BWP linkage for a beam failure recovery (BFR) procedure as per an aspect of an embodiment of the present disclosure In an example, a base station may configure at least one of the first plurality of UL BWPs of the first cell with UL-BWP-specific BFR configuration parameters (e.g., BeamFailureRecoveryConfig). The UL-BWP-specific BFR configuration parameters may be associated with at least one of the second plurality of DL BWPs of the second cell.

In an example, the UL-BWP-specific BFR configuration parameters may comprise one or more candidate RSs (e.g., candidateBeamRSList) of the at least one of the second plurality of DL BWPs of the second cell and a search space set (e.g., recoverySearchSpaceID) on the at least one of the second plurality of DL BWPs of the second cell.

In an example, in response to the at least one of the first plurality of UL BWPs being configured with the UL-BWP-specific BFR configuration parameters (e.g., the one or more candidate RSs, the search space set) associated with the at least one of the second plurality of DL BWPs, the at least one of the first plurality of UL BWPs and the at least one of the second plurality of DL BWPs may be linked/paired.

In an example, when the at least one of the second plurality of DL BWPs and the at least one of the first plurality of UL BWPs are linked, BWP switching may be common for the at least one of the second plurality of DL BWPs and the at least one of the first plurality of UL BWPs. In an example, the wireless device may switch the at least one of the second plurality of DL BWPs and the at least one of the first plurality of UL BWPs simultaneously in response to the at least one of the second plurality of DL BWPs being linked/paired with the at least one of the first plurality of UL BWPs.

In an example, the wireless device may operate on the at least one of the second plurality of DL BWPs and the at least one of the first plurality of UL BWPs simultaneously.

In an example, in FIG. 28, the UL-BWP-2 of the first cell and the DL-BWP-4 of the second cell are linked/paired, and the UL-BWP-3 of the first cell and the DL-BWP-5 of the second cell are linked/paired.

In an example, the wireless device may operate on the UL-BWP-2 of the first cell and the DL-BWP-4 of the second cell simultaneously in response to the UL-BWP-2 and the DL-BWP-4 being linked/paired.

In an example, the wireless device may operate on the UL-BWP-3 of the first cell and the DL-BWP-5 of the second cell simultaneously in response to the UL-BWP-3 and the DL-BWP-5 being linked/paired.

In an example, at a first time (e.g., slot, subframe, frame), the DL-BWP-4 and the UL-BWP-2 may be active in response to the DL-BWP-4 being linked/paired with the UL-BWP-2. In an example, at a second time, the DL-BWP-5 and the UL-BWP-3 may be active in response to the DL-BWP-5 being linked/paired with the UL-BWP-3. In an example, at a third time, the DL-BWP-4 and the UL-BWP-2 may be active in response to the DL-BWP-4 being linked/paired with the UL-BWP-2.

In an example, at a first time (e.g., slot), the DL-BWP-4 and the UL-BWP-3 may not be active simultaneously in response to the DL-BWP-4 not being linked/paired with the UL-BWP-3. In an example, at a first time (e.g., slot), the DL-BWP-5 and the UL-BWP-2 may not be active simultaneously in response to the DL-BWP-5 not being linked/paired with the UL-BWP-2.

In an example, the wireless device may operate on the DL-BWP-4 of the second cell and the UL-BWP-2 of the first cell simultaneously. The DL-BWP-4 may be a second active DL BWP of the second cell in response to the operating. The UL-BWP-2 may be a first active UL BWP of the first cell in response to the operating.

In an example, when the wireless device switches the first active UL BWP from the UL-BWP-2 to the UL-BWP-3, the wireless device may switch the second active DL BWP of the second cell from the DL-BWP-4 to the DL-BWP-5 in response to the DL-BWP-5 being linked to the UL-BWP-3. In an example, the switching the first active UL BWP may be triggered in response to receiving a DCI indicating the UL-BWP-3 index, an expiry of BWP inactivity timer associated with the DL-BWP-2 (if the DL-BWP-3 is linked to the UL-BWP-3 and the DL-BWP-3 is a default DL BWP) or receiving an RRC message indicating the UL-BWP-3 index.

In an example, in FIG. 28, the UL-BWP-1 of the first cell may not be linked/paired with at least one of the second plurality of DL BWPs of the second cell. In an example, when the wireless device switches the first active UL BWP from the UL-BWP-2 to the UL-BWP-1, the wireless device may not switch the second active DL BWP of the second cell from the DL-BWP-4 in response to the UL-BWP-1 not being linked/paired with the at least one of the second plurality of DL BWPs of the second cell.

In an example, in response to the switching the first active UL BWP, the wireless device may set the UL-BWP-1 as the first active UL BWP. When the wireless device initiates a random access procedure for a beam failure recovery of the DL-BWP-4, the wireless device may switch the first active UL BWP from the UL-BWP-1 to the UL-BWP-2 in response to the DL-BWP-4 being linked/paired with the UL-BWP-2.

In an example, the wireless device may operate on the DL-BWP-4 of the second cell and the UL-BWP-2 of the first cell simultaneously. The DL-BWP-4 may be a second active DL BWP of the second cell in response to the operating. The UL-BWP-2 may be a first active UL BWP of the first cell in response to the operating. In an example, when the wireless device switches the second active DL BWP from the DL-BWP-4 to the DL-BWP-5, the wireless device may switch the first active UL BWP of the first cell from the UL-BWP-2 to the UL-BWP-3 in response to the DL-BWP-5 being linked to the UL-BWP-3. In an example, the switching the second active DL BWP may be triggered in response to receiving a DCI indicating the DL-BWP-5 index, an expiry of BWP inactivity timer associated with the DL-BWP-4 (if the DL-BWP-5 is a default DL BWP of the second cell) or receiving an RRC message indicating the DL-BWP-5 index.

In an example, the wireless device may operate on the DL-BWP-4 of the second cell and the UL-BWP-2 of the first cell simultaneously. The DL-BWP-4 may be a second active DL BWP of the second cell in response to the operating. The UL-BWP-2 may be a first active UL BWP of the first cell in response to the operating.

In an example, the wireless device may receive a DCI for BWP switching indicating DL-BWP-6 index of DL-BWP-6 of the second plurality of DL BWPs. In an example, a BWP inactivity timer associated with the DL-BWP-4 may expire and the DL-BWP-6 may be a default DL BWP of the second cell. In an example, the wireless device may receive an RRC message for BWP switching indicating the DL-BWP-6 index.

In an example, the DL-BWP-6 may not be linked to the at least one of the first plurality of UL BWPs of the first cell. In an example, the DL-BWP-6 may not be configured with DL-BWP-specific BFR configuration parameters.

In an example, when the wireless device switches the second active DL BWP from the DL-BWP-4 to the DL-BWP-6 of the second plurality of DL BWPs, the wireless device may not switch the first active UL BWP in response to the DL-BWP-6 not being linked to the at least one of the first plurality of UL BWPs of the first cell.

In an example, when the wireless device switches the second active DL BWP from the DL-BWP-4 to the DL-BWP-6 of the second plurality of DL BWPs, the wireless device may not switch the first active UL BWP in response to the DL-BWP-6 not being configured with the DL-BWP-specific BFR configuration parameters In an example, at least one of the second plurality of DL BWPs may be a second active DL BWP of the second cell. In an example, the at least one of the first plurality of UL BWPs of the first cell may be a first active UL BWP of the first cell. The at least one of the second plurality of DL BWPs and the at least one of the first plurality of UL BWPs of the first cell may be linked/paired.

In an example, a BWP inactivity timer associated with the at least one of the second plurality of DL BWPs may expire. In an example, a second DL BWP of the second plurality of DL BWPs may be a second default DL BWP of the second cell.

In an example, the base station may configure the second DL BWP with DL-BWP-specific BFR configuration parameters. The DL-BWP-specific BFR configuration parameters may comprise one or more RSs (e.g., RadioLinkMonitoringRS) of the second DL BWP.

In an example, the second DL BWP may not be linked/paired with the at least one of the first plurality of UL BWPs of the first cell.

In an example, when the BWP inactivity timer associated with the at least one of the second plurality of DL BWPs expires, the wireless device may not switch from the at least one of the second plurality of DL BWPs to the second DL BWP in response to the second DL BWP not being linked/paired with the at least one of the first plurality of UL BWPs of the first cell. In an example, the wireless device may keep/maintain the at least one of the second plurality of DL BWPs as the second active DL BWP in response to the not switching.

In an example, the base station may not configure the second DL BWP with DL-BWP-specific BFR configuration parameters. In an example, when the BWP inactivity timer associated with the at least one of the second plurality of DL BWPs expires, the wireless device may switch from the at least one of the second plurality of DL BWPs to the second DL BWP in response to the second DL BWP not being configured with the DL-BWP-specific BFR configuration parameters. In an example, the wireless device may set the second DL BWP as the second active DL BWP in response to the switching In an example, the wireless device may receive a DCI for BWP switching. The DCI may indicate a second DL BWP of the second plurality of DL BWPs of the second cell.

In an example, the base station may configure the second DL BWP with DL-BWP-specific BFR configuration parameters. The DL-BWP-specific BFR configuration parameters may comprise one or more RSs (e.g., RadioLinkMonitoringRS) of the second DL BWP.

In an example, the second DL BWP may not be linked/paired with the at least one of the first plurality of UL BWPs of the first cell.

In an example, when the wireless device the DCI indicating the second DL BWP, the wireless device may not switch from the at least one of the second plurality of DL BWPs to the second DL BWP in response to the second DL BWP not being linked/paired with the at least one of the first plurality of UL BWPs of the first cell. In an example, the wireless device may keep/maintain the at least one of the second plurality of DL BWPs as the second active DL BWP in response to the not switching.

In an example, the base station may not configure the second DL BWP with DL-BWP-specific BFR configuration parameters. In an example, when the wireless device the DCI indicating the second DL BWP, the wireless device may switch from the at least one of the second plurality of DL BWPs to the second DL BWP in response to the second DL BWP not being configured with the DL-BWP-specific BFR configuration parameters. In an example, the wireless device may set the second DL BWP as the second active DL BWP in response to the switching In an example, the wireless device may receive an RRC message for BWP switching. The RRC message may indicate a second DL BWP of the second plurality of DL BWPs of the second cell.

In an example, the base station may configure the second DL BWP with DL-BWP-specific BFR configuration parameters. The DL-BWP-specific BFR configuration parameters may comprise one or more RSs (e.g., RadioLinkMonitoringRS) of the second DL BWP.

In an example, the second DL BWP may not be linked/paired with the at least one of the first plurality of UL BWPs of the first cell.

In an example, when the wireless device receives the RRC message indicating the second DL BWP, the wireless device may not switch from the at least one of the second plurality of DL BWPs to the second DL BWP in response to the second DL BWP not being linked/paired with the at least one of the first plurality of UL BWPs of the first cell. In an example, the wireless device may keep/maintain the at least one of the second plurality of DL BWPs as the second active DL BWP in response to the not switching.

In an example, the base station may not configure the second DL BWP with DL-BWP-specific BFR configuration parameters. In an example, when the wireless device the RRC message indicating the second DL BWP, the wireless device may switch from the at least one of the second plurality of DL BWPs to the second DL BWP in response to the second DL BWP not being configured with the DL-BWP-specific BFR configuration parameters. In an example, the wireless device may set the second DL BWP as the second active DL BWP in response to the switching.

In an example, the at least one of the second plurality of DL BWPs of the second cell may be linked/paired with the at least one of the first plurality of UL BWPs of the first cell. In response to the at least one of the second plurality of DL BWPs being linked/paired with the at least one of the first plurality of UL BWPs, the base station may not configure the at least one of the second plurality of DL BWPs with a BWP inactivity timer.

In an example, in FIG. 28, the DL-BWP-4 may not be configured, by the base station, with a BWP inactivity timer in response to being linked/paired with the UL-BWP-2.

In an example, the at least one of the second plurality of DL BWPs of the second cell may be linked/paired with the at least one of the first plurality of UL BWPs of the first cell. The base station may configure the at least one of the second plurality of DL BWPs with a BWP inactivity timer. In response to the at least one of the second plurality of DL BWPs being linked/paired with the at least one of the first plurality of UL BWPs, the base station may set a value of the BWP inactivity timer to infinity.

In an example, in FIG. 28, a value of a BWP inactivity timer of the DL-BWP-4 may be set, by the base station, to infinity in response to being linked/paired with the UL-BWP-2.

In an example, the at least one of the second plurality of DL BWPs of the second cell may be linked/paired with the at least one of the first plurality of UL BWPs of the first cell. The base station may configure the at least one of the second plurality of DL BWPs with a BWP inactivity timer. The BWP inactivity timer may expire. When the BWP inactivity timer expires, in response to the at least one of the second plurality of DL BWPs being linked/paired with the at least one of the first plurality of UL BWPs, the wireless device may not switch from the at least one of the second plurality of DL BWPs to a second default DL BWP of the second cell.

In an example, the at least one of the second plurality of DL BWPs (e.g., DL-BWP-4) of the second cell may be linked/paired with the at least one of the first plurality of UL BWPs (e.g., UL-BWP-2) of the first cell. As discussed above in regard to FIG. 23, the at least one of the first plurality of UL BWPs (e.g., UL-BWP-2) of the first cell may be linked/paired with at least one of the first plurality of DL BWPs (e.g., DL-BWP-2) of the first cell. In an example, in response to the at least one of the second plurality of DL BWPs being linked/paired with the at least one of the first plurality of UL BWPs and the at least one of the first plurality of UL BWPs being linked/paired with the at least one of the first plurality of DL BWPs, the at least one of the first plurality of DL BWPs (e.g., DL-BWP-2) of the first cell may be linked/paired with the at least one of the second plurality of DL BWPs (e.g., DL-BWP-4) of the second cell.

In an example, in FIG. 28, the UL-BWP-2, the DL-BWP-2 and the DL-BWP-4 may be linked/paired, the UL-BWP-3, DL-BWP-3 and the DL-BWP-5 may be linked/paired.

In an example, the wireless device may operate on the DL-BWP-2 and the UL-BWP-2 of the first cell and the DL-BWP-4 of the second cell simultaneously.

In an example, the wireless device may (re)-start a first BWP inactivity timer associated with the at least one of the first plurality of DL BWPs (e.g., DL-BWP-2) of the first cell. The wireless device may re-(start) a second BWP inactivity timer associated with the at least one of the second plurality of DL BWPs (e.g., DL-BWP-4) of the second cell in response to the at least one of the first plurality of DL BWPs being linked/paired with the at least one of the second plurality of DL BWPs.

In an example, the (re)-starting the first BWP inactivity timer may be triggered in response to receiving at least one PDCCH on the at least one of the first plurality of DL BWPs (e.g., DL-BWP-2) of the first cell.

In an example, the (re)-starting the first BWP inactivity timer may be triggered in response to receiving at least one PDCCH for the at least one of the first plurality of DL BWPs (e.g., DL-BWP-2) of the first cell.

The at least one PDCCH may be addressed to a first RNTI (e.g., C-RNTI, CS-RNTI). The at least one PDCCH may indicate a downlink assignment or an uplink grant.

In an example, the (re)-starting the first BWP inactivity timer may be triggered in response to transmitting a MAC PDU in a configured uplink grant.

In an example, the (re)-starting the first BWP inactivity timer may be triggered in response to receiving a MAC PDU in a configured downlink assignment.

In an example, in FIG. 28, the wireless device may re-(start) a first BWP inactivity timer associated with the DL-BWP-2. When the wireless device (re)-starts the first BWP inactivity timer, the wireless device may (re)-start a second BWP inactivity timer associated with the DL-BWP-4 in response to the DL-BWP-2 and the DL-BWP-4 being linked/paired.

In an example, the wireless device may (re)-start a second BWP inactivity timer associated with the at least one of the second plurality of DL BWPs (e.g., DL-BWP-4) of the second cell. The wireless device may re-(start) a first BWP inactivity timer associated with the at least one of the first plurality of DL BWPs (e.g., DL-BWP-2) of the first cell in response to the at least one of the first plurality of DL BWPs being linked/paired with the at least one of the second plurality of DL BWPs.

In an example, the (re)-starting the second BWP inactivity timer may be triggered in response to receiving at least one PDCCH on the at least one of the second plurality of DL BWPs (e.g., DL-BWP-4) of the second cell.

In an example, the (re)-starting the second BWP inactivity timer may be triggered in response to receiving at least one PDCCH for the at least one of the second plurality of DL BWPs (e.g., DL-BWP-4) of the second cell.

The at least one PDCCH may be addressed to a first RNTI (e.g., C-RNTI, CS-RNTI). The at least one PDCCH may indicate a downlink assignment or an uplink grant.

In an example, the (re)-starting the second BWP inactivity timer may be triggered in response to transmitting a MAC PDU in a configured uplink grant.

In an example, the (re)-starting the second BWP inactivity timer may be triggered in response to receiving a MAC PDU in a configured downlink assignment.

In an example, in FIG. 28, the wireless device may re-(start) a second BWP inactivity timer associated with the DL-BWP-4. When the wireless device (re)-starts the second BWP inactivity timer, the wireless device may (re)-start a first BWP inactivity timer associated with the DL-BWP-2 in response to the DL-BWP-2 and the DL-BWP-4 being linked/paired.

In an example, the wireless device may stop a first BWP inactivity timer associated with the at least one of the first plurality of DL BWPs (e.g., DL-BWP-2) of the first cell. The wireless device may stop a second BWP inactivity timer associated with the at least one of the second plurality of DL BWPs (e.g., DL-BWP-4) of the second cell in response to the at least one of the first plurality of DL BWPs being linked/paired with the at least one of the second plurality of DL BWPs.

In an example, the stopping the first BWP inactivity timer may be triggered in response to initiating a random access procedure on the first cell.

In an example, in FIG. 28, the wireless device may stop a first BWP inactivity timer associated with the DL-BWP-2.

When the wireless device stops the first BWP inactivity timer, the wireless device may stop a second BWP inactivity timer associated with the DL-BWP-4 in response to the DL-BWP-2 and the DL-BWP-4 being linked/paired.

In an example, the wireless device may stop a second BWP inactivity timer associated with the at least one of the second plurality of DL BWPs (e.g., DL-BWP-4) of the second cell. The wireless device may stop a first BWP inactivity timer associated with the at least one of the first plurality of DL BWPs (e.g., DL-BWP-2) of the first cell in response to the at least one of the first plurality of DL BWPs being linked/paired with the at least one of the second plurality of DL BWPs.

In an example, the stopping the second BWP inactivity timer may be triggered in response to initiating a random access procedure on/for the second cell.

In an example, in FIG. 28, the wireless device may stop a second BWP inactivity timer associated with the DL-BWP-4. When the wireless device stops the second BWP inactivity timer, the wireless device may stop a first BWP inactivity timer associated with the DL-BWP-2 in response to the DL-BWP-2 and the DL-BWP-4 being linked/paired.

Figure 29:
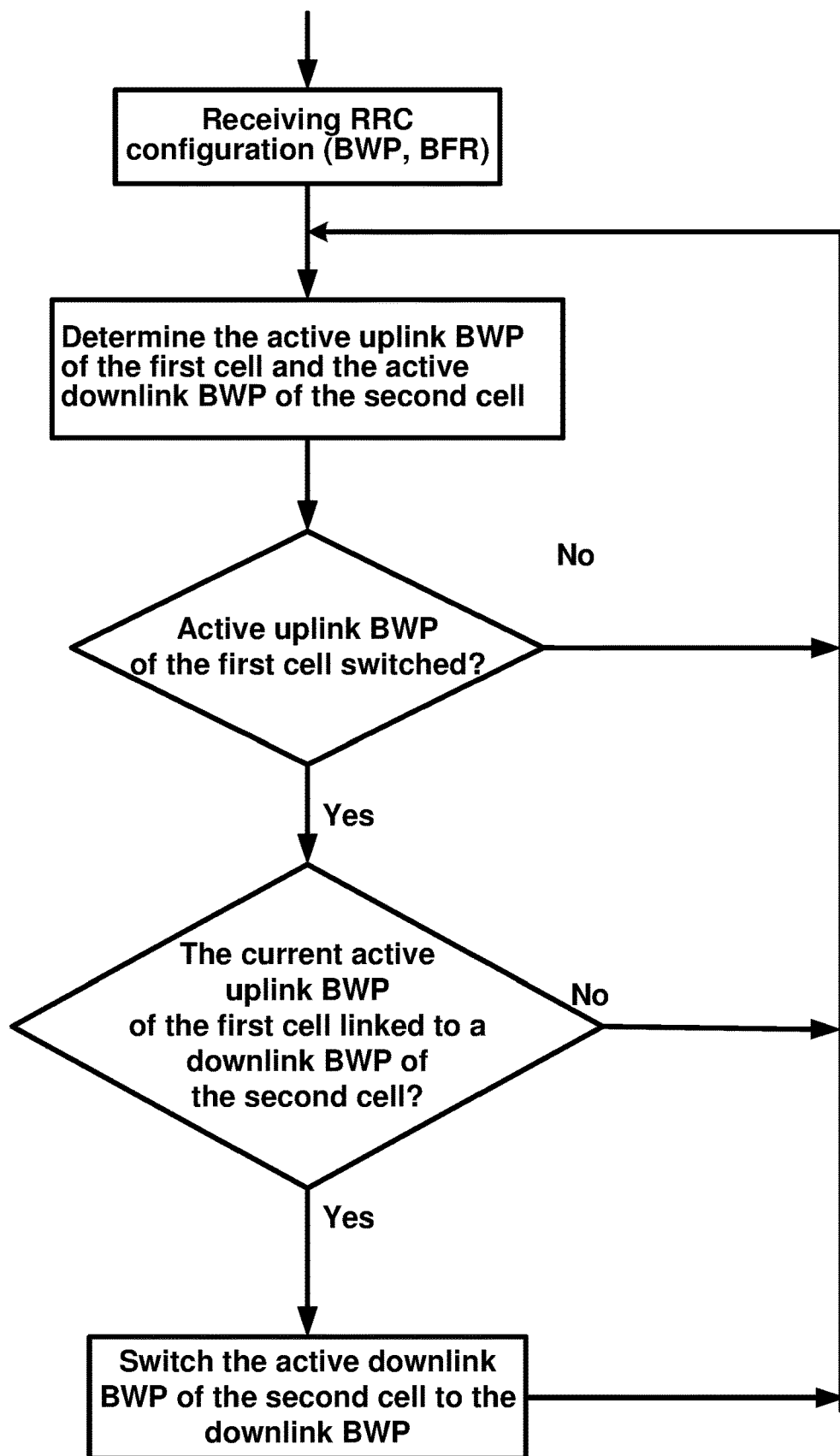
FIG. 29 shows an example flowchart of a BWP linkage in beam failure recovery procedure as per an aspect of an embodiment of the present disclosure.

FIG. 29 shows an example flowchart of FIG. 28.

In an example, a wireless device may receive, from a base station, one or more messages. The one or more messages may comprise one or more configuration parameters of a first cell and a second cell.

In an example, the one or more configuration parameters may indicate a first plurality of bandwidth parts (BWPs) of the first cell. The first plurality of BWPs may comprise a first uplink BWP of the first cell.

In an example, the one or more configuration parameters may further indicate a second plurality of BWPs. The second plurality of BWPs may comprise a first downlink BWP of the second cell.

In an example, the wireless device may activate, in a first slot, the first uplink BWP of the first cell. In an example, the wireless device may activate, in a second slot, the first downlink BWP of the second cell. In an example, the first uplink BWP and the first downlink BWP may be a first active uplink BWP of the first cell and a first active downlink BWP of the second cell, respectively.

In an example, the first slot and the second slot may be the same.

In an example, the first slot and the second slot may be different.

In an example, the one or more configuration parameters may further comprise downlink beam failure recovery (BFR) configuration parameters. The downlink BFR configuration parameters may comprise a set of reference signal (RS) resource configurations for the first downlink BWP. The set of RS resource configurations may comprise one or more first RSs (e.g., CSI-RS or SS blocks) of the first downlink BWP.

In an example, the wireless device may monitor at least one PDCCH of the first downlink BWP. At least one RS (e.g., DM-RS) of the at least one PDCCH may be associated (e.g., QCLed) with the one or more first RSs.

In an example, the wireless device may assess radio link quality of the one or more first RSs of the first downlink BWP.

In an example, a physical layer of the wireless device may indicate a beam failure instance (BFI) to a medium-access (MAC) layer of the wireless device in response to the assessing the one or more first RSs with the radio link quality lower than a threshold. In an example, the threshold (e.g. hypothetical BLER, L1-RSRP) may be a value provided by the one or more configuration parameters (e.g. RRC).

In an example, the threshold may correspond to a default value of higher layer parameter rlmInSyncOutOfSyncThreshold.

In an example, the one or more configuration parameters may indicate a value of a BFI counter (e.g., beamFailureInstanceMaxCount). In an example, the wireless device may initiate a random-access procedure for a beam failure recovery of the first downlink BWP of the second cell based on a number of BFI indications and the value. In an example, the number of BFI indications may be equal to or greater than the value.

In an example, the wireless device may determine that a second uplink BWP of the first plurality of BWPs of the first cell is configured with uplink BFR configuration parameters of the first downlink BWP. In an example, the uplink BFR configuration parameters may comprise one or more candidate RSs (e.g., candidateBeamRSList) of the first downlink BWP and a search space set (e.g., recoverySearchSpaceID) on the first downlink BWP.

In an example, the wireless device may set/switch the first active uplink BWP of the first cell from the first uplink BWP to the second uplink BWP in response to the determining.

In an example, the wireless device may transmit a preamble via the second uplink BWP for the beam failure recovery in response to the setting/switching the first active uplink BWP to the second uplink BWP.

In an example, a wireless device may receive, from a base station, one or more messages. The one or more messages may comprise one or more configuration parameters of a first cell and a second cell.

In an example, the one or more configuration parameters may indicate a first plurality of bandwidth parts (BWPs) of the first cell. The first plurality of BWPs may comprise a first uplink BWP and a second uplink BWP of the first cell.

In an example, the one or more configuration parameters may further indicate a second plurality of BWPs. The second plurality of BWPs may comprise a first downlink BWP and a second downlink BWP of the second cell.

In an example, the wireless device may activate, in a first slot, the first uplink BWP of the first cell. In an example, the wireless device may activate, in a second slot, the first downlink BWP of the second cell. In an example, the first uplink BWP and the first downlink BWP may be a first active uplink BWP of the first cell and a first active downlink BWP of the second cell, respectively.

In an example, the first slot and the second slot may be the same.

In an example, the first slot and the second slot may be different.

In an example, the wireless device may set/switch the first active uplink BWP of the first cell from the first uplink BWP to the second uplink BWP.

In an example, the setting/switching may be triggered in response to receiving a DCI for BWP switching. The DCI may indicate the second uplink BWP.

In an example, the setting/switching may be triggered in response to receiving an RRC message for BWP switching. The RRC message may indicate the second uplink BWP.

In an example, the setting/switching may be triggered in response to an expiry of a BWP inactivity timer of a downlink BWP linked to the first uplink BWP.

In an example, the wireless device may determine that the second uplink BWP of the first cell is configured with uplink beam failure recovery configuration parameters of the second downlink BWP. In an example, the uplink beam failure recovery configuration parameters may comprise one or more candidate RSs (e.g., candidateBeamRSList) of the second downlink BWP and a search space set (e.g., recoverySearchSpaceID) on the second downlink BWP.

In an example, the wireless device may set/switch the first active downlink BWP of the second cell from the first downlink BWP to the second downlink BWP in response to the determining.

Figure 30:
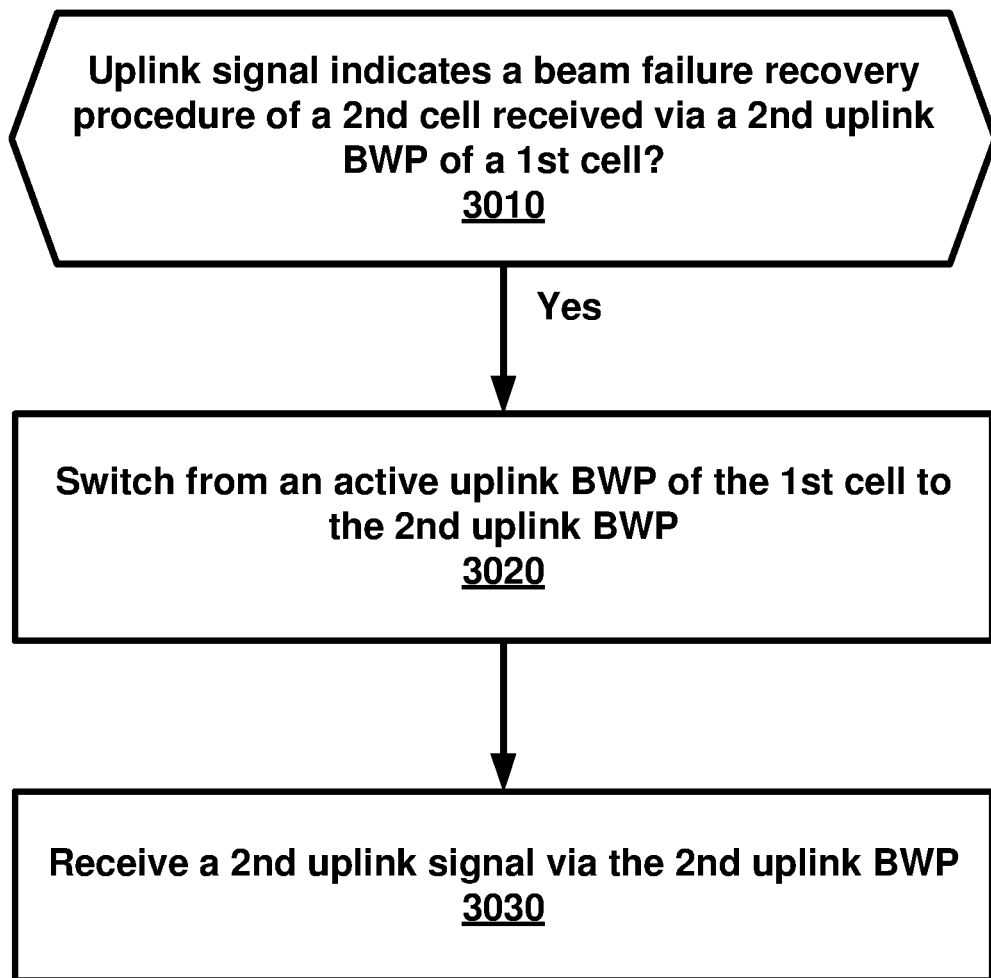
FIG. 30 is a flow diagram as per an aspect of an example embodiment of the present disclosure.

FIG. 30 is a flow diagram as per an aspect of an example embodiment of the present disclosure. At 3010, a base station may receive, from a wireless device via a second uplink BWP of a first cell, an uplink signal indicating a beam failure recovery procedure of a second cell. At 3020, based on the receiving, an active uplink BWP of the first cell may be switched the second uplink BWP. At 3030, a second uplink signal may be received, from the wireless device, via the second uplink BWP.

Figure 31:
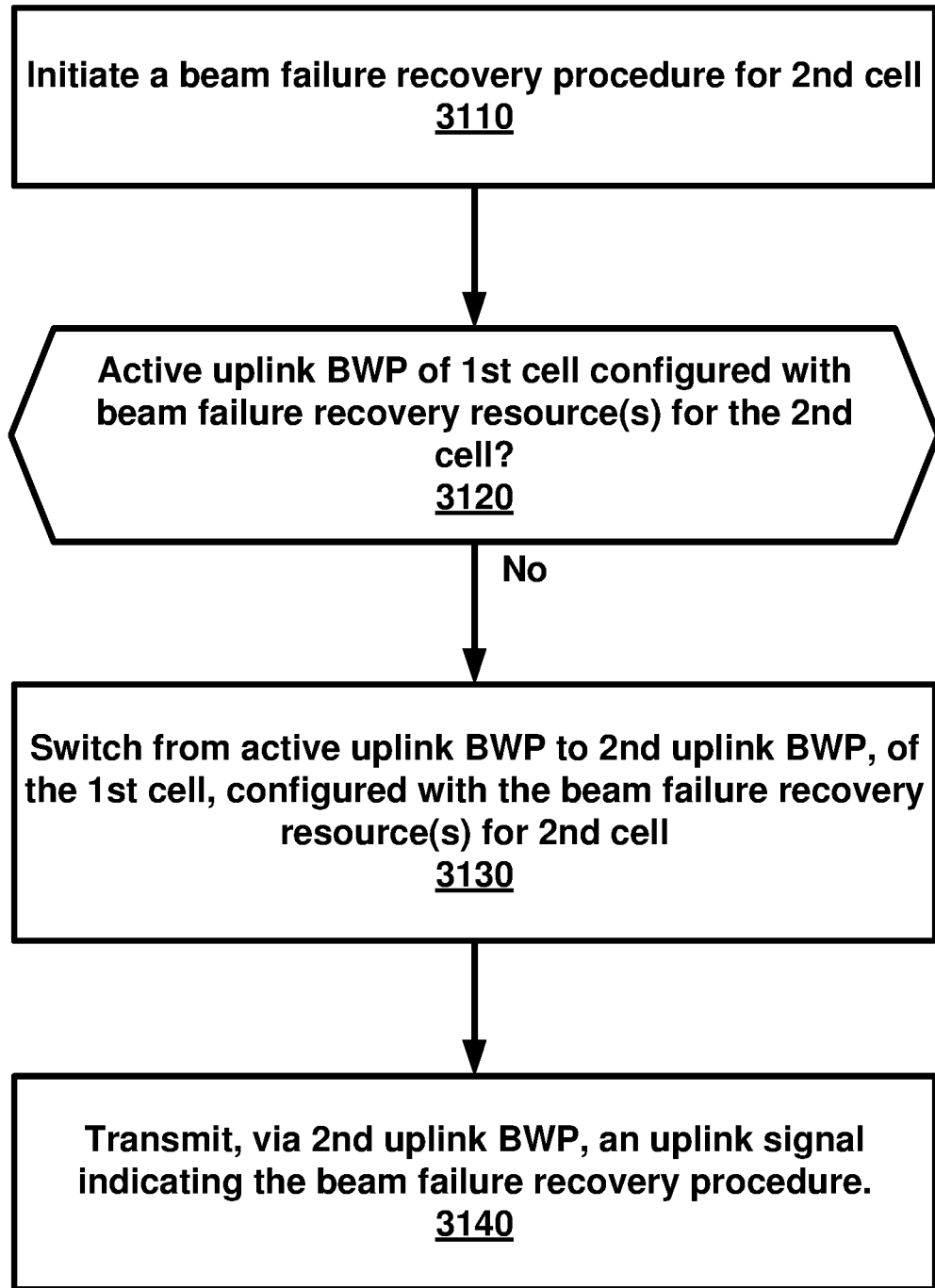
FIG. 31 is a flow diagram as per an aspect of an example embodiment of the present disclosure.

FIG. 31 is a flow diagram as per an aspect of an example embodiment of the present disclosure. At 3110, a wireless device may initiate a beam failure recovery procedure for a second cell. At 3120, a determination may be made that an active uplink BWP of a first cell is not configured with one or more beam failure recovery resources for the second cell. At 3130, based on the determination, the active uplink BWP may be switched to a second uplink BWP of the first cell. The second uplink BWP may be configured with the one or more beam failure recovery resources for the second cell. At 3140, an uplink signal indicating the beam failure recovery procedure may be transmitted via the second uplink BWP.

According to an example embodiment, a wireless device may receive one or more messages comprising one or more configuration parameters of a first cell and a second cell. The one or more configuration parameters may indicate a plurality of bandwidth parts (BWPs) of the first cell. The wireless device may activate a first uplink BWP of the plurality of BWPs as an active uplink BWP. The wireless device may initiate a beam failure recovery procedure for the second cell based on detecting a beam failure. The wireless device may determine that the first uplink BWP is not configured with one or more beam failure recovery resources for the second cell. Based on the determining, the wireless device may switch the active uplink BWP of the first cell from the first uplink BWP to a second uplink BWP of the plurality of BWPs. The second uplink BWP may be configured with the one or more beam failure recovery resources for the second cell. The wireless device may transmit, via the second uplink BWP, an uplink signal indicating the beam failure.

According to an example embodiment, the switching the active uplink BWP of the first cell from the first uplink BWP to the second uplink BWP may comprise activating the second uplink BWP as the active uplink BWP of the first cell. According to an example embodiment, the switching the active uplink BWP of the first cell from the first uplink BWP to the second uplink BWP may comprise deactivating the first uplink BWP.

According to an example embodiment, the one or more configuration parameters may indicate one or more reference signals (RSs) for the second cell. According to an example embodiment, the one or more RSs may comprise one or more channel state information RSs. According to an example embodiment, the one or more RSs may comprise one or more synchronization signal/physical broadcast channel blocks.

According to an example embodiment, the one or more configuration parameters may indicate a maximum number of beam failure instance indications for the second cell. According to an example embodiment, the detecting the beam failure may comprise detecting the beam failure based on a number of consecutive beam failure instance indications reaching to the maximum number of beam failure instance indications. According to an example embodiment, a beam failure instance indication of the consecutive beam failure instance indications may comprise assessing one or more RSs with radio quality lower than a threshold. According to an example embodiment, the one or more configuration parameters may indicate the threshold. According to an example embodiment, the threshold may be based on a hypothetical block error rate.

According to an example embodiment, the one or more beam failure recovery resources may comprise one or more uplink resources of an uplink physical channel. According to an example embodiment, the transmitting the uplink signal via the second uplink BWP may comprise transmitting the uplink signal via the uplink physical channel of the second uplink BWP. According to an example embodiment, the uplink physical channel may comprise a physical uplink control channel. According to an example embodiment, the uplink physical channel may comprise a physical random access channel. According to an example embodiment, the one or more configuration parameters may indicate the one or more beam failure recovery resources. According to an example embodiment, the uplink signal may comprise a scheduling request. According to an example embodiment, the uplink signal may comprise a random access preamble.

According to an example embodiment, the one or more configuration parameters may indicate one or more second RSs for the second cell. According to an example embodiment, the one or more configuration parameters may indicate an association between each of the one or more second RSs and each of the one or more beam failure recovery resources.

According to an example embodiment, a wireless device may receive one or more messages comprising one or more configuration parameters of a first cell and a second cell. The one or more configuration parameters may indicate a first plurality of uplink bandwidth parts (BWPs) of the first cell. The one or more configuration parameters may indicate a second plurality of downlink BWPs of the second cell. A first uplink BWP of the first plurality of uplink BWPs may be activated as an active uplink BWP. A first downlink BWP of the second plurality of downlink BWPs may be activated as an active downlink BWP. The active uplink BWP of the first cell may be switched from the first uplink BWP to a second uplink BWP of the first plurality of uplink BWPs. A determination may be made that the second uplink BWP of the first cell is configured with one or more beam failure recovery configuration parameters of a second downlink BWP of the second plurality of downlink BWPs. Based on the determination, the active downlink BWP of the second cell may be switched from the first downlink BWP to the second downlink BWP.

According to an example embodiment, a wireless device and/or base station may activate a first uplink BWP of a first plurality of uplink bandwidth parts (BWPs) of a first cell as an active uplink BWP. The wireless device and/or the base station may activate a first downlink BWP of a second plurality of downlink BWPs of a second cell as an active downlink BWP. The active uplink BWP of the first cell may be switched from the first uplink BWP to a second uplink BWP of the first plurality of uplink BWPs. A determination may be made that the second uplink BWP of the first cell is configured with one or more beam failure recovery configuration parameters of a second downlink BWP of the second plurality of downlink BWPs. Based on the determination, the active downlink BWP of the second cell may be switched from the first downlink BWP to the second downlink BWP.

Figure 32:
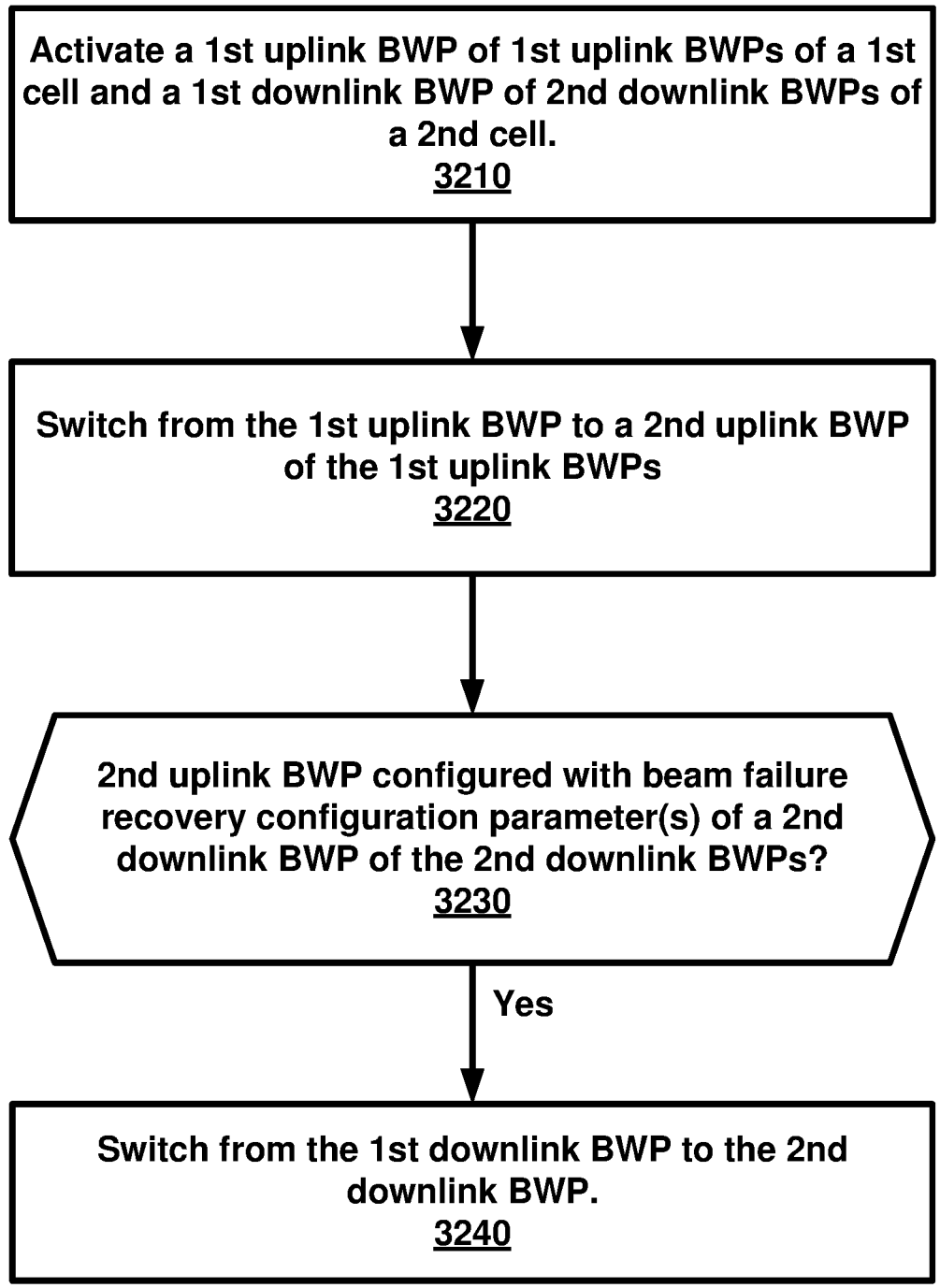
FIG. 32 is a flow diagram as per an aspect of an example embodiment of the present disclosure.

FIG. 32 is a flow diagram as per an aspect of an example embodiment of the present disclosure. At 3210, a wireless device and/or a base station may activate a first uplink BWP of a first plurality of uplink bandwidth parts (BWPs) of a first cell and a first downlink BWP of a second plurality of downlink BWPs of a second cell. At 3220, the first uplink BWP may be switched a second uplink BWP of the first plurality of uplink BWPs. At 3230, a determination may be made that the second uplink BWP is configured with one or more beam failure recovery configuration parameters of a second downlink BWP of the second plurality of downlink BWPs. At 3240, based on the determination, the first downlink BWP may be switched to the second downlink BWP.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by a wireless device, one or more configuration parameters of a first cell and a second cell, wherein the one or more configuration parameters indicate:
        a first bandwidth part (BWP) of the first cell;
        a second BWP of the second cell; and
        beam failure recovery configuration parameters of the first BWP are for one or more beam failure recoveries of the second BWP of the second cell;
    switching to the first BWP of the first cell as an active BWP of the first cell; and
    based on the beam failure recovery configuration parameters of the first BWP being for one or more beam failure recoveries of the second BWP, switching to the second BWP as an active BWP of the second cell.

2. The method of claim 1, wherein the first BWP is an uplink BWP of the first cell.

3. The method of claim 2, wherein the second BWP is a downlink BWP of the second cell.

4. The method of claim 1, further comprising receiving one or more messages comprising the one or more configuration parameters.

5. The method of claim 4, wherein the one or more messages are radio resource control (RRC) messages.

6. The method of claim 1, wherein the one or more configuration parameters further indicate:
    a first plurality of BWPs for the first cell, wherein the first plurality of BWPs comprise the first BWP; and
    a second plurality of BWPs for the second cell, wherein the second plurality of BWPs comprise the second BWP.

7. The method of claim 1, further comprising activating the first BWP based on the switching to the first BWP.

8. The method of claim 1, further comprising activating the second BWP based on the switching to the second BWP.

9. The method of claim 1, wherein the beam failure recovery configuration parameters comprise one or more candidate reference signals (RSs) of the second BWP and a search space set of the second BWP.

10. The method of claim 1, wherein the beam failure recovery configuration parameters comprise a search space set of the second BWP.

11. A wireless device comprising:
    one or more processors; and
    memory storing instructions that, when executed by the one or more processors, cause the wireless device to:
    receive one or more configuration parameters of a first cell and a second cell, wherein the one or more configuration parameters indicate:
        a first bandwidth part (BWP) of the first cell;
        a second BWP of the second cell; and
        beam failure recovery configuration parameters of the first BWP are for one or more beam failure recoveries of the second BWP of the second cell;
    switch to the first BWP of the first cell as an active BWP of the first cell; and
    based on the beam failure recovery configuration parameters of the first BWP being for one or more beam failure recoveries of the second BWP, switch to the second BWP as an active BWP of the second cell.

12. The wireless device of claim 11, wherein the first BWP is an uplink BWP of the first cell.

13. The wireless device of claim 12, wherein the second BWP is a downlink BWP of the second cell.

14. The wireless device of claim 11, wherein the instructions further cause the wireless device to receive one or more messages comprising the one or more configuration parameters.

15. The wireless device of claim 14, wherein the one or more messages are radio resource control (RRC) messages.

16. The wireless device of claim 11, wherein the one or more configuration parameters further indicate:
- a first plurality of BWPs for the first cell, wherein the first plurality of BWPs comprise the first BWP; and
- a second plurality of BWPs for the second cell, wherein the second plurality of BWPs comprise the second BWP.

17. The wireless device of claim 11, wherein the instructions further cause the wireless device to activate the first BWP based on the switching to the first BWP.

18. The wireless device of claim 11, wherein the instructions further cause the wireless device to activate the second BWP based on the switching to the second BWP.

19. The wireless device of claim 11, wherein the beam failure recovery configuration parameters comprise at least one of:
- one or more candidate reference signals (RSs) of the second BWP; or
- a search space set of the second BWP.

20. A system comprising:
a base station comprising one or more first processors and first memory storing first instructions that, when executed by the one or more first processors, cause the base station to:
  transmit one or more configuration parameters of a first cell and a second cell, wherein the one or more configuration parameters indicate:
    a first bandwidth part (BWP) of the first cell;
    a second BWP of the second cell; and
    beam failure recovery configuration parameters of the first BWP are for one or more beam failure recoveries of the second BWP of the second cell; and
a wireless device comprising one or more second processors and second memory storing second instructions that, when executed by the one or more second processors, cause the wireless device to:
  receive, from the base station, the one or more configuration parameters;
  switch to the first BWP of the first cell as an active BWP of the first cell; and
  based on the beam failure recovery configuration parameters of the first BWP being for one or more beam failure recoveries of the second BWP, switch to the second BWP as an active BWP of the second cell.

* * * * *